(12) United States Patent
Woodard et al.

(10) Patent No.: US 11,815,110 B2
(45) Date of Patent: Nov. 14, 2023

(54) SYSTEMS AND METHODS FOR MANAGING NOISE IN COMPACT HIGH SPEED AND HIGH FORCE HYDRAULIC ACTUATORS

(71) Applicant: ClearMotion, Inc., Billerica, MA (US)

(72) Inventors: Nathan Woodard, Medford, MA (US); Colin Patrick O'Shea, Cambridge, MA (US); Hector Arnaldo Inirio, Cambridge, MA (US)

(73) Assignee: ClearMotion, Inc., Billerica, MA (US)

( * ) Notice: Subject to any disclaimer, the term of this patent is extended or adjusted under 35 U.S.C. 154(b) by 0 days.

(21) Appl. No.: 17/942,352

(22) Filed: Sep. 12, 2022

(65) Prior Publication Data
US 2023/0220853 A1    Jul. 13, 2023

Related U.S. Application Data

(63) Continuation of application No. 16/305,121, filed as application No. PCT/US2017/035558 on Jun. 1, 2017, now Pat. No. 11,480,199.
(Continued)

(51) Int. Cl.
*F15B 1/24* (2006.01)
*F15B 7/00* (2006.01)
(Continued)

(52) U.S. Cl.
CPC .......... *F15B 7/006* (2013.01); *B60G 17/0165* (2013.01); *B60G 2202/154* (2013.01);
(Continued)

(58) Field of Classification Search
CPC ............ F15B 2211/8616; F15B 21/008; F15B 1/021; F15B 2211/20561; B60G 17/0165;
(Continued)

(56) References Cited

U.S. PATENT DOCUMENTS 3,855,791 A * 12/1974 Quinto .................... B30B 15/16
60/416
4,625,513 A    12/1986 Glomeau
(Continued)

FOREIGN PATENT DOCUMENTS

EP    2 868 932 A1    5/2015
JP    S55-121982 U    8/1980
(Continued)

OTHER PUBLICATIONS

International Search Report and Written Opinion dated Aug. 14, 2017 in connection with International Application No. PCT/US2017/035558.
(Continued)

*Primary Examiner* — Thomas E Lazo
(74) *Attorney, Agent, or Firm* — Wolf, Greenfield & Sacks, P.C.

(57) ABSTRACT

Presented herein are systems and methods for attenuating certain pulsations in a hydraulic system comprising a pump and a hydraulic actuator. In certain aspects, an accumulator comprising an internal volume that is divided into a working chamber and a contained chamber may be utilized to at least partially attenuate propagation of certain pulsations in the system. The working chamber may be fluidically coupled to the pump via a first flow path and fluidically coupled to a chamber of the actuator via a second flow path. The system may be designed such that a first inertance of the first flow path is greater than a second inertance of the second flow path. Additionally or alternatively, the system may be designed such that a resonance associated with the first inertance and a compliance of the accumulator may occur at a resonance frequency of less than 90 Hz.

20 Claims, 31 Drawing Sheets

Related U.S. Application Data

(60) Provisional application No. 62/344,571, filed on Jun. 2, 2016.

(51) Int. Cl.
  *B60G 17/0165* (2006.01)
  *F04B 11/00* (2006.01)
  *F04B 49/06* (2006.01)

(52) U.S. Cl.
  CPC .. *B60G 2202/413* (2013.01); *B60G 2202/416* (2013.01); *F04B 11/0016* (2013.01); *F04B 49/065* (2013.01); *F15B 1/24* (2013.01); *F15B 2211/20515* (2013.01); *F15B 2211/20561* (2013.01); *F15B 2211/27* (2013.01); *F15B 2211/625* (2013.01); *F15B 2211/8616* (2013.01)

(58) Field of Classification Search
  CPC ........ B60G 2202/154; B60G 2202/413; B60G 2202/416; B60G 2500/30
  See application file for complete search history.

(56) References Cited

U.S. PATENT DOCUMENTS

| | | | | |
|---|---|---|---|---|
| 5,231,583 | A * | 7/1993 | Lizell | B60G 17/015 |
| | | | | 280/5.506 |
| 5,492,451 | A | 2/1996 | Franz et al. | |
| 5,634,389 | A | 6/1997 | Horan et al. | |
| 5,682,923 | A * | 11/1997 | Goloff | F16L 55/053 |
| | | | | 138/30 |
| 5,769,400 | A | 6/1998 | Hölzl et al. | |
| 6,234,758 | B1 | 5/2001 | Pawelski | |
| 7,051,526 | B2 * | 5/2006 | Geiger | F16D 48/02 |
| | | | | 60/475 |
| 8,500,187 | B2 * | 8/2013 | van't Veen | B60J 7/1273 |
| | | | | 296/117 |
| 8,991,169 | B2 * | 3/2015 | Zoppi | F15B 11/06 |
| | | | | 60/415 |
| 11,480,199 | B2 * | 10/2022 | Woodard | F04B 53/004 |
| 2002/0114716 | A1 | 8/2002 | Takagi et al. | |
| 2004/0013548 | A1 | 1/2004 | Seto et al. | |
| 2004/0140149 | A1 | 7/2004 | Terpay et al. | |
| 2005/0095069 | A1 | 5/2005 | Johansson et al. | |
| 2009/0260935 | A1 | 10/2009 | Avadhany et al. | |
| 2010/0072760 | A1 | 3/2010 | Anderson et al. | |
| 2010/0262308 | A1 | 10/2010 | Anderson et al. | |
| 2014/0265168 | A1 | 9/2014 | Giovanardi et al. | |
| 2014/0294601 | A1 | 10/2014 | O'Shea et al. | |
| 2015/0224845 | A1 | 8/2015 | Anderson et al. | |
| 2015/0240812 | A1 | 8/2015 | Kemnitz | |
| 2020/0088214 | A1 | 3/2020 | Woodard et al. | |

FOREIGN PATENT DOCUMENTS

| | | |
|---|---|---|
| JP | S56-076787 U | 6/1981 |
| JP | H10-110701 A | 4/1998 |
| WO | WO 03/066425 A1 | 8/2003 |
| WO | WO 2009/130059 A1 | 10/2009 |
| WO | WO 2011/159874 A2 | 12/2011 |
| WO | WO 2014/145018 A2 | 9/2014 |
| WO | WO 2017/184651 A1 | 10/2017 |

OTHER PUBLICATIONS

[No Author Listed], Inline Pulse-ToneTM Hydraulic Shock Suppressors. Catalog HY10-1630/US. Parker Hannifin Global Accumulator Division United States. Retrieved from the WayBack Machine on Mar. 8, 2019, noting date of Nov. 22, 2015. pp. 71-80.

Corbo et al., Practical design against pump pulsations. Proceedings of the Twenty-Second International Pump Users Symposium. Conference date: Feb. 2005; pp. 137-177.

McGehee et al., Hydraulic accumulators tame shock and vibration. News content from Machine Design. Mar. 2, 2011. 9 pages.

Minav, Axial piston pump flow ripple compensation by adjusting the pump speed with an electric drive. The twelfth Scandinavian International Conference on Fluid Power, May 18-20, 2011. Tampere, Finland.

Wachel et al., Understanding how pulsation accumulators work. Reprinted from Pipeline Engineering Symposium. Jan. 10-13, 1988. PD—vol. 14. pp. 23-31.

* cited by examiner

SYSTEMS AND METHODS FOR MANAGING NOISE IN COMPACT HIGH SPEED AND HIGH FORCE HYDRAULIC ACTUATORS

RELATED APPLICATIONS

This application is a continuation of U.S. application Ser. No. 16/305,121, filed Nov. 28, 2018, which is a national stage filing under 35 U.S.C. § 371 of International Patent Application Serial No. PCT/US2017/035558, filed Jun. 1, 2017, which claims the benefit of priority under 35 U.S.C. § 119(e) of U.S. Provisional Application Ser. No. 62/344,571, filed Jun. 2, 2016, the disclosures of each of which are incorporated herein by reference in their entirety.

BACKGROUND

Hydraulic systems, which take advantage of fluids to store, convert, and/or transport power, are utilized across a variety of industries and applications, from large scale chemical plants to motor vehicles. Hydraulic systems generally include a variety of components, such as, for example, pumps, valves, various reservoirs, tanks, or fluid chambers, filters, membranes, loads, etc. Each component of a hydraulic system may be connected by flow-coupling elements such as pipes, tubes, nipples, hoses, channels, etc. of varying diameters and geometries. In particular, hydraulic systems that incorporate one or more hydraulic actuators have been investigated for use in a variety of applications, including automotive applications.

One phenomenon associated with hydraulic systems, especially for automotive applications, is undesirable vibrations such as, for example, vibrations that result in acoustic noise. Acoustic noise may be introduced into a hydraulic system via, for example, pulsations in input flow and/or output flow generated by use of a positive displacement pump—a phenomenon known in the art as "pump ripple." Alternatively, pulsations may be introduced by opening or closing of valves, thereby temporarily disrupting steady-state conditions in the hydraulic system, a phenomenon sometimes referred to in the art as "water hammer" (notably, despite the term "water hammer", the phenomenon is not limited to water-based systems and may involve any hydraulic fluid).

SUMMARY

Inventors have recognized that the practical use of hydraulic systems may be governed by several application dependent considerations, such as maximum allowable noise specifications, space constraints, power or force demands, and response time requirements. Often times, these considerations may represent trade-offs; for example, adding components such as noise absorbers may serve to mitigate acoustic noise, but may add bulk to the system and/or increase response time, thereby precluding certain applications in which space is highly limited and/or very fast response times are desired. Accordingly, the Inventors have recognized a technical need for hydraulic systems having an arrangement of hydraulic components that serves to limit noise while having sufficient response time and compactness that allow for use in, for example, automotive suspension applications.

The inventors have also recognized that the specific arrangement of hydraulic components in a hydraulic system can have important effects on noise, response time, and packaging size associated with the hydraulic system, often in ways that are not readily predictable using a-priori information. Presented herein are various hydraulic systems, and methods of use thereof, that may allow for one or more of low noise, fast response-time operation, while permitting flexibility and compactness in packaging. Though the various embodiments described herein should not be limited to providing these exemplary benefits and other possible benefits are also possible.

In one aspect, a hydraulic apparatus is disclosed comprising: a hydraulic actuator including an actuator housing that at least partially defines a compression chamber and an extension chamber and a pump (e.g., a hydraulic pump, a hydraulic motor capable of operating as a pump, a bidirectional pump, a bidirectional positive displacement pump); a compression-side accumulator comprising a compression-side accumulator housing defining a first internal volume that is divided, by a first barrier (e.g., a movable barrier (e.g., a slidable piston, a bladder or portion thereof)), into a first contained chamber (e.g., a chamber containing a compressible fluid (e.g., a gas)) and a first working chamber, wherein the first working chamber is fluidically coupled to the pump by a compression-side first flow path and the first working chamber is fluidically coupled to the pump by a compression-side second flow path.

In certain embodiments of the hydraulic apparatus, a first hydropneumatic system consisting of the compression-side first flow path and the compression-side accumulator has a first resonance frequency that is less than 90 Hz. In certain embodiments, the first resonance frequency may be less than 50 Hz, or less than 20 Hz. In certain embodiments, the first resonance frequency is greater than 1 Hz. In certain embodiments, the compression-side first flow path has a first end in the pump and a second end in the first working chamber. In certain embodiments, the compression-side first flow path has exactly two ends.

In certain embodiments of the hydraulic apparatus, a second hydropneumatic system consisting of the compression-side second flow path and the compression-side accumulator has a second resonance frequency that is greater than the first resonance frequency (e.g., by a factor of at least 5 or at least 20). In certain embodiments, the third frequency is less than 1000 Hz and/or greater than 500 Hz.

In certain embodiments, the hydraulic apparatus further comprises an extension flow path that fluidically couples the pump to the extension chamber of the actuator, and an extension side accumulator comprising an extension-side accumulator housing defining a second internal volume that is divided, by a second barrier (e.g., a movable barrier (e.g., a slidable piston, a bladder or portion thereof)), into a second contained chamber (e.g., a chamber containing a compressible fluid (e.g., a gas)) and a second working chamber. In certain embodiments, the extension-side accumulator has a second stiffness and the compression-side accumulator has a first stiffness, and the second stiffness is greater than the first stiffness (e.g., by a factor of at least 2, by a factor of at least 5, by a factor not exceeding 100).

In certain embodiments, the compression-side accumulator is a type-2 accumulator. In certain embodiments, the extension-side accumulator is a type-1 accumulator. In certain embodiments, the extension-side accumulator further comprises a cylindrical neck (e.g., a neck having a diameter between 4-10 mm, and/or a length less than 5 mm) that fluidically couples the second working chamber to the extension flow path. In certain embodiments, the second barrier comprises a first surface exposed to fluid in the working chamber, and wherein a cross-sectional area of the neck is less than the surface area of the first surface.

In another aspect, a hydraulic actuator is disclosed comprising an actuator housing that at least partially defines a compression chamber and an extension chamber; a pump (e.g., a hydraulic motor capable of operating as a pump, a bidirectional pump, a bidirectional positive displacement pump); a compression-side accumulator comprising: a compression-side accumulator housing defining a first internal volume that is divided, by a first barrier (e.g., a movable barrier (e.g., a slidable piston, a bladder or portion thereof)), into a first contained chamber (e.g., a chamber containing a compressible fluid (e.g., a gas)) and a first working chamber, wherein: the first working chamber is fluidically coupled to the pump by a compression-side first flow path; and the first working chamber is fluidically coupled to the compression chamber by a compression-side second flow path.

In certain embodiments, the compression-side first flow path has a first inertance and the compression-side second flow path has a second inertance, and the first inertance is larger than the second inertance. For example, the first inertance may be greater than the second inertance by a factor of at least 5 or at least 10. In certain embodiments, the first inertance is greater than the second inertance by a factor of no more than 100.

Alternatively or additionally, in certain embodiments at least one of (a) and (b) as follows is true: (a) a first TFmag of a first transfer function has at least one of a first global maximum and first local maximum at a first frequency, and a second TFmag of a second transfer function has at least one of a second global maximum and second local maximum at a second frequency, wherein: the first transfer function describes a first relationship between pressure at a first point and pressure at a second point; the second transfer function describes a second relationship between pressure at the second point and pressure at a third point; the first point is located in one of: the pump, a port of the pump, and the compression-side first flow path; the second point is located in the first internal volume (e.g., inside the first working chamber) of the compression-side accumulator; and the third point is located in the compression chamber of the actuator; and (b) a first TFph of a first transfer function is equal to +/−90° at a first frequency, and a second TFph of a second transfer function is equal to +/−90° at a second frequency; wherein the first transfer function describes a first relationship between pressure at a first point and pressure at a second point; the second transfer function describes a second relationship between pressure at the second point and pressure at a third point in the first point is located in one of: the pump, port and the compression-side first flow path; the first point is located in one of: the pump, a port of the pump, and the compression-side first flow path; the second point is located in the first internal volume (e.g., inside the first working chamber) of the compression-side accumulator; the third point is located in the compression chamber of the actuator. In certain embodiments, (a) as listed above is true. In certain embodiments, (b) as listed above is true. In certain embodiments, both (a) and (b) are true.

In certain embodiments, the second frequency is higher than the first frequency. For example, the second frequency may be greater than the first frequency by a factor of at least 5 or at least 20. In certain embodiments, the second frequency may be greater than the first frequency by a factor of less than 100. In certain embodiments, the first frequency is higher than a first lower limit and lower than a first upper limit, wherein the first lower limit is one of 0 Hz, 2 Hz, 5 Hz, or 10 Hz and the first upper limit is one of 100 Hz, 80 Hz, 60 Hz, 50 Hz, 30 Hz, 20 Hz, or 15 Hz. In certain embodiments, the second frequency is higher than a second lower limit and lower than a second upper limit, wherein the second lower limit is one of 100 Hz, 200 Hz, 300 Hz, 400 Hz, or 500 Hz and the second upper limit is one of 800 Hz, 1000 Hz, or 1500 Hz.

In certain embodiments, the compression-side first flow path has a first length and the compression-side second flow path has a second length, and the first length is longer than the second length. For example, the first length may be equal to at least 2 times or at least 5 times the second length. In certain embodiments, the first length is greater than the second length by a factor of no more than 50.

In certain embodiments, compression-side first flow path comprises a first portion having a first cross-sectional area and the compression-side second flow path comprises a second portion having a second cross-sectional area, and the first cross-sectional area is larger than the second cross-sectional area (e.g., by a factor of at least 2 or at least 5, and/or by a factor of less than 100).

In certain embodiments, the actuator further comprises an actuator piston having a first face at least partially exposed to fluid in the extension chamber and a second face at least partially exposed to fluid in the compression chamber. In certain embodiments, a piston rod may be physically attached to the piston (e.g., the piston rod may be physically attached to the first face of the piston).

In certain embodiments, the compression-side first flow path has a first length that is less than the length of the compression flow path. In certain embodiments, the compression-side second flow path has a second length that is less than a length of the compression flow path. In certain embodiments, the sum of the first length and the second length is less than the length of the compression flow path. In certain embodiments, the compression flow path is the shortest flow path of a first set of one or more flow paths, the compression-side first flow path is the shortest flow path of a second set of one or more flow paths, and the compression-side second flow path is the shortest flow path of a third set of one or more flow paths, wherein" the first set of one or more flow paths consists of each flow path of the hydraulic apparatus that fluidically couples the pump to the compression chamber; the second set of one or more flow paths consists of each flow path of the hydraulic apparatus that fluidically couples the pump to the first working chamber; and the third set of one or more flow paths consists of each flow path of the hydraulic apparatus that fluidically couples the first working chamber to the compression chamber.

In certain embodiments, the compression-side accumulator is a type-2 accumulator. In certain embodiments, the compression-side accumulator comprises a first opening through the compression-side accumulator housing; a second opening through the compression-side accumulator housing; and an internal flow path fluidically coupling the first opening to the second opening, wherein the internal flow path is entirely contained in the first working chamber and wherein the compression flow path includes the internal flow path. In certain embodiments, the compression-side accumulator comprises a first tube comprising: a first tube housing comprising: a first outer surface and a first inner surface, the first inner surface defining a first bore, wherein at least a first portion of the first outer surface is exposed to fluid in the first working chamber of the compression-side accumulator. In certain embodiments, the compression-side accumulator comprises a second tube comprising: a second tube housing including a second outer surface and a second inner surface, the second inner surface defining a second bore, wherein at least a second portion of the second outer surface is exposed to fluid in the first working chamber of the compression-side accumulator. In certain embodiments, the second bore has a second cross-sectional area that is larger than a first cross-sectional area of the first bore (e.g., by a factor of at least 2 or at least 5, and/or by a factor of less than 100).

In certain embodiments, the hydraulic apparatus further comprises an extension flow path fluidically coupling the pump to the extension chamber, and an extension-side accumulator comprising: an extension-side accumulator housing defining a second internal volume that is divided, by a second barrier (e.g., a movable barrier (e.g., a slidable piston, a bladder or portion thereof)), into a second contained chamber (e.g., a chamber containing a compressible fluid (e.g., a gas)) and a second working chamber, wherein: the second working chamber is fluidically coupled to the pump via an extension-side first flow path; and the second working chamber is fluidically coupled to the compression chamber via an extension-side second flow path. In certain embodiments, the extension-side accumulator has a second stiffness and the compression-side accumulator has a first stiffness, wherein the second stiffness is greater than the first stiffness. For example, the second stiffness may be equal to at least 5 times or at least 10 times the first stiffness. In certain embodiments, the second stiffness is greater than the first stiffness by a factor of less than 100. In certain embodiments, the first internal volume is larger than the second internal volume (e.g, by a factor of at least 2, by a factor of between 2 and 100).

In certain embodiments, the extension-side accumulator may be a type-1 accumulator. In certain embodiments, the extension-side accumulator further comprises a cylindrical neck (e.g., having a diameter between 4-10 mm and/or a length less than 5 mm) that fluidically couples the second working chamber to the extension flow path In certain embodiments in which the extension-side accumulator is a type-1 accumulator, the extension-side first flow path may have a third length and the extension-side second flow path may have a fourth length, wherein the third length is less than the fourth length.

In certain embodiments, the extension-side accumulator may be a type-2 accumulator. In certain embodiments in which the extension-side accumulator is a type-2 accumulator, the extension-side first flow path may have a third length, the extension-side second flow path may have a fourth length, and the third length may be greater than the fourth length.

In certain embodiments, a third TFmag of a transfer function describing a relationship between pressure at a fourth point and pressure at a fifth point has at least one of a global maximum and local maximum at a third frequency, wherein the fourth point is located in one of: of the pump and the extension-side first flow path, and the fifth point is located in the second internal volume (e.g., inside the second working chamber or inside the second contained chamber). Alternatively or additionally, a third TFph of the third transfer function describing a relationship between pressure at a fourth point and pressure at a fifth point may be equal to +/−90° at a third frequency, wherein the fourth point is located in one of: the pump and the extension-side first flow path, and the fifth point is located in the second internal volume (e.g., inside the second working chamber or inside the second contained chamber). In either case, in certain embodiments the third frequency is higher than the first frequency. In certain embodiments, the third frequency is larger than a third lower limit and lower than a third upper limit, wherein the third lower limit is 100 Hz and the third upper limit is 500 Hz. In certain embodiments, the third frequency is lower than the aforementioned second frequency.

In certain embodiments, the compression-side accumulator housing may be directly physically attached to the actuator housing. In certain embodiments, the compression-side accumulator housing and the actuator housing may share at least a common portion (e.g., a common wall).

In certain embodiments, the hydraulic apparatus may further comprise an outer housing that encircles at least a portion of the actuator housing. In certain embodiments, the hydraulic apparatus may include an annular cavity bounded on one side by an outer surface of the actuator housing or a portion thereof, and on another side by an inner surface of the outer housing or a portion thereof. In certain embodiments, at least one of the compression-side first flow path, the compression-side second flow path, the extension-side first flow path, and the extension-side second flow path includes at least a portion of the annular cavity. In certain embodiments, an inner diameter of the outer housing is at least 0.4 mm larger than an outer diameter of the actuator housing. In certain embodiments, a difference between the inner diameter of the outer housing and the outer diameter of the actuator housing is less than 1 mm. In certain embodiments, the annular cavity is separated a first volume and a second volume by an annular cavity (e.g., an o-ring).

In certain embodiments, a removable insert is inserted into a portion of at least one of: the compression flow path, the extension flow path, the compression-side first flow path, the compression-side second flow path, the extension-side first flow path, and the extension-side second flow path. In certain embodiments, inserting the removable insert into the at least one flow path thereby changes one or more properties (e.g., a cross-sectional area, an inertance, and impedance, a restriction, etc.) of the at least one flow path. In certain embodiments comprising an annular cavity at least partially defined by the outer housing and the actuator housing, the removable insert may be a sleeve at least partially inserted into the annular housing, such that insertion of the sleeve into the annular cavity changes a cross-sectional area of the annular cavity. In certain embodiments, the sleeve may be in physical contact with at least a portion of an outside surface of the actuator housing. Additionally or alternatively, the sleeve may be in physical contact with at least a portion of an inside surface of the outer housing.

In certain embodiments, the first barrier of the compression-side accumulator is an accumulator piston having a first surface at least partially exposed to fluid in the contained chamber and a second surface at least partially exposed to fluid in the working chamber. In certain embodiments, a first line normal to the second surface of the accumulator piston is parallel to a second line normal to at least one of the first face and second face of the actuator piston. In certain embodiments, the compression-side accumulator housing comprises a cylindrical portion having a first radial axis and a first longitudinal axis and the actuator housing comprises a second cylindrical portion having a second radial axis and a second longitudinal axis, and the first longitudinal axis and the second longitudinal axis are parallel.

In certain embodiments, the compression-side accumulator includes a first compliant arrangement configured to provide a first degree of compliance responsive to a first internal pressure within the first internal volume. The first compliant arrangement may comprise, for example, a gas contained in the first contained chamber, and the first barrier may be moveable to compress or expand a volume of the first contained chamber. In certain embodiments, wherein the compression-side first flow path comprises a first mass of fluid configured to resonate with the first compliant arrangement at a first resonance frequency. The first resonance frequency may vary responsive to variation of the first internal pressure. In certain embodiments, the compression-side second flow path comprises a second mass of fluid configured to resonate with the first compliant arrangement at a second resonance frequency. In certain embodiments, the second resonance frequency is higher than the first resonance frequency.

In certain embodiments, extension-side accumulator comprises a second compliant arrangement in fluid communication with the second internal volume, a neck, and a third mass of fluid located in the neck, wherein the third mass is configured to resonate with the second compliant arrangement at a third resonance frequency (e.g., 5-100 Hz, 80-300 Hz). In certain embodiments, the second compliant arrangement comprises a gas contained in the second contained chamber, and the second barrier may be moveable to compress or expand a volume of the second contained chamber. In certain embodiments, the third resonance frequency may be higher than the first resonance frequency.

In certain embodiments, the hydraulic apparatus contains fluid; the pump comprises a rotor, rotation of which at a constant speed for a given time generates pressure pulsations in at least a portion of the fluid of the hydraulic apparatus; the first compliant arrangement is arranged to at least partially absorb a first portion of said pressure pulsations; and the second compliant arrangement is arranged to at least partially absorb a second portion of said pressure pulsations. In certain embodiments, a first amplitude of the pressure pulsations at a first point is larger than a second amplitude of the pressure pulsations at a second point, wherein the first point is located in one of: the pump and the compression-side first flow path and the second point is located in the compression chamber of the actuator. In certain embodiments, a third amplitude of the pressure pulsations at a third point is larger than a fourth amplitude of the pressure pulsations at a fourth point; wherein the third point is located in one of: the pump and the extension-side first flow path and the fourth point is located in the extension chamber of the actuator.

In certain embodiments, the hydraulic actuator of any of the disclosed hydraulic apparatuses described herein may further comprise a piston having a first face exposed to fluid in the compression chamber and a second face exposed to fluid in the extension chamber. Additionally, a piston rod may be attached to the second face.

In another aspect, a vehicle is disclosed comprising a suspension system including a hydraulic apparatus according to any embodiment described herein. In certain embodiments, the vehicle may comprise a plurality of the hydraulic apparatuses according to any of the embodiments disclosed herein.

In yet another aspect, an accumulator is disclosed comprising: a housing defining a first internal volume that is divided, by a barrier (e.g., a movable barrier (e.g., a slidable piston, a bladder or portion thereof)) into a first contained chamber (e.g., a chamber containing a compressible fluid (e.g., a gas)) and a first working chamber. The accumulator may further comprise a first tube having a first tube housing comprising a first outer surface, and a first inner surface defining a first bore, wherein at least a first portion of the first outer surface is exposed to fluid in the first working chamber of the compression-side accumulator. The accumulator may further comprise a second tube having a second tube housing comprising a second outer surface, and a second inner surface defining a second bore, wherein at least a second portion of the second outer surface is exposed to fluid in the first working chamber of the compression-side accumulator. In certain embodiments, the second bore has a second cross-sectional area that is larger than a first cross-sectional area of the first bore. For example, the second cross-sectional area may be greater than the first cross-sectional area by a factor of at least 2 or at least 5, or by a factor of between 2-100 or 5-100. Alternatively or additionally, the first tube may have a first length and the second tube may have a second length that is less than the first length. Alternatively or additionally, a first ratio of the first length over the first cross-sectional area may be greater than a second ratio of the second length over the second cross sectional area. Alternatively or additionally, inertance of fluid in the first bore may be greater than inertance of fluid in the second bore.

It should be appreciated that the foregoing concepts, and additional concepts discussed below, may be arranged in any suitable combination, as the present disclosure is not limited in this respect. It is envisioned that any feature of any embodiment may be combined with any other feature of any other embodiment. Further, other advantages and novel features of the present disclosure will become apparent from the following detailed description of various non-limiting embodiments when considered in conjunction with the accompanying figures. Further, it should be understood that the various features illustrated or described in connection with the different exemplary embodiments described herein may be combined with features of other embodiments or aspects. Such combinations are intended to be included within the scope of the present disclosure.

BRIEF DESCRIPTION OF DRAWINGS

FIG. 16b illustrates a pressure/displacement transfer function of the hydraulic system of FIG. 16a.

FIG. 17b illustrates a pressure/displacement transfer function of the hydraulic system of FIG. 17a.

FIG. 18b illustrates a pressure/displacement transfer function of the hydraulic system of FIG. 18a.

FIG. 19b illustrates a pressure/displacement transfer function of the hydraulic system of FIG. 19a.

FIG. 20b illustrates a pressure/displacement transfer function of the hydraulic system of FIG. 20a.

FIG. 21b illustrates a pressure/displacement transfer function of the hydraulic system of FIG. 21a.

FIG. 22b illustrates a pressure/displacement transfer function of the hydraulic system of FIG. 22a.

FIG. 23 illustrates a theoretical model of the hydraulic system shown in FIG. 19a.

Figure 1:
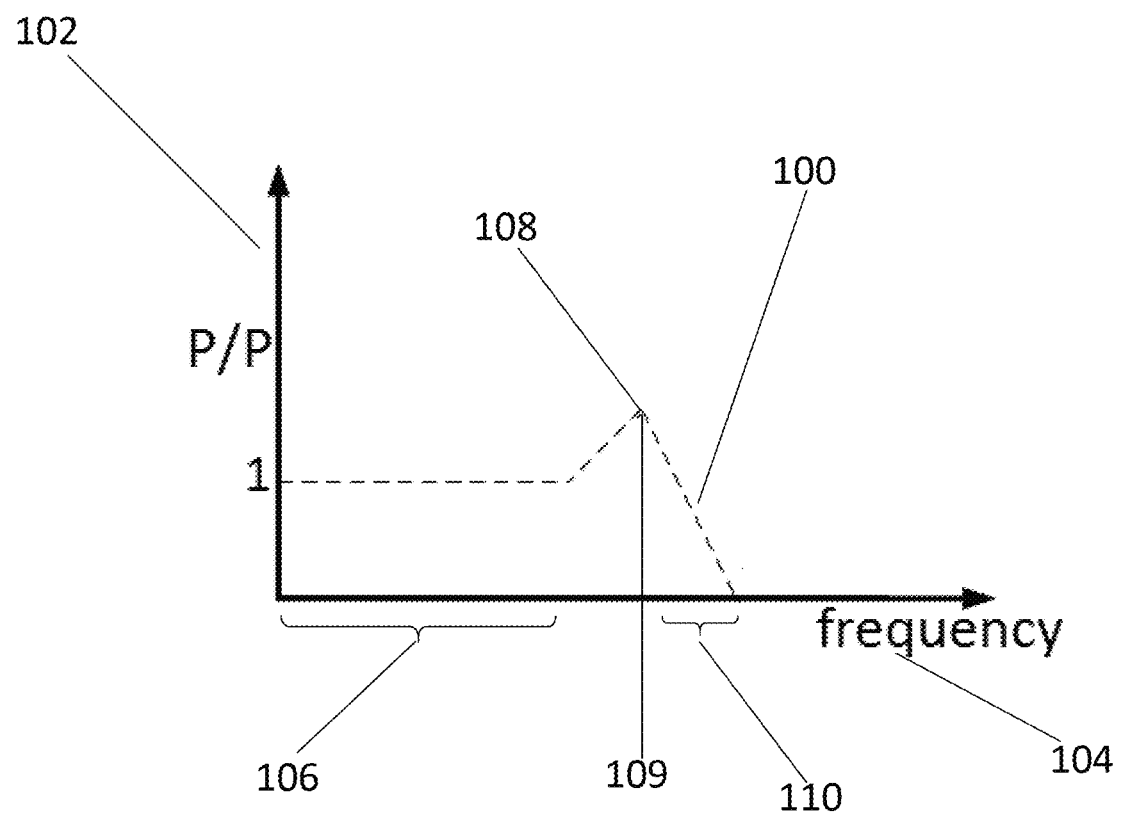
FIG. 1 illustrates TFmag of a pressure/pressure transfer function describing a relationship between pressure at two points in a hydraulic system.

Drawings are not to scale unless specifically noted.

DETAILED DESCRIPTION

Disclosed herein are various methods and systems that utilize one or more hydraulic actuators. Such hydraulic systems have been utilized in, for example, active suspension systems of automobiles that, ideally, call for compact packaging, fast response times, and low noise operation. The inventors have discovered that even slight changes in relative arrangement of hydraulic components in integrated hydraulic systems may profoundly affect the operating properties (e.g., noise, response time) and packaging requirements of the overall system. Herein, a number of discoveries are described related to hydraulic components and specific arrangements of said hydraulic components in a hydraulic system, such that a combination of compact packaging, fast response times, and low-noise operation may be achieved. These discoveries include, for example, incorporation of various types of accumulators located at different parts in the hydraulic systems, as well as precise tuning of, for example, relative impedances, inertances, and/or lengths of various flow paths of the hydraulic systems.

The inventors have recognized that the precise arrangement of hydraulic components in a hydraulic system, such as, for example, a hydraulic system utilizing a hydraulic actuator, can have profound effects on noise, response time, and packaging size associated with the hydraulic system, often in ways that are not readily predictable using a-priori information. Often times, these considerations may represent trade-offs; for example, adding components such as noise absorbers may serve to mitigate acoustic noise, but may add bulk to the system and/or increase response time, thereby precluding certain applications in which space is highly limited and/or very fast response times are desired. Presented herein are various hydraulic systems, and methods of use thereof, that may allow for one or more of low noise, fast response-time operation, while permitting flexibility and compactness in packaging. The various embodiments described herein should not be limited to providing these exemplary benefits and other possible benefits are also possible.

Particularly, in one aspect, in a hydraulic system including a hydraulic actuator and a pump, an accumulator may be incorporated for absorbing pulsations or vibrations, such as vibrations that may lead to noise, in the system. The accumulator may include a working chamber that is fluidically coupled to the pump by a first flow path and fluidically coupled to a compression chamber of the actuator by a second flow path. Inventors have recognized that a variety of performance metrics (such as, for example, noise attenuation capability and/or response-time) can be improved by controlling the relative inertances of the first flow path and the second flow path, and/or by controlling resonance frequencies of various portions of the system. For example, noise attenuation may be improved in a system in which inertance of the first flow path is greater than inertance of the second flow path. Additionally or alternatively, noise attenuation may be improved by designing a hydraulic system such that a resonance associated with interaction of inertance in the first flow path and compliance of the accumulator occurs at a first frequency of less than 90 Hz (e.g., at a frequency range of 1-90 Hz, 1-50 Hz, or 1-20 Hz. Optionally, the second flow path may be configured such that a resonance associated with interaction of inertance in the second flow path and compliance of the accumulator occurs at a second resonance frequency that is greater than the first frequency. As described in detail herein, resonance frequencies of a system may be determined or evaluated empirically through the use of transfer functions.

Inventors have further discovered that, for hydraulic apparatuses comprising a pump and an accumulator in which the pump is fluidically coupled to both the compression chamber (via a compression flow path) and an extension-chamber (via an extension flow path), two accumulators may be utilized and configured such that they interact in a synergistic manner. Specifically, a compression-side accumulator may be located on the compression-flow path that fluidically couples the pump and a compression chamber of the actuator, while an extension-side accumulator may be located on the extension-flow path that fluidically couples the pump to an extension chamber. As will be shown, locating each accumulator on either side of the pump (e.g., one on the extension side and one on the compression side) as described may result in system performance (e.g., pulsation attenuation capability) that far outperforms the sum of the individual accumulators considered alone. Further synergy may arise by configuring one of the accumulators (e.g., the extension-side accumulator) to have a stiffness greater than that of the other accumulator (e.g., the compression-side accumulator) and/or by sizing one of the accumulators (e.g., the extension-side accumulator) such that it has an internal volume smaller than that of the other accumulator (e.g., the compression-side accumulator), Alternatively or additionally, the compression-side accumulator may include two distinct ports—a first port and a second port—through which fluid may ingress/egress a working chamber of compression-side accumulator (for example, the compression-side accumulator may be a type-2 accumulator as described herein). In these embodiments, as described in detail herein, the inventors have recognized that additional benefits may arise with respect to system performance by precisely controlling various properties (e.g., a first inertance, a first impedance, a first length, a first cross-sectional area) of a compression-side first flow path, or a portion thereof, fluidically coupling the pump to the first accumulator port relative to the respective properties (e.g., a second inertance, a second impedance, a second length, a second cross-sectional area) of a compression-side second flow path, or portion thereof, fluidically coupling the second accumulator port to the compression chamber of the actuator.

Figure 2:
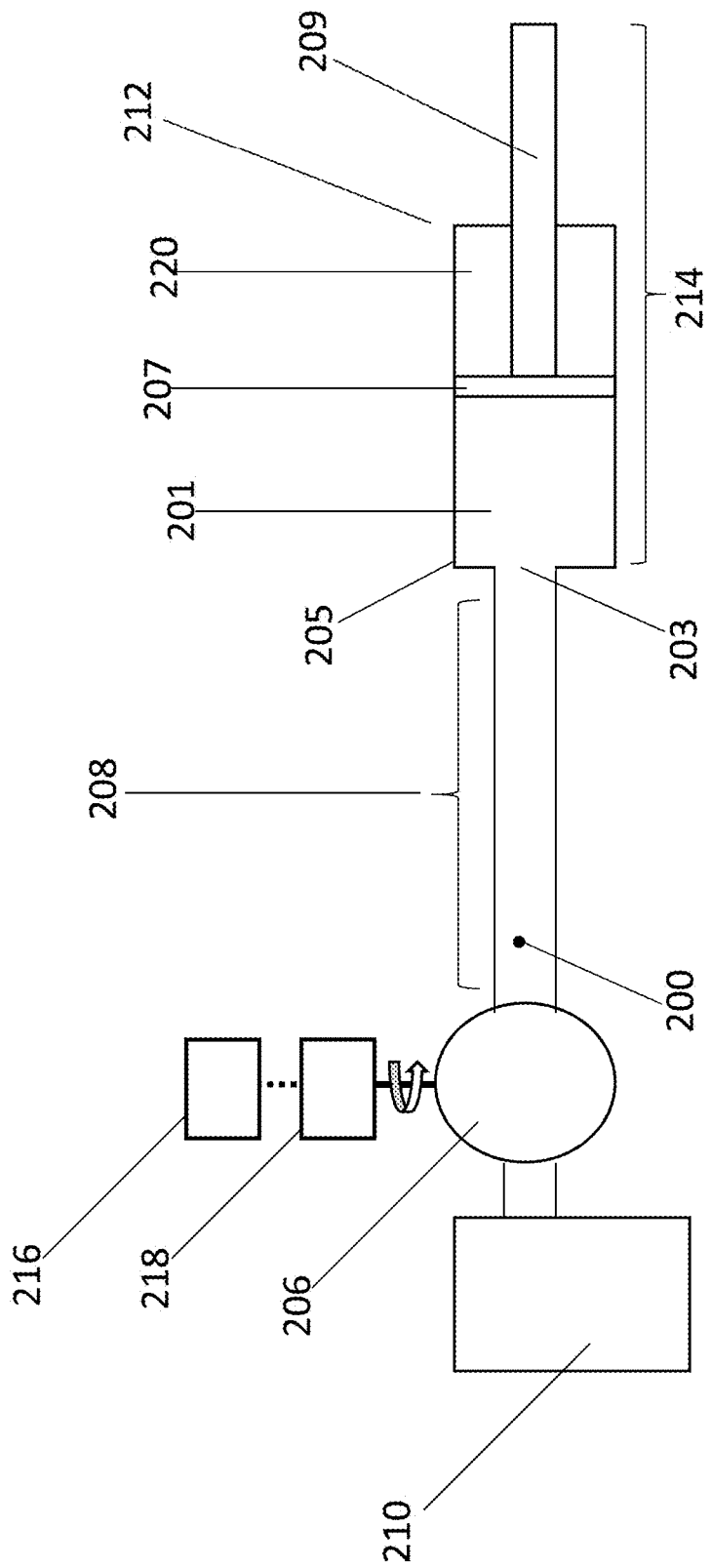
FIG. 2 illustrates a hydraulic system including a hydraulic actuator.

Turning now to the figures, several non-limiting embodiments are now described in detail. Turning now to the figures, several non-limiting embodiments are now described in detail. FIG. 2 illustrates a simplified embodiment of a hydraulic actuator 212. In the illustrated embodiment, the hydraulic actuator 212 includes (i) a compression chamber 201 defined by a cylindrical housing 205 and a first face of a slidable piston 207 inserted into the housing 205, and (ii) a extension chamber 220 defined by a second face of the slidable piston 207 and the housing 205. The second face of the slidable piston 207 may be physically attached to a piston rod 209. In the illustrated embodiment, the housing 205 further comprises a receiving port 203, which may be, for example, an opening through the housing 205 that allows fluid to ingress or egress the compression chamber 201. The compression chamber 201 may be fluidically coupled to a pump 206 by a receiving flow path 208, which may be, for example, a tube, hose, pipe, or channel. The pump, in turn, may be fluidically coupled to a fluid reservoir 210. An electric motor 218, in communication with a motor controller 216, may be operatively coupled to the pump 206.

In certain embodiments, a torque applied to the pump 206 by the electric motor 218 may be intentionally varied with time in order to vary a pressure of fluid in the compression chamber 201, thereby imparting a force onto the piston 207 that may result in movement of the piston 207 and attached piston rod 209, and may cause a length 214 of the hydraulic actuator to change. In various embodiments, a motor controller 216 may receive a nominal command profile (e.g., from an external controller or a user) that specifies, for example, any one of: a desired length 214 of the actuator 212 over a given time (i.e., a "nominal command length profile"), a desired longitudinal position of the piston over a given time (i.e., a "nominal command position profile"), a desired pump velocity over a given time (i.e, a "nominal command velocity profile"), a desired force to apply to the first face of the piston 207 over a given time (i.e., a "nominal command force profile"), a desired pressure of the compression chamber 201 over a given time (i.e., a "nominal command pressure profile"), or a desired torque to apply to the pump 206 over a given time (i.e., a "nominal command torque profile"). In certain embodiments, in response to receiving a nominal command profile, the motor controller 216 may apply a time-dependent signal (e.g., an electrical signal (e.g., a current, a voltage)) to the motor 218 such that the pump and/or actuator behaves according to the nominal command profile.

A command position profile (describing desired longitudinal position of the piston over time) may be related to a command force profile (describing desired force to apply on the first face of the piston 207 over time) by, for example, using the equation $F(t)=m*d^2x(t)/dt^2+P_b A_b$, where $x(t)$ is the position profile, m is the mass of the piston and piston rod, Pb is the pressure of fluid in the extension chamber 210, $A_b$ is the area of the second face of the piston exposed to fluid in the extension chamber 210, and $F(t)$ is the command force profile. Likewise, a command velocity profile (describing desired operating velocity of the pump over time) may be related to a position profile by using, for example, the relation $w(t)=dx(t)/dt*A*1/Disp$, where $x(t)$ is the position profile, A is the cross-sectional area of the compression chamber, Disp is the displacement per revolution of the pump 206, and $w(t)$ is the command velocity profile in units of revolutions per unit time. It is noted that the above equation, which is intended as an example for purposes of clarity, may be modified to include additional parameters such as compressibility of the hydraulic fluid, leakage flow around the pump, etc. A command pressure profile (describing desired pressure of the compression chamber 201 over time) may be determined based on a command force profile by, for example, using the equation $P(t)=F(t)/A$, where A is the area of the first face of the piston 207 exposed to fluid in the compression chamber 201 and $P(t)$ is the command pressure profile. A command torque profile (describing desired torque to apply to the pump 206 over time) may be determined based on a command pressure profile using, for example, the equation $\tau(t)=[P(t)-Pr]*Disp$, where Disp is the displacement volume of the pump, Pr is the pressure of fluid in the fluid reservoir 210, and $\tau(t)$ is the nominal command torque profile. The aforementioned equations are examples and such equations may be modified to incorporate additional parameters, such as, for example, inertia of the pump, drag torque, friction of various components, leakage around the pump, etc.

In certain embodiments, the pump 206 may be a positive displacement hydraulic pump. As a result of a phenomenon known as "pump ripple," the flow rate of fluid discharged by a positive displacement pump may not be smooth, but rather may fluctuate at a frequency referred to as a "ripple frequency." Such fluctuations in discharge flow rate that originate at a pump 206 (referred to herein as "flow ripple") may generate pressure fluctuations that may propagate downstream in a hydraulic system as pressure waves (sometimes referred to as acoustic waves), thereby resulting in fluctuations in pressure differential at various points in the hydraulic system.

Figure 3:
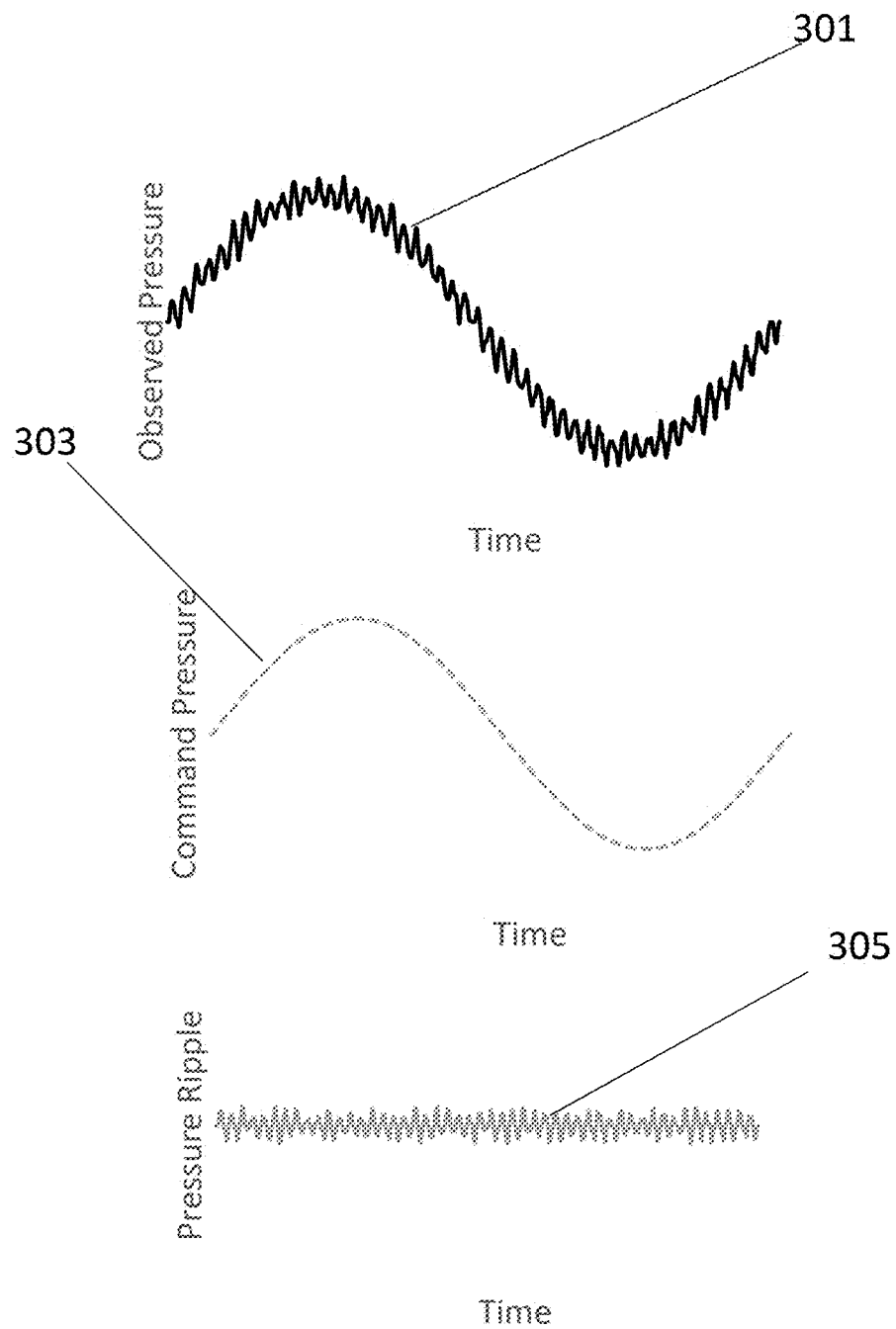
FIG. 3 illustrates a plot of observed pressure depicting pressure ripple at a first point in a hydraulic system.

FIG. 3 depicts an example of a pressure profile that may be observed at a first point 200 of the hydraulic system of shown in FIG. 2. As can be seen, the observed pressure 301 at the first point 200 in the hydraulic system fluctuates according to the command pressure profile 303 (which specifies desired pressure as a function of time) superimposed with higher frequency fluctuations 305 that arise due to flow ripple generated by the pump 206. The high frequency fluctuations 305 in observed pressure 301 that arise due to flow ripple may be referred to as "pressure ripple." Returning to FIG. 2, if the pressure ripple observed at the first point 200 is able to propagate through the receiving flow path 208 and into the compression chamber 201, then the force exerted on the piston 207 may fluctuate, potentially resulting in fluctuations in a position of the piston 207 and piston rod 209. This ripple may be transferred to the piston rod 209 and to any structure to which the piston rod 209 is attached, such as, for example, a top mount and/or a vehicle body. As used herein, the term ripple may refer to flow ripple, pressure ripple, or force ripple, as all aforementioned phenomena are interrelated and may share a common origin (e.g., operation of a positive displacement pump).

Figure 4:
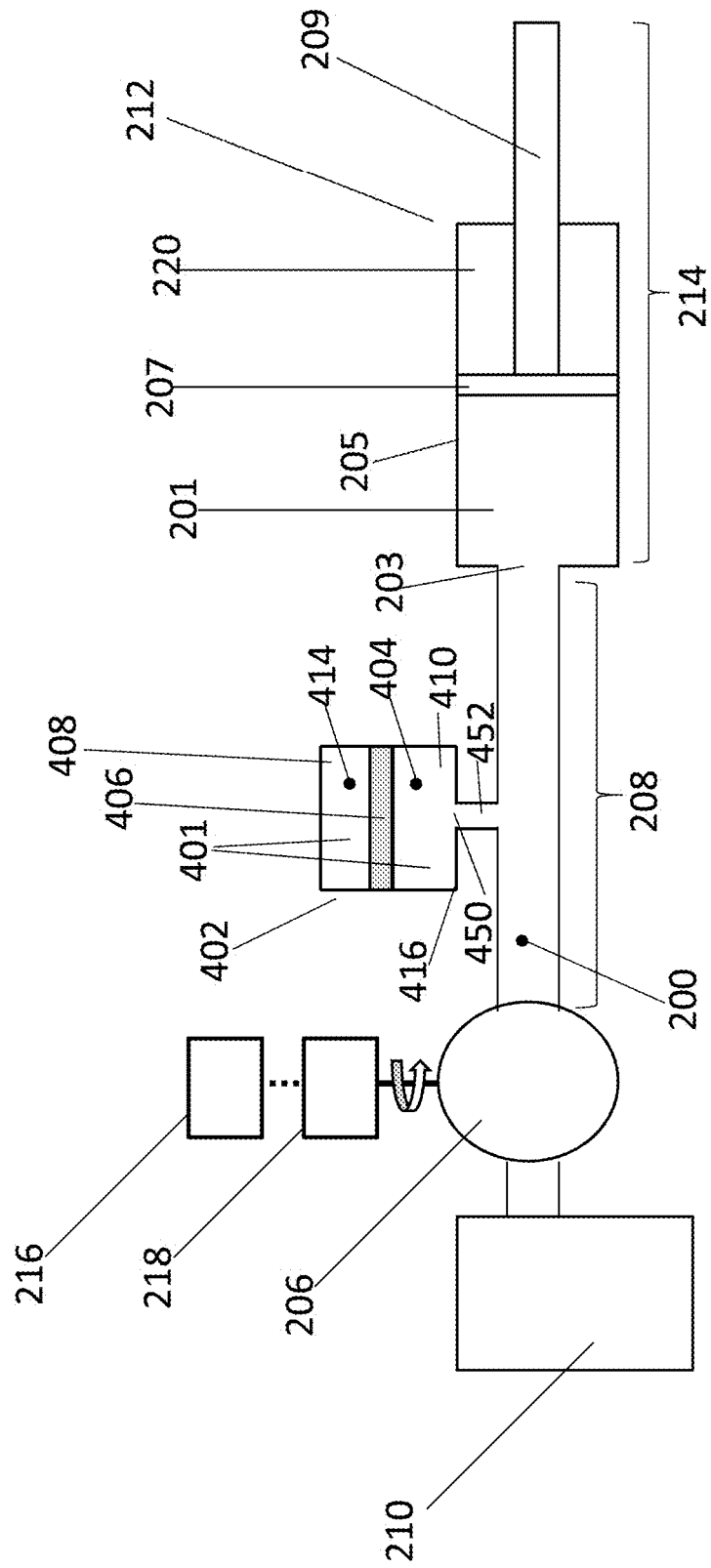
FIG. 4 illustrates a hydraulic system including a hydraulic actuator and a type-1 accumulator.

If allowed to propagate through a hydraulic system, ripple may generate audible noise or other instability in a hydraulic system and/or the structures to which it is attached. Therefore, in various applications, it may be desirable to design a hydraulic system in which pressure ripple is unable to propagate through a hydraulic system or is at least partially mitigated during propagation. Mitigation of acoustic propagation may be accomplished by, for example, using a component known as an accumulator downstream of the pump. FIG. 4 illustrates the use of a hydraulic accumulator 402. The hydraulic system of FIG. 4 is similar to that of FIG. 2, with the addition of an accumulator 402 that has been located on the receiving flow path. An accumulator 402 may include a housing 416 that defines an internal volume 401. As shown, the internal volume 401 may be separated, by a barrier 406, into a contained chamber 408 and a working chamber 410. In certain embodiments, a first side of the barrier 406 is exposed to a compressible fluid (e.g., a gas) contained in the contained chamber 408, and a second side of the barrier 406 is exposed to hydraulic liquid in the working chamber 410.

The compressible fluid in the contained chamber 408 may be separated from the working chamber by the barrier. The barrier 406 may be movable. In certain embodiments, a pressure pulsation may result in instantaneous pressure of fluid in the receiving chamber exceeding the pressure of the contained chamber. In response, fluid may flow from the receiving flow path 208, through the port 450, and into the working chamber 410, potentially resulting in movement (e.g., sliding or flexing) of the barrier 406 such that the volume of the working chamber 410 increases while the volume of the contained chamber 408 contracts; due to contraction of the volume of the contained chamber, the compressible fluid in the contained chamber 408 may subsequently exert a restoring force on the barrier 406. As the pressure of fluid in the receiving chamber returns to a nominal value, the restoring force may cause the barrier 406 to move back to its original position simultaneously as fluid flows out of the working chamber 410 through the port 450. In this way, the compliance provided by the compressible fluid in the contained chamber may allow for pulsations to be at least partially absorbed by the accumulator.

In the illustrated embodiment, the barrier 406 is a floating piston and the housing 416 is cylindrical. However, in various embodiments, the housing 416 may be any shape including spherical and semispherical, and the barrier 406 may be any barrier, such as, for example, an elastomeric or semi-elastomeric bladder, that separates fluid in the contained chamber 408 from fluid in the working chamber 410. In the embodiment of the accumulator 402 illustrated in FIG. 4, the accumulator housing 416 comprises a single port 450 through which fluid may egress/ingress the working chamber 410 to/from the receiving flow path 208. An accumulator in which fluid may egress and ingress the working chamber 410 through a single port 450 (as opposed to multiple ports) is referred to herein as a type-1 accumulator. The hydraulic accumulator 402 of FIG. 4 may therefore be said to be a type-1 accumulator.

It should be understood that hydraulic accumulators can be provided in various configurations including but not limited to hydraulic gas charged accumulators (wherein the contained chamber 408 includes a gas) and spring hydraulic accumulators (wherein the barrier 406 is physically restrained via a spring). While many of the embodiments described herein depict hydraulic gas accumulators, the current disclosure is not limited in this fashion of accumulators except as explicitly stated. It is understood that, unless otherwise stated, the various systems described herein may correspond to any appropriate type of accumulator. It is understood that other terms know in the art, depending on context, may be used interchangeably with accumulator, such as, for example, a buffer and a reservoir.

The tendency of a disturbance at one point of a hydraulic system to propagate and effect components at other points in the hydraulic system may be characterized qualitatively and/or quantitatively using transfer functions. A transfer function, as used herein, is understood to mean a function that describes how changes in an observed operating parameter at a second point in a system are related to changes in an operating parameter at a first point in the system. The observed operating parameter at the second point may be referred to as, for example, an "output" and may correspond to, for example, an observed pressure, a force applied to the piston, a displacement position, etc. The change at the first point may be referred to as, for example, an "input" (such as "input ripple") and may correspond to, for example, a pressure ripple at first point, a displacement, etc. Response of hydraulic systems to input ripple generally may depend on the frequency of the input ripple. In certain embodiments, therefore, a transfer function may be represented as a plot depicting, on the y-axis, a ratio (or log ratio) of intensity or amplitude of the output to intensity or amplitude of the input and, on the x-axis, frequency of the input (e.g. input ripple).

FIG. 1 depicts an example of a transfer function 100. In the illustrated example, the y-axis 102 corresponds to a ratio of intensity (or amplitude of, for example, pressure fluctuations observed at a second point 404 of the hydraulic system of FIG. 4 to intensity or amplitude of, for example, the pressure fluctuations observed at a first point 200 of the hydraulic system of FIG. 4. In the particular example shown, the first point 200 is located in the receiving flow path 208 between the pump 206 and the accumulator 402, and the second point 404 is located in the working chamber 404 of the accumulator 402. However, these points are merely exemplary, and in general a transfer function may describe transfer of, or a relationship between, pulsations between any two points in a system.

In the illustrated embodiment, the x-axis 104 may correspond to frequency of the pressure fluctuation at the first point 200. If a pressure fluctuation at a given frequency propagates from the first point 200 to the second point 404 with no attenuation nor amplification, then the transfer function 100 would be 1 at that given frequency (that is, the intensity or amplitude of the pressure when it reaches the second point 404 would be equal to the initial intensity or amplitude of the pressure at the first point 200). For a fluctuating pressure that is attenuated during propagation from the first point 200 to the second point 404, or for a pressure wave where the energy is partially directed to an alternate flow path that does not pass through the second point 404, the transfer function 100 may be less than 1. For pressure fluctuations that are amplified during propagation, the transfer function 100 may be greater than 1.

Transfer functions may also be illustrated in a graph where the y-axis 102 may be represented as a log of the ratio of output intensity to input intensity. In these plots (which use a log-scale, or dB scale, for the y-axis), a zero value indicates no attenuation and no amplification during propagation of an input pressure from a first point to a second point; a negative value indicates attenuation during propagation; and a positive value indicates amplification during propagation.

As discussed above, the exemplary transfer function illustrated in FIG. 1 illustrates a hypothetical response of pressure at the second point 404 (the output) of the hydraulic system in response to pressure fluctuations at a first point 200 (the input) of the hydraulic system—the ratio along the y-axis therefore represents pressure intensity or amplitude over pressure intensity or amplitude. These types of transfer functions, in which a relationship of pressure at one point to pressure at another point is described, may be referred to as "pressure/pressure transfer functions."

In alternate illustrations, the y-axis may represent ratios of intensity or amplitude of any parameter at the output over intensity or amplitude of another parameter at the input. For example, in certain illustrations, the y-axis may correspond to a ratio of (a) intensity of an observed pressure wave at the second point 404 of the hydraulic system over (b) intensity of fluctuating fluid displacements (referred to as displacement ripple) determined at a first point 200 of the hydraulic circuit. In these embodiments, the ratio is of pressure intensity or amplitude at the output over displacement at the input, and the transfer function is referred to as a pressure/displacement transfer function. Alternatively, for example, in certain representations of a transfer function may be obtained by plotting, on the y-axis, a ratio of (a) the position of the barrier 406 (or other moveable component) of the accumulator 402 to (b) fluctuations in pressure at the first point 200 of the hydraulic system; in these embodiments, the ratio is of displacement at the output over pressure intensity or amplitude at the input.

The exemplary magnitude of the pressure/pressure transfer function illustrated in FIG. 1 corresponds to transfer (or propagation) of pressure pulsations (sometimes referred to as pressure waves or as pressure pulsations) between the first point 200 of FIG. 4 to the second point 404 of FIG. 4. As can be seen in FIG. 4, the first point 200 is located in the flow passage in between the pump 206 and the accumulator 402, while the second point 404 is located within the working chamber 410 of the accumulator 402. In the exemplary transfer function 100 illustrated in FIG. 1, the transfer function 100 is flat and equal to 1 for a lower range of frequencies 106, indicating that a pressure wave at a frequency within the lower range of frequencies 106 is transferred without mitigation to the second point 404. The transfer function then reaches a maximum 108 at a specific frequency 109 that may be referred to as a "resonance frequency" (which may be, for example, a Helmholtz resonance frequency). In other transfer functions, such as, for example, pressure/displacement transfer functions, a resonance frequency may be indicated by a minimum instead of a maximum.

Figure 15:
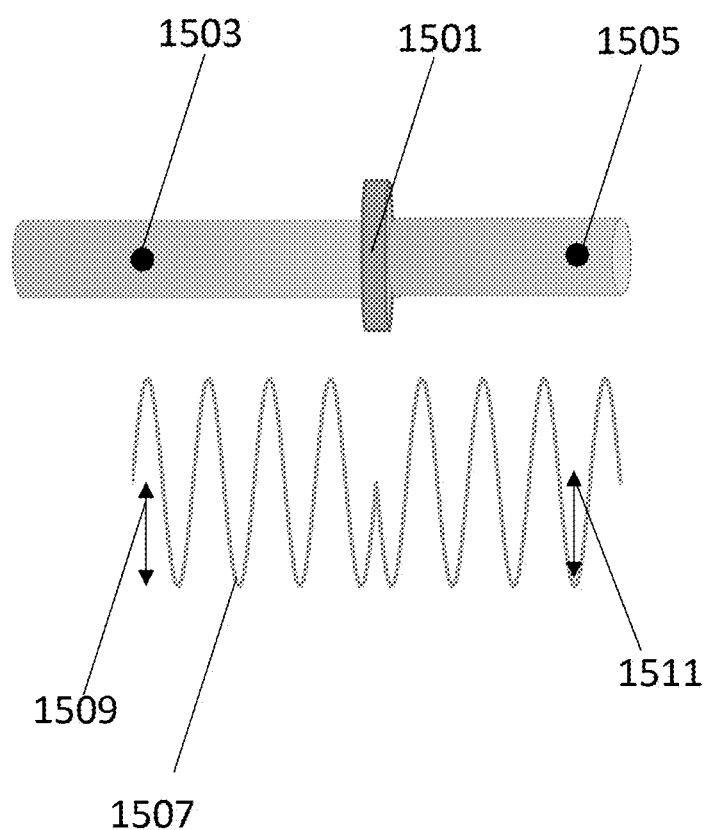
FIG. 15 illustrates propagation of a pressure wave through a hypothetical hydraulic system.

The transfer functions disclosed thus far all describe a ratio of intensity or amplitude of a parameter (e.g., pressure) at one point to intensity or amplitude of a parameter (e.g., pressure, displacement) at a second point. Additionally or alternatively, a transfer function may be generated that describes the phase of a wave (e.g., pressure wave, or fluctuation) at a given frequency observed at one point in the hydraulic system as compared to the phase observed for the same frequency at another point in the hydraulic system. For example, FIG. 15 depicts a hypothetical hydraulic system comprising a hydraulic element 1501. As shown in FIG. 15, a pressure wave or fluctuation 1507 generated at a first point 1503 in the hydraulic system propagates through the hydraulic element 1501 to a second point 1505 (that is, the pressure wave or fluctuation is transferred from the first point to the second point). As depicted for the hypothetical hydraulic system of FIG. 15, the intensity or amplitude 1509 of the pressure wave 1507 at the first point 1503 is equal to the intensity or amplitude 1511 of the pressure wave 1507 at the second point 1505, so a magnitude of a pressure/pressure transfer function plotting the log ratio of the amplitude 1511 of the pressure wave 1507 at the second point 1505 to the amplitude 1509 of the pressure wave 1507 at the first point 1503 would be equal to zero (indicating propagation without attenuation or amplification) for the specific frequency of wave shown. However, as can be seen, as the pressure wave propagates through the imaginary element 1501, its phase is shifted by 180 degrees. Therefore, the phase of the transfer function describing propagation from the first point 1503 to the second point 1505 would be equal to +/−180° for the specific frequency of wave shown.

For the sake of clarity and brevity, rather than referring to the "magnitude of a transfer function" and the "phase of the transfer function", the following terminology is employed. As used herein the term "TFmag" of a transfer function is understood to mean the magnitude of a complex function, and the term "TFph" is understood to mean the phase of a complex function. Therefore, the TFmag of a transfer function describing a relationship between pressure at a first point and pressure at a second point may be represented as a plot having two axes (e.g., an x-axis and a y-axis) in which the first axis (e.g., x-axis) depicts frequency of pressure fluctuations and the second axis (e.g., y-axis depicts) a ratio (or log-ratio) of amplitude of pressure fluctuations at the second point to amplitude of pressure fluctuations at the first point. Similarly, the TFph of a transfer function describing a relationship between pressure at a first point and pressure at a second point may be represented as a plot having two axes (e.g., an x-axis and a y-axis) in which the first axis (e.g., x-axis) depicts frequency of pressure fluctuations and the second axis (e.g., y-axis) depicts the phase angle of the transfer function (e.g., a difference between the phase of pressure fluctuations at the second point as compared to the phase of pressure fluctuations at the first point). "Phase difference" is understood to refer to a difference in the phase of pressure fluctuations as observed at one point in a hydraulic system compared to the phase of the pressure waves as observed at another point in the hydraulic system.

When a portion of a hydraulic system between two points is in resonance, there may be a 90° phase difference between the variations of the pressures at the two points. Alternatively stated, the TFph of a transfer function describing a relationship between pressures at the two points may have a value of $^+/_-90°$ at the resonance frequency of that portion of the system. Additionally, as discussed above, the TFmag of the transfer function may have a local maximum or global maximum at the resonance frequency of that portion of the system. However, in certain systems, for example heavily damped systems, it may be difficult to identify a local maximum from a plot of TFmag (e.g., the maximum may not rise above noise levels); in these cases, for example, the resonance frequency may be determined by evaluating the TFph to determine a frequency (or frequency range) at which the observed phase difference is $+/-90°$.

The term "resonance frequency," as used herein, therefore may refer to, for example, (i) a frequency at which a TFmag of a pressure/pressure transfer function shows either a global maximum or local maximum (i.e., a frequency at which the first derivative of the transfer function with respect to frequency changes from a positive value to zero or from a positive value to a negative value), or (ii) a frequency at which a TFph is equal to $+/-90°$.

When pulsations having a frequency corresponding to a resonance frequency are introduced into a fluid-filled hydraulic system, the pulsations may "excite" one or more resonances in the system. Without wishing to be bound to any particular theory, such resonance may be thought of as occurring when an inertial element of the hydraulic system (for example, a portion of the fluid in a volume of the hydraulic system) physically oscillates synchronously with a compliant element (e.g., a gas contained in the contained chamber of an accumulator, a spring) of the system, such that there exists a continuous exchange between potential energy (e.g., energy stored by compression or extension of the compliant element) and kinetic energy (e.g., due to movement of the portion of fluid). In general, a hydraulic system featuring a plurality of inertial and compliant elements may exhibit various resonances. If two or more of these various resonances have overlapping or sufficiently similar frequencies, then a first resonance of the hydraulic system may 'excite' a second resonance of the hydraulic system in an uncontrollable or undesirable manner. Therefore, inventors have recognized the importance of designing the system such that various resonances are sufficiently spaced apart in resonance frequency, as will be discussed throughout this application.

In view of the above, a resonance frequency of a given hydraulic system may be determined, for example, by: (i) locating pressure sensors at various points in the hydraulic system, (ii) introducing pressure waves or pulsations having a first frequency into the system, (iii) monitoring the intensity, amplitude, and/or phase of the pressure wave or pulsations at each of the various points in the system, (iv) varying the frequency of the generated pressure waves or pulsations while continuing to monitor the intensity, amplitude, and/or phase of the pressure wave or pulsations at each of the various points in the system, (v) determining TFmag and/or TFph of one or more transfer functions describing the relationship between pressures at the various points, and (vi) identifying frequencies where the TFph is +/−90° and/or the TFmag has a global or local maximum.

Returning to FIG. 1, at a second range of frequencies 110 higher than the resonance frequency 109, the transfer function decreases below 1, indicating that a pressure fluctuation with a frequency in the second range will either be attenuated during propagation or will follow an alternate flow path that does not pass through the second point 404. Without wishing to be bound to any particular theory, at frequencies in the low frequency range 106, the hydraulic actuator 212 may have a high fluidic impedance as compared to the accumulator 402. As fluid tends to flow primarily via the pathway with the lowest impedance, at low frequencies, pressure pulsations may propagate to the working chamber 410 of the accumulator 402, causing the barrier 406 to move up and down in response to the pressure pulsations, thereby at least partially absorbing their energy and, for example, converting it to heat energy (via, for example, heating of the gas particles in the contained chamber 408). As a result, low frequency input pressure pulsations may propagate into the working chamber 410 of the accumulator 402, and, in certain cases, may be absorbed by the accumulator 402.

Pressure fluctuations with a frequency at or substantially near the resonance frequency 109 may be amplified between the first point 200 of FIG. 4 to the second point 404 of FIG. 4-a phenomenon that may be referred to as "Helmholtz" type resonance—resulting in a local maximum 108 in the TFmag at the resonance frequency 109. On the other hand, pressure fluctuations with a frequency in a second range 110 higher than the resonance frequency 109 may not be able to overcome inertia associated with movement of the barrier 406 and/or inertia associated with movement of fluid in the neck 452 of the accumulator. At these higher frequencies, the fluid in the neck 452 may remain effectively immobile, such that fluid flows through the receiving path 208 without ingressing/egressing the working chamber 410 of the accumulator. The accumulator, therefore, may become less effective or not effective at absorbing pressure fluctuations (e.g. ripple) as the frequency increases. For these reasons, for a system such as that shown in FIG. 4 that employs a type-1 gas accumulator, a typical Tfmag of a transfer function may follow the general pattern of FIG. 1 (e.g., a relatively flat portion initial corresponding to low frequency range 106, a maximum 108 corresponding to a resonance frequency 109, and a negative slope in a second range of frequencies 110).

Based on the foregoing, the inventors have recognized that a type-1 accumulator (e.g., an accumulator 402 that branches off the flow path 208 via a neck 452) may become progressively less effective at absorbing fluctuations (e.g. ripple) as frequency increases above a resonance frequency 109 of the portion of the system. For ripple with frequencies sufficiently greater than the resonance frequency 109, the effectiveness of the accumulator 402 may diminish to such a degree that response of the overall hydraulic system may approach that of a similar hydraulic system with no accumulator.

Figure 5:
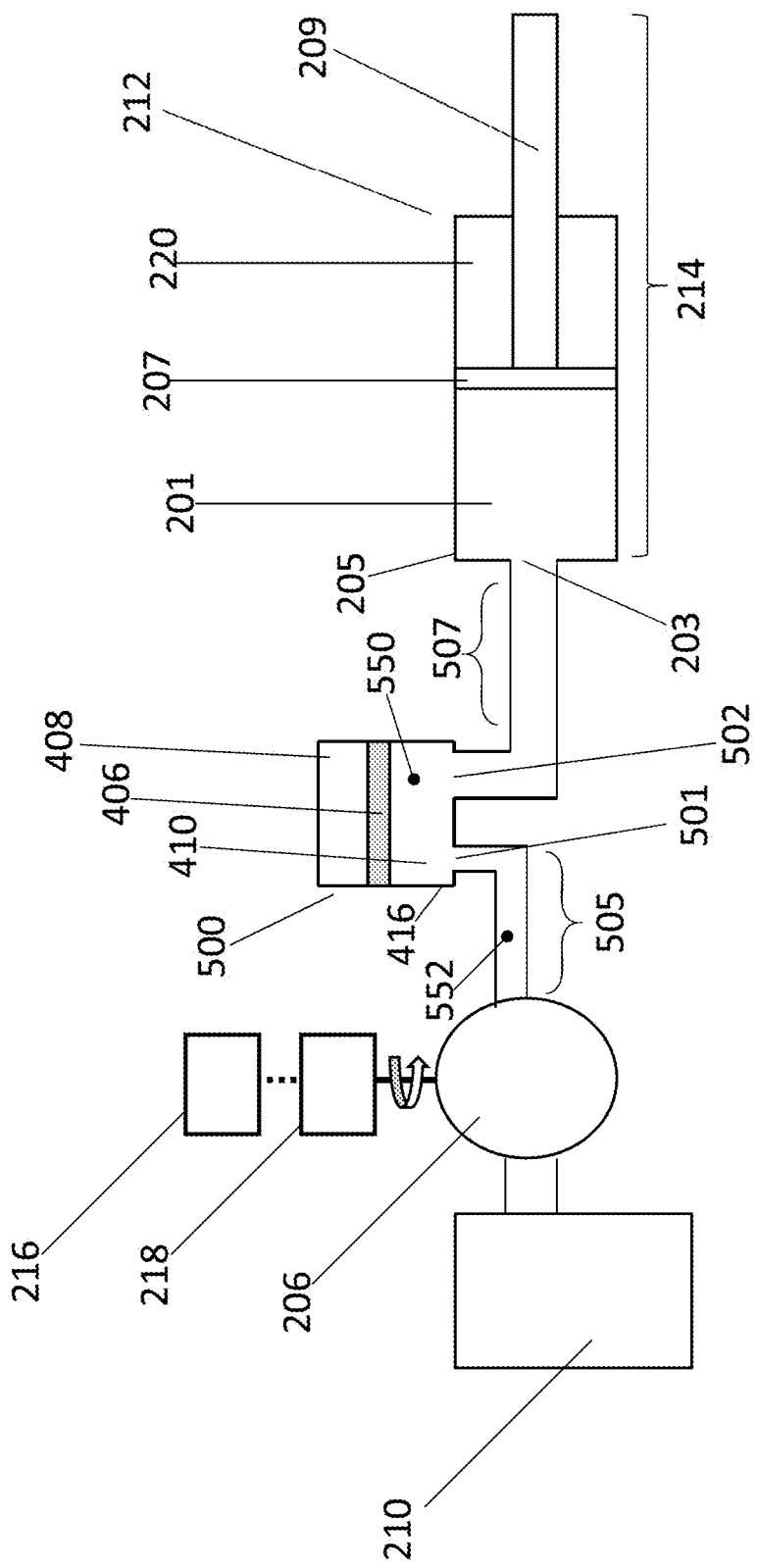
FIG. 5 illustrates a hydraulic system including a hydraulic actuator and a type-2 accumulator.

The inventors have recognized that, in certain hydraulic systems comprising hydraulic actuators, an alternative accumulator design, referred to herein as a "type-2 accumulator," may result in more effective attenuation properties over a wider range of frequencies that afforded by a type-1 accumulator. FIG. 5 illustrates use of a type-2 accumulator. Like a type-1 accumulator, a type-2 accumulator may include an accumulator housing 416 at least partially defining an internal volume that is separated by a movable barrier 406 into a contained chamber 408 and a working chamber 410. As opposed to the type-1 accumulator 402 shown in FIG. 4, the type-2 accumulator 500 shown in FIG. 5 may be characterized by the fact that the accumulator housing 416 may include two distinct ports: (i) a first port 501 through which fluid may ingress/egress the working chamber 410, and (ii) a second port 502 through which fluid may also ingress/egress the working chamber 410. Furthermore, the first port and second port may be fluidically coupled by an internal flow path that may be located within the working chamber 410. In the illustrated embodiment, the first port 501 allows fluid to ingress/egress the working chamber 410 from/to a first flow path 505 that fluidically couples the pump 206 to the working chamber 410, and the second port allows fluid to ingress/egress the working chamber 410 from/to a second flow path 507 that fluidically couples the working chamber 410 to the compression chamber 201 of the hydraulic actuator 212

In a system with a type-2 accumulator 500, at least two distinct, non-overlapping flow paths may exist through which fluid may ingress/egress the working chamber 410 of the accumulator 500. An overall flow path between the pump 206 and the compression chamber 201 of the hydraulic actuator 212 therefore includes the first flow path 505, the working chamber 410 of the accumulator, and the second flow path 507.

Figure 6:
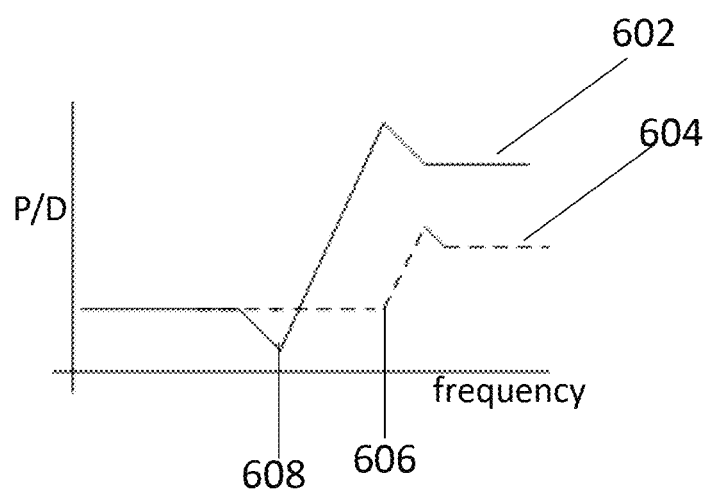
FIG. 6 illustrates pressure/displacement transfer functions describing transfer between various points in a hydraulic system including a hydraulic actuator and an accumulator.

FIG. 6 illustrates the plot of TFmag 602 of a first pressure/displacement transfer function describing the relationship of pressure observed at a first point 552, located in the first flow path 505, to a displacement ripple generated at the pump 206. FIG. 6 further illustrates TFmag 604 of a second pressure/displacement transfer function describing to the relationship of pressure observed at a second point 550, located inside of the working chamber 410 of the accumulator 500, to the displacement ripple generated at the pump 206. Without wishing to be bound to any particular theory, as shown by the corresponding Tfmags depicted in FIG. 6, propagation of fluctuations (e.g. ripple) between the pump 206 to the second point 550 located inside the working chamber 410 may be attenuated at a much wider range of input ripple frequencies as compared to propagation of the same displacement ripple to the first point 552 located in the first flow path 505. Accordingly, as shown in FIG. 6, Tfmag 604 of the second transfer function may depict a local minimum at a second resonance frequency 606 that is higher (i.e., is at a higher frequency) than a first resonance frequency 608 depicted, as a local minimum, in TFmag 602 of the first transfer function. The difference between the first resonance frequency 608 and the second resonance frequency 606 may result from the inertial mass associated with fluid within the first flow path 505. As frequency increases, a greater force may be required to cause oscillatory motion of the mass of this fluid quantity. As a result of the type-2 design, points downstream of the accumulator 500 (e.g., points located in the receiving flow path 507 or compression chamber 201) may respond as if it they are being excited not by the displacement ripple or pressure fluctuations generated at the pump 206, but rather by the attenuated pressure ripple that has reached the working chamber 410.

Returning to FIG. 5, the exemplary type-2 accumulator 500 includes two ports (the first port 501 and second port 502), each of which is in fluid communication with a first flow path 505 and a second flow path 507, respectively. Without wishing to be bound to any particular theory, fluid in the first flow path 505 may interact with the compliance of the accumulator to exhibit a first resonance (e.g., a first "Helmholtz" type resonance, wherein a portion of fluid in the first flow path 552 oscillates synchronously with the compliant arrangement of the accumulator 500) at a first resonance frequency that depends at least in part on a first mass of fluid (or first inertance) in the first flow path 505 and/or the stiffness of the accumulator 500, while fluid in the second flow path 507 can interact with the compliance of the accumulator 500 to exhibit a second resonance (e.g., a second "Helmholtz" type resonance, wherein a portion of fluid in the second flow path 507 oscillates synchronously with the compliant arrangement of the accumulator) at a second resonance frequency that depends at least in part on a second mass of fluid (or fluid inertance) in the second flow path 507. By contrast, a type-1 accumulator 402, such as that shown in FIG. 4, includes only a single port 450 through which fluid may ingress/egress the working chamber 410 of the accumulator and may therefore exhibit only a single fundamental resonance; this resonance may be determined by the fluid in the neck 452 (i.e., a volume having a smaller cross-sectional area than the internal volume of the accumulator that directly fluidically couples the accumulator to the receiving flow path 208) or a portion thereof oscillating synchronously with the complaint arrangement of the accumulator 402, and this resonance frequency may depend on, for example: the cross sectional area of the neck 452, the length of the neck 452, the compliance or stiffness of the accumulator 500, and/or the physical properties (e.g., compressibility, density) of the fluid in the neck 452.

Figure 7:
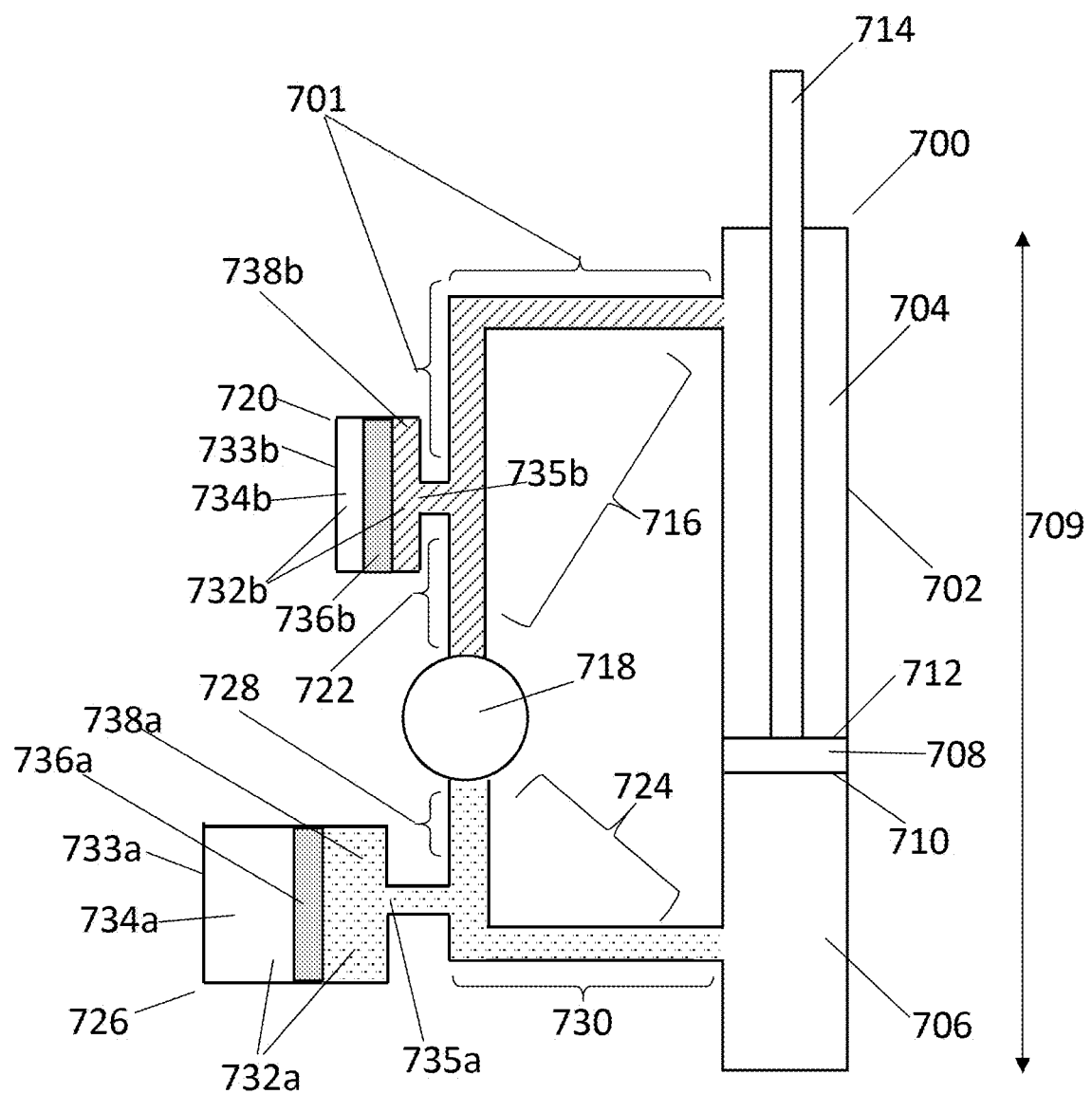
FIG. 7 illustrates a hydraulic system including a hydraulic actuator and two type-1 accumulators.

In certain applications, it may be useful to fluidically couple a bidirectional pump to both a compression chamber and an extension chamber of a hydraulic actuator, thereby allowing the bidirectional pump to directly control flow into (and fluid pressure of) either chamber. An embodiment of such a system is shown in FIG. 7. In the illustrated embodiment, an actuator 700 comprises an actuator housing 702 into which a piston 708 is slidably received. A first face 710 of the piston 708 is exposed to fluid in a compression chamber 706, while a second face 712 of the piston 708 is exposed to fluid in an extension chamber 704. A piston rod 714 may be physically attached to the second face 712 of the piston 708. In alternate embodiments, the piston rod 714 may be physically attached to the first face 710 of the piston 708. The piston rod 714 may allow, in certain conditions, for the actuator to apply a force to an external structure (e.g., a vehicle body (not shown)) that may be attached to the piston rod 714. In some embodiments, the piston rod may be attached to the vehicle body through an intervening top-mount (not shown).

The illustrated hydraulic system also includes a compression flow path 724 (indicated by dashed horizontal lines) fluidically coupling the compression chamber 706 to the pump 718. The compression flow path 724 may, in certain conditions, permit fluid to flow between the pump 718 and the compression chamber 706 of the actuator. As a result, in certain conditions the pump may be utilized to drive fluid to the compression chamber 706, thereby effecting a force on the first face 710 of the piston and allowing for controlled extension of the piston rod 714. As illustrated, the compression flow path may include, for example: (i) a compression-side accumulator 726, (ii) a compression-side first flow path 728 fluidically coupling the pump 718 to a compression-side working chamber 738a of the compression-side accumulator 726, and (iii) a compression-side second flow path 730 fluidically coupling the compression-side working chamber 738a of the compression-side accumulator 726 to the compression chamber 706 of the actuator 700. In the illustrated embodiment, the compression-side accumulator 726 is located fluidically between the pump 718 and the compression chamber 706, and, in addition to serving other functions, may at least partially attenuate pulsations generated at the pump prior to said pulsations reaching the compression chamber 706.

The illustrated hydraulic system further comprises an extension flow path 716 (indicated by gray diagonal hatch marks) fluidically coupling the extension chamber 704 of the actuator 700 to the pump 718. The extension flow path 716 may, in certain conditions, permit fluid to flow between the pump 718 and the extension chamber 704 of the actuator. As a result, in certain conditions the pump may be utilized to drive fluid to the extension chamber 704, thereby effecting a force on the second face 712 of the piston and allowing for controlled contraction of the piston rod 714. The extension flow path may include: (i) an extension-side accumulator 720, (ii) a extension-side first flow path 722 fluidically coupling the pump 718 to the extension-side working chamber 738b of the extension-side accumulator 720, and (iii) an extension-side second flow path 701 coupling the extension-side working chamber 738b of the extension-side accumulator 620 to the extension chamber 704 of the actuator 700.

In the illustrated embodiment, the extension-side accumulator 720 is located fluidically between the pump 718 and the extension chamber 704, and, in addition to serving other functions, may at least partially attenuate pulsations generated at the pump prior to said pulsations reaching the extension chamber 704.

In a preferred embodiment, the bidirectional pump is a variable speed pump, such that pressure difference and/or flow rate between the compression chamber and extension chamber of the actuator may be precisely controlled using the pump. In certain embodiments, the pump 718 may comprise a rotor that includes, or is mechanically coupled to, one or more displacement elements (not pictured). In these embodiments, application of appropriate torque to the rotor may cause rotation of the rotor, thereby generating a pressure difference and/or fluid flow across the pump 718. Further, due to the aforementioned phenomenon of pump ripple, rotation of the rotor may also generate pressure pulsations (ripple) as described in FIG. 3 and the accompanying description herein. The pressure difference across the pump, flow rate across the pump, and/or frequency of the pressure pulsations may depend at least in part on an angular speed at which the rotor is rotated and/or a magnitude of torque applied to the rotor.

The compression flow path 724, compression-side first flow path 728, compression-side second flow path 730, extension flow path 716, extension-side first flow path 722, and/or extension-side second flow path 701 may comprise additional hydraulic components such as, for example, one or more valves (e.g., variable flow valves, solenoid valves, on/off valves, three way valves, etc.), restriction orifices, or other hydraulic components through which, under appropriate circumstances (e.g., appropriate fluid pressure and/or opening of said valves), fluid may flow. Additionally or alternatively, in certain embodiments a length of the compression flow path 724 may exceed a length of the extension flow path 716. In certain embodiments, the length of the compression flow path 724 may be larger than the length of the extension flow path by a factor of at least 2.

In the illustrated embodiment, each of the compression-side accumulator 726 and the extension-side accumulator 720 comprises a housing 733a and 733b, respectively, defining an internal volume 732a and 732b, respectively, with the internal volume being separated, by a barrier 736a and 736b, respectively (e.g., a piston or bladder), into a contained chamber 734a and 734b, respectively and a compression-side and an extension side working chamber 738a and 738b, respectively. In the illustrated embodiment, each of the compression-side accumulator 726 and extension-side accumulator 720 further comprises a single port 735a and 735b, respectively, defined as an opening through the housing 733a and 733b, respectively, through which fluid may ingress/egress the compression-side working chamber 738a and 738b, respectively. Each of the illustrated compression-side accumulator 726 and extension-side accumulator 720 may therefore be classified as type-1 accumulators. As will be discussed further, in various embodiments the compression-side accumulator 726 may be a type-1 accumulator or a type-2 accumulator. Likewise, in various embodiments, the extension-side accumulator 720 may be a type-1 accumulator or a type-2 accumulator.

Without wishing to be bound to any particular theory, in the illustrated hydraulic system of FIG. 7, a net force applied to the piston 708 is equal to the difference of a first force applied to the first face 710 of the piston 708 due to pressure of fluid in the compression chamber 706 and a second force applied to the second face 712 of the piston 708 due to pressure of fluid in the extension chamber 704. Depending on the transfer function of the hydraulic system, displacement ripple generated at the pump 718 (e.g., due to pump ripple) may propagate through the compression flow path 724 to result in pressure fluctuations (pressure ripple) in the compression chamber 706, and/or may propagate through the extension flow path 716 to result in pressure fluctuations (pressure ripple) in the extension chamber 704. As will be described later, following extensive testing and analysis, the inventors have recognized that, as long as displacement ripple can propagate through at least one of the compression flow path 724 and the extension flow path 716 and reach the compression and or extension volumes, the net force applied on the piston 708 may fluctuate accordingly. That is, even if the ripple is completely attenuated through one of the aforementioned flow paths, if the ripple is able to propagate through the other flow path then the net force on the piston may fluctuate (e.g., force ripple will occur), possibly causing the position of the piston to fluctuate or vibrate uncontrollably and undesirably. Therefore, in certain applications it may be desirable to have two accumulators disposed along the flow paths (i.e., the extension-side accumulator 720 and the compression-side accumulator 726), each accumulator located and configured on opposite sides of the pump, such that propagation of input ripple through both the compression flow path 724 and the extension flow path 716 from the pump may be at least partially or sufficiently mitigated, and in some instances substantially eliminated, for at least some ripple frequencies or frequencies within within a given frequency range.

The inventors have further recognized that size or relative size of the compression-side accumulator 726 and/or extension-side accumulator 720 may affect behavior of the system. On one hand, decreasing the size of one or both of the internal volumes 732a and 732b of the compression-side accumulator 726 and/or extension-side accumulator 720, respectively, and/or increasing the stiffness of one or both of the accumulators may increase a resonance frequency associated with the respective accumulator(s), thereby increasing the range of frequencies at which ripple is attenuated during propagation through the compression flow path 725 and/or extension flow path 716. On the other hand, it may be desirable to design the size and/or stiffness of one or both of the accumulators such that expansion of fluid in the system due to changing temperature, as well as displacement of fluid caused by insertion of the piston rod into the actuator housing during compression, may be readily accommodated by one or both of the accumulators. Further, while increasing stiffness of an accumulator may increase the range of frequencies at which pulsations are attenuated, such increased stiffness may correspondingly decrease the magnitude of pulsation attenuation that is achieved by the accumulator.

Inventors have determined that, in certain applications, the aforementioned trade-offs may be resolved by designing the system such that (a) one of the compression-side accumulator and extension-side accumulator has an internal volume that is substantially larger than the internal volume of the other accumulator, and/or (b) one of the accumulators is substantially stiffer than the other accumulator. This trade-off permits effective mitigation of ripple while maintaining overall response of the system.

In a preferred embodiment, the internal volume 732a of the compression-side accumulator 726 is larger than the internal volume 732b of the extension-side accumulator 720 and/or the extension-side accumulator 720 is stiffer than the compression-side accumulator 726. Without wishing to be bound to any particular theory, if a hydraulic system such as that of FIG. 7 is to be in a vehicular suspension system, compression of the actuator 700 (e.g., due to driving over a bump in a road) may result in fluid flowing from the compression chamber 706 either to the compression-side accumulator 726 or through the pump 718. Likewise, extension of the actuator 700 (e.g., due to driving over a pothole in a road) may result in fluid flowing from the extension chamber 704 to either the extension-side accumulator 720 or through the pump 718. Inventors have recognized that, during operation of a vehicle, compression of dampers of a suspension system may occur at a maximum velocity that is faster than extension of the dampers. Very rapid compression of the actuator 700 may result in high fluid velocities through the pump 718, and may cause the pump 718 to rotate at velocities above design specifications, possibly damaging the pump 718 or resulting in degradation in ride quality. Increasing the size of the internal volume 732a of the compression-side accumulator 726 (relative to the size of the internal volume 732b of the extension-side accumulator 720) may increase the fluid holding capacity of the compression-side accumulator 726, such that, during compression events, more fluid flows to the compression-side accumulator 726 and less fluid flows through the pump 718, thereby potentially protecting components of the pump from overly rapid rotation and potentially allowing for improved ride quality during high speed compression events.

In certain embodiments, therefore, the internal volume 732a of the compression-side accumulator 726 may be larger than the internal volume 732b of the extension-side accumulator 720 by a factor of at least 2. In certain embodiments, the compression-side accumulator 726 has an internal volume 732a between 8 cubic inches and 13 cubic inches, and the extension-side accumulator 720 has an internal volume 732b between 2.5 and 5 cubic inches, although embodiments outside these ranges are also contemplated to be within the scope of the present disclosure. In certain embodiments, the internal volume of an accumulator is understood to mean a sum of the volume of the contained chamber 734a or 734b, the volume of the barrier 736a or 736b, respectively, and the volume of the compression-side working chamber 738a or 738b, respectively. In alternate applications (such as, for example, applications in which extension of the actuator 700 is expected to occur at maximum velocities faster than compression of the actuator 700), the hydraulic system may be designed such that the internal volume 732b of the extension-side accumulator 720 is larger than the internal volume 732a of the compression-side accumulator 726.

Likewise, in certain embodiments, the stiffness of the extension-side accumulator 720 may be at least 5 times the stiffness of the compression-side accumulator 726. "Stiffness" of an accumulator is understood to refer to a ratio of the magnitude of a force exerted on the barrier 406 of an accumulator or a portion thereof to the change in a physical dimension of the contained chamber 408. The stiffness of an accumulator (and therefore the compliance and/or associated resonance frequency) having a compliant arrangement that includes a compressible fluid (e.g., gas) contained in a contained chamber, as disclosed herein, may vary responsive to internal pressure of the compressible fluid and/or the volume of the contained chamber according to various thermodynamic principles (e.g. ideal gas law, Boyle's law, adiabatic compression). In various embodiments, the stiffness of the extension-side accumulator 720 may be at least 5 times or at least 10 times the stiffness of the compression-side accumulator 726. In certain embodiments, the compression-side accumulator may have a stiffness between $1E10$ $Pa/m^3$ to $1E11$ $Pa/m^3$ and/or the extension-side accumulator may have a stiffness between $1E11$–$Pa/m^3$ to $1E12$ $Pa/m^3$. Embodiments having values outside of these specific ranges are also contemplated to be within the scope of the present disclosure.

Additionally or alternatively, as illustrated in FIG. 7, in certain embodiments a flow path fluidically coupling the compression chamber 706 of the actuator 700 to the compression-side working chamber 738a of the compression-side accumulator 726 may be shorter (i.e., have a shorter length) than a flow path fluidically coupling the compression chamber 706 of the actuator 700 to the pump 718 (e.g., the compression-side second flow path 730 may be shorter than the compression flow path 724, as is shown in FIG. 7). Additionally or alternatively, in certain embodiments, a flow path fluidically coupling the extension-side working chamber 738b of the extension-side accumulator 720 to the extension chamber 704 of the actuator 700 may be shorter (i.e., have a shorter length) than a flow path fluidically coupling the pump 718 to the extension chamber 704 of the actuator 700 (e.g., the extension-side second flow path 701 may be shorter than the extension flow path 716, as is shown in FIG. 7).

Additionally or alternatively, in certain embodiments, at least one of the compression-side accumulator 726 and the extension-side accumulator 720 may be a type-2 accumulator. Inventors have determined that, at least for reasons similar to those discussed above, a hydraulic system comprising two accumulators wherein at least one of the accumulators is a properly configured and positioned type-2 accumulator may exhibit enhanced ripple attenuation between the pump and the actuator piston over an extended frequency range, at least as compared to a similar system in which none of the accumulators are a type-2 accumulator.

Figure 8:
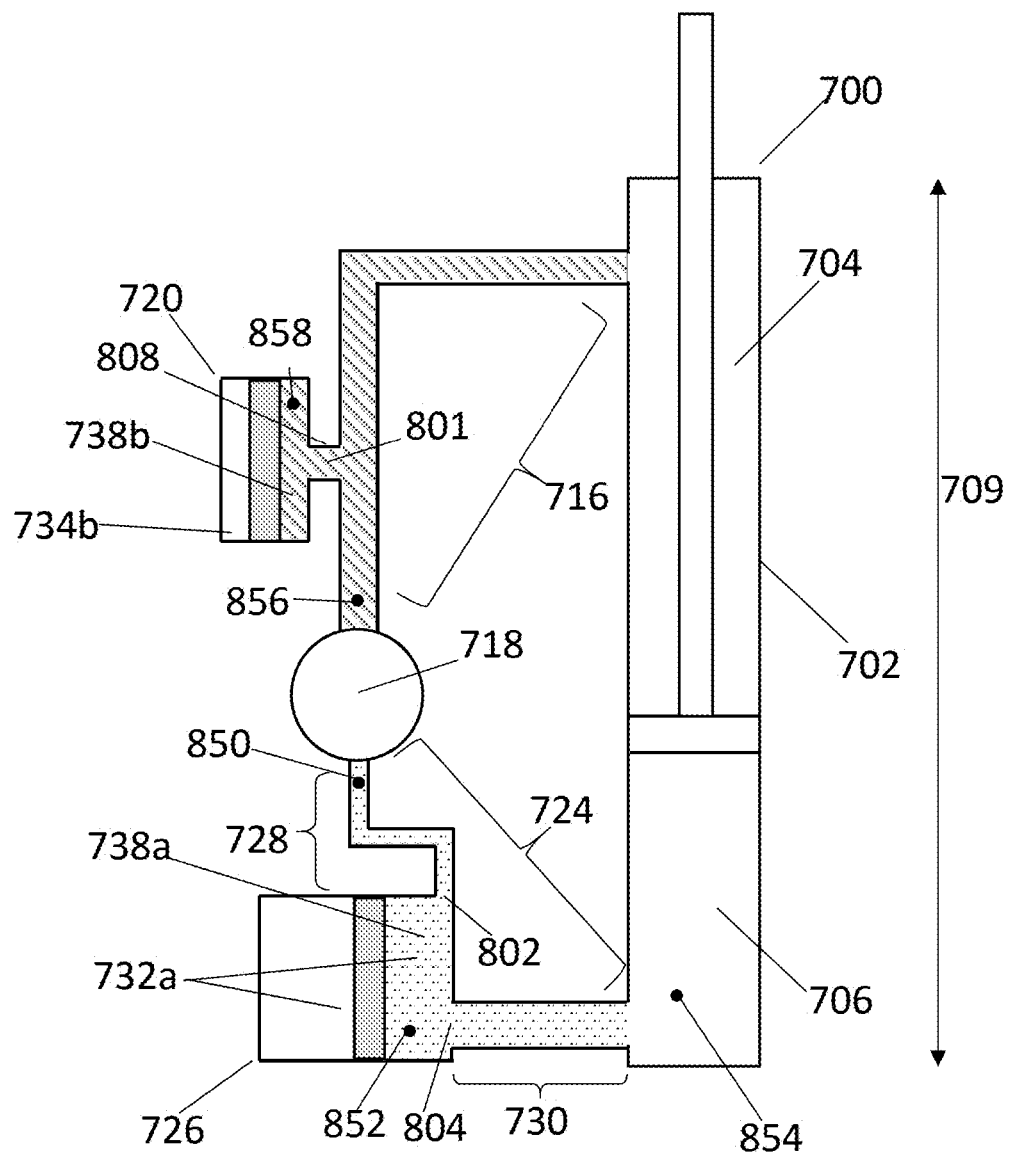
FIG. 8 illustrates a hydraulic system including a hydraulic actuator, a type-1 accumulator, and a type-2 accumulator.

FIG. 8 depicts an embodiment of a hydraulic system in which the compression-side accumulator 726 is a type-2 accumulator, and the extension-side accumulator 720 is a type-1 accumulator. As can be observed, in the illustrated embodiment the compression-side accumulator 726 includes a first port 802 that allows fluid to ingress/egress the compression-side working chamber 738a of the compression-side accumulator 726 from/to the compression-side first flow path 728, and a second port 804 that allows fluid to ingress/egress the compression-side working chamber 738a of the compression-side accumulator 726 from/to the compression-side second flow path 730, and may therefore be classified as a type-2 accumulator. The illustrated extension-side accumulator 720, on the other hand, has only one port 735b through which fluid can ingress or egress the extension-side working chamber 738b of the extension-side accumulator 720 (that is, in the illustrated embodiment, the extension-side accumulator 720 is a type-1 accumulator). In certain embodiments, both the extension-side accumulator 720 and compression-side accumulator 726 may be type-2 accumulators.

The inventors have recognized that overall system performance may depend on a first fluid impedance of the compression-side first flow path 728 in comparison with a second fluid impedance of the compression-side second flow path 730. Fluid impedance describes the resistance to fluid flow in a hydraulic system in response to a pressure difference between two points in the system. Without wishing to be bound to any particular theory, fluid impedance may be directly proportional to a value known as fluid inertance (sometimes referred to in the art as fluid inductance). Inertance of a flow path (and, therefore, impedance of the flow path) is directly proportional to density of the fluid occupying the flow path, an effective length of the flow path, and an effective cross sectional area of the flow path.

Without wishing to be bound to any particular theory, in the embodiment shown in FIG. 8, a first resonance frequency may be associated with pump induced displacement of fluid (e.g., due to pump ripple) in the compression-side first flow path 728 interacting with fluid in the compression-side accumulator 726. The first resonance frequency may be inversely related to a first inertance or first impedance of the compression-side first flow path 728. Likewise, a second resonance frequency may be associated with displacement of fluid in the compression-side second flow path 730 interacting with fluid in the compression-side accumulator 726. The second resonance frequency may be inversely related to a second inertance or second impedance of the compression-side second flow path 730. If these two resonances have similar or overlapping frequencies, they may combine in a constructive, near constructive, unpredictable, and/or undesirable fashion.

To avoid undesired interactions between the flow paths, inventors have determined that, in certain applications, it may be preferable to design the hydraulic system such that the compression-side first flow path 728 has a first inertance and/or first impedance that is different than a second inertance and/or second impedance of the compression-side second flow path 730, such that a first resonance associated with displacement of fluid in the compression-side first flow path 728 between the pump and compression side accumulator is spaced apart in frequency compared to a second resonance associated with displacement of fluid in the compression-side second flow path 730 between the compression side accumulator and the compression chamber. Particularly, inventors have determined that, in certain embodiments, systems in which the compression-side second flow path 730 has a second inertance or second impedance less than the first inertance or first impedance of the compression-side first flow path 728 may minimize undesirable ripple transfer while maintaining rapid response times. In certain embodiments, therefore, the flow paths and components may be configured and positioned such that the compression-side first flow path 728 may have a first inertance and/or a first impedance that is larger than a second inertance and/or second impedance of the compression-side second flow path 730. In certain embodiments, the first inertance and/or first impedance may be larger than the second inertance and/or second impedance by a factor of at least 5 or at least 10. In certain embodiments, the first inertance and/or first impedance may not exceed 1000 times the second inertance and/or second impedance, respectively. In certain embodiments, the first inertance is between 1E6 to 1E7 kg/m^4, and the second inertance is between 1E5 to 1E6 kg/m^4. Embodiments having values outside of these specific ranges are also contemplated to be within the scope of the present disclosure.

As inertance is proportional to ρl/A (where ρ is density of fluid, l is length of the flow path, and A is cross sectional area of the flow path), inertances (and, therefore, impedances and resonance frequencies) may be tuned by, for example, adjusting the relative lengths of the compression-side first flow path 728 and compression-side second flow path 730, and/or by adjusting a cross sectional area of the compression-side first flow path 728 relative to the compression-side second flow path 730. In certain embodiments, a first cross sectional area of a first portion of the compression-side first flow path 728 and/or first port 726 may be smaller than a second cross sectional area of a second portion of the compression-side second flow path 730 and/or second port 804, respectively. In certain embodiments, the second cross sectional area may be larger than the first cross sectional area by a factor of at least 2. In other embodiments, the second cross sectional area may be larger than the first cross sectional area by a factor of at least 5. In certain embodiments, the first cross-sectional area may be between 10 mm and 100 mm, and the second cross-sectional area may be between 100 mm to 300 mm. Alternatively or additionally, as fluid inertance is proportional to length, the compression-side accumulator 726 may be located such that the compression-side first flow path 728 has a first length that is larger than a second length of the compression-side second flow path 730. In certain embodiments, the first length may be larger than the second length by a factor of at least 1.5. Embodiments having values falling outside of the aforementioned specific ranges are also contemplated to be within the scope of the present disclosure.

In some embodiments, the inertance or impedance of one or more of the flow paths may be adjusted or altered by incorporating one or more inserts into the passage. Such an insert or inserts may be used to change the effective cross-sectional flow area and/or shape of the flow path over a portion or over the entire length of one or more flow paths. In this manner the configuration of the actuator system may be adjusted for example, during tuning of a design during development. Alternatively, inserts may be used to tune production units to maintain consistent performance in the field.

Figure 13:
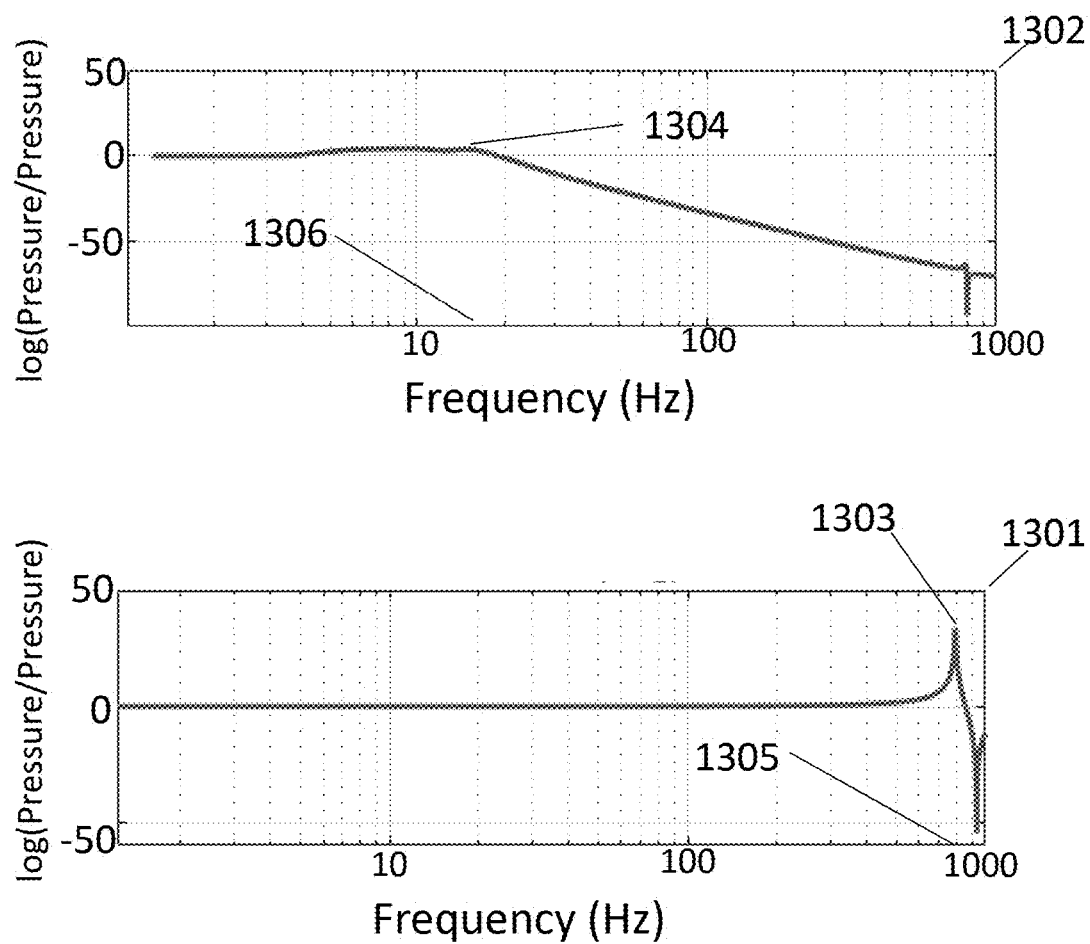
FIG. 13 illustrates TFmag of pressure/pressure transfer functions describing relationships between pressure at various points in a hydraulic system.

Since resonance frequency may be inversely related to the square root of inertance, designing the system such that the first inertance and/or impedance is larger than the second inertance and/or impedance may result in the first resonance frequency being lower (i.e., occurring at a lower frequency) than the second resonance frequency. As discussed previously, resonance frequencies may be represented as a local or global maximum in a plot of. For example, FIG. 13 depicts a first TFmag 1302 of a first transfer function that describes the relationship of pressure between a first point 850, located in the compression-side first flow path 728 of FIG. 8, and a second point 852, located in the working chamber 852 of the compression-side accumulator 726 of FIG. 8. As can be observed in FIG. 13, TFMag 1302 has a local maximum 1304 (which, in the specific embodiment, also happens to be a global maximum) at a frequency 1306 (a "first frequency") of approximately 15 Hz. FIG. 13 further depicts a second TFmag 1301 of a second transfer function that describes the relationship of pressure between the second point 852 and a third point 854 that is located in the compression chamber 706 of the actuator 700 of FIG. 8. As can be observed in FIG. 13, the second TFmag 1301 has a local maximum 1303 (which, in the specific embodiment, also happens to be a global maximum) at a frequency 1305 (a "second frequency") of 800 Hz. Since the second frequency 1305 is greater than (i.e., at a higher frequency than) the first frequency 1306, this suggests that impedance or inertance of the compression-side first flow path 728 in FIG. 8 is higher than impedance or inertance of the compression-side second flow path 730.

In certain embodiments, therefore, a first TFmag of a first transfer function describing a relationship between pressure at a first point 850, located in the pump 718, a port of the pump 718, or in the compression-side first flow path 728, and pressure at a second point 852, located in the internal volume 732a of the compression-side accumulator 726 (e.g., in the working chamber 738a or the contained chamber 734a), has a local and/or global maximum at a first frequency; and a second TFMag of a second transfer function describing a relationship between pressure at the second point 852 and pressure at a third point 854, located in the compression-side second flow path 730 or the compression chamber 706 of the actuator 700, has a local and/or global maximum at a second frequency, wherein the second frequency is higher than the first frequency. In certain embodiments, the first frequency is less than a first upper limit. In certain embodiments, the first upper limit may be 100 Hz, 90 Hz, 80 Hz, 60 Hz, 50 Hz, 30 Hz, 20 Hz, 15 Hz, 10 Hz, or 5 Hz. Additionally or alternatively, in certain embodiments, the first frequency is greater than a first lower limit. In certain embodiments, the first lower limit may be 0 Hz, 2 Hz, 5 Hz, or 10 Hz. In certain embodiments, the first frequency is in the range of 5-90 Hz. In certain embodiments, the second frequency is larger than a second lower limit. In certain embodiments, the second lower limit is 50, 100, 200, 300, 400, or 500 Hz. In certain embodiments, the second frequency is smaller than a second upper limit. In certain embodiments, the second upper limit is 800 Hz, 1000 Hz, or 1500 Hz. In certain embodiments, the second frequency is larger than the first frequency by a factor of at least 5. In certain embodiments, the second frequency is larger than the first frequency by a factor of at least 20. In certain embodiments, the second frequency is between 500 Hz-1000 Hz. Embodiments having values outside the aforementioned specifically stated ranges are also contemplated to be within the scope of the present disclosure.

Figure 14:
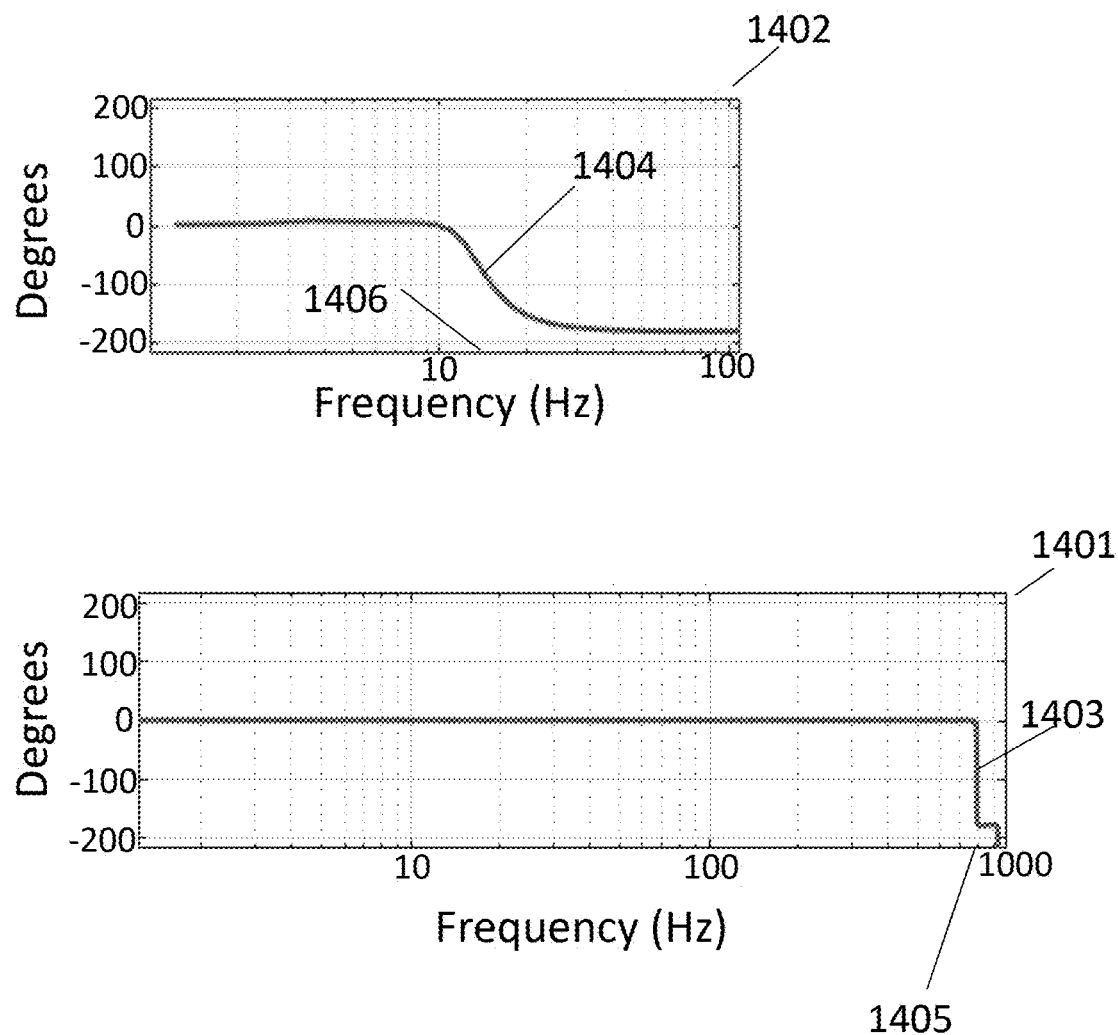
FIG. 14 illustrates TFph of various transfer functions describing relationships of pressure at various points in a hydraulic system.

Alternatively or additionally, as discussed previously, resonance frequencies of a hydraulic system may be determined by using a TFph of a transfer function. A TFph of a transfer function may have a value of +/−90° for pressure pulsations having a frequency corresponding to a resonance frequency of the system. For example, FIG. 14 illustrates a first TFph 1402 of a first transfer function describing a relationship between pressure at a first point 850 that is located in the compression-side first flow path 728 of FIG. 8 and pressure at a second point 852 that is located in the working chamber 852 of the compression-side accumulator 726. As can be seen from FIG. 14, the first TFph 1402 has a value of −90° 1404 at a first frequency 1406 of approximately 15 Hz. FIG. 14 further depicts a second TFph 1401 of a second e transfer function describing the relationship between pressure at the second point 852 and pressure at a third point 854 that is located in the second flow path 854 of FIG. 8. As can be seen from FIG. 14, the second TFph 1401 has a value of −90° 1403 at a second frequency 1405 of 800 Hz. As the second frequency 1405 is larger than the first frequency 1406, this indicates that a first inertance or first impedance of the compression-side first flow path 728 is larger than a second inertance or second impedance of the second flow path 854.

Therefore, instead of (or in addition to) using TFmag of various transfer functions to determine various resonance frequencies, it may be possible to determine the aforementioned first frequency and/or second frequency using TFph of the v transfer functions. TFph may be obtained by, for example, introducing pressure waves of various frequencies into a hydraulic system, and then detecting (for example, using pressure sensors) the phase of the pressure wave at various points in the hydraulic system.

In certain embodiments a TFph of a first transfer function describing a relationship between pressure at a first point 850, located in the pump 718, a port of the pump 718, or in the compression-side first flow path 728, and pressure at a second point 852, located in the internal volume 732a of the compression-side accumulator 726 (e.g., in the working chamber 638a or the contained chamber 634a), has a value of +/−90° at a first frequency, while a second TFph of a second transfer function describing a relationship between pressure at the second point 852 and pressure at the third point 854, located in the compression-side second flow path 730 or the compression chamber 706 of the actuator 700, has a value of +/−90° at a second frequency. In certain embodiments, the second frequency is higher than the first frequency. In certain embodiments, the first frequency is less than a first upper limit. In certain embodiments, the first upper limit may be 50 Hz, 100 Hz, 80 Hz, 60 Hz, 50 Hz, 30 Hz, 20 Hz, 15 Hz, 10 Hz, or 5 Hz. Additionally or alternatively, in certain embodiments, the first frequency is greater than a first lower limit. In certain embodiments, the first lower limit may be 0 Hz, 2 Hz, 5 Hz, or 10 Hz. In a preferred embodiment, the first frequency is in the range of 10-50 Hz. In certain embodiments, the second frequency is larger than a second lower limit. In certain embodiments, the second lower limit is 50 Hz, 100, 200, 300, 400, or 500 Hz. In certain embodiments, the second frequency is smaller than a second upper limit. In certain embodiments, the second upper limit is 800 Hz, 1000 Hz, or 1500 Hz. In certain embodiments, the second frequency is larger than the first frequency by a factor of at least 5. In a preferred embodiment, the second frequency is between 500 Hz-1000 Hz. Embodiments having values outside the aforementioned specifically stated ranges are also contemplated to be within the scope of the present disclosure.

Having discussed a first resonance frequency and a second resonance frequency, a third resonance frequency may be considered that is associated with interaction of fluid in the extension-side accumulator 720 and fluid in the extension flow path 716 or a portion thereof. For reasons described above, inventors have recognized that it may be desirable to design the extension-side accumulator such that the third frequency does not overlap with, and is sufficiently different from, the first frequency and/or the second frequency. Spacing out the resonance frequencies as described is preferable since it minimizes the risk of one resonance unpredictably and/or undesirably exciting another resonance in the system. In an embodiment, the extension-side accumulator may be configured and positioned such that the third resonance frequency is greater than the first frequency and less than the second frequency. The third resonance frequency may be adjusted by tuning the size of the extension-side accumulator 720 (e.g., the size of its internal volume 732b), a length of a neck 801 of the extension-side accumulator 720, and/or a cross sectional area of the neck 801. In certain embodiments, the neck 801 has a diameter between 4 mm and 10 mm, and a length less than 5 mm. In certain embodiments, a ratio of the diameter of the neck 801 over the length of the neck 801 is at least 0.8.

In certain embodiments, a third TFmag of a third transfer function describing a relationship between pressure at a fourth point 856, located in the extension flow path 716, pump 718, or a port of the pump 718, and pressure at a fifth point 858, located in the either (a) the extension-side working chamber 738b of the extension-side accumulator 720 or (b) the contained chamber 734b of the extension-side accumulator 720, may have a local or global maximum at the third frequency. Alternatively or additionally, in certain embodiments a third TFph of the third transfer function may be equal to +/−90° at the third frequency. In certain embodiments, the third frequency is greater than the first frequency and/or less than the second frequency. In certain embodiments, the third frequency is greater than the first frequency by a factor of at least 2, at least 5, at least 10, at least 15, at least 20, or at least 25. In certain embodiments, the third frequency is at least 100 Hz. In certain embodiments, the third frequency is below 500 Hz. Embodiments having values outside the aforementioned specific ranges are also contemplated to be within the scope of the present disclosure.

Figure 9:
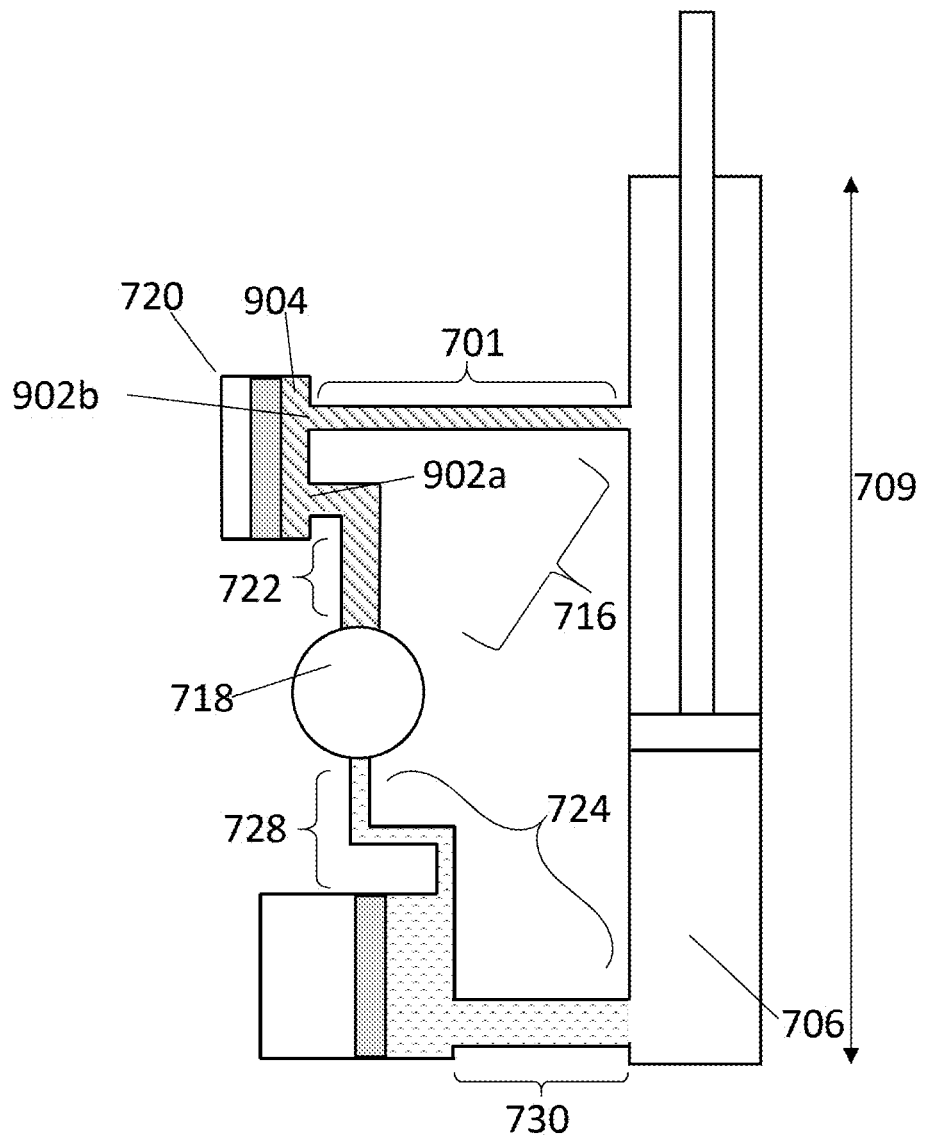
FIG. 9 illustrates a hydraulic system including a hydraulic actuator and two type-2 accumulators.

FIG. 9 shows an additional embodiment of the hydraulic system that is similar to that of FIG. 8, with the exception that the extension-side accumulator 720 of FIG. 9 is a type-2 accumulator, characterized by comprising two distinct ports—(i) a third port 902a and (ii) a fourth port 902b—through which fluid may ingress/egress the working chamber 904 of the extension-side accumulator 720 to/from the extension flow path 716 (shown with diagonal hatch marks). As illustrated, the extension flow path 716 comprises (a) the extension-side first flow path 722 that fluidically couples the pump 718 to the extension-side working chamber 904 of the extension-side accumulator 720, and (b) the extension-side second flow path 701 that fluidically couples the working chamber 904 of the extension-side accumulator 720 to the extension chamber 704 of the actuator 700. The extension-side first flow path 722 may be characterized as having a third length, third impedance, and/or third inertance. Likewise, the extension-side second flow path 701 may be characterized as having a fourth length, fourth impedance, and/or fourth inertance.

For reasons set forth above with regard to the compression-side accumulator, in embodiments with a type-2 extension-side accumulator 720, the system may be configured such that a third resonance frequency associated with the extension-side accumulator 720 interacting with fluid in the extension-side first flow path 722 is spaced apart from a fourth resonance frequency associated with the extension-side accumulator 720 interacting with fluid in the extension-side second flow path 701. As discussed above, this can be accomplished by tuning the inertances (e.g., by tuning lengths and/or cross-sectional areas of at least portions of each flow path) of the extension-side first flow path 722 and extension-side second flow path 701. In certain embodiments, the third length is larger than the fourth length. In certain embodiments, the third impedance and/or third inertance is/are larger than the fourth impedance and/or fourth inertance, respectively. In various embodiments, the third inertance is larger than the fourth inertance by a factor of at least 5× or at least 10×. In various embodiments, a fourth cross sectional area of a fourth portion of the extension-side second flow path is larger than a third cross sectional area of a third portion of the extension-side first flow-path. In various embodiments, the fourth cross sectional area is larger than the third cross-sectional area by a factor of at least 2; in certain embodiments, the fourth cross sectional area is larger than the third cross-sectional area by a factor of at least 5.

Figure 10:
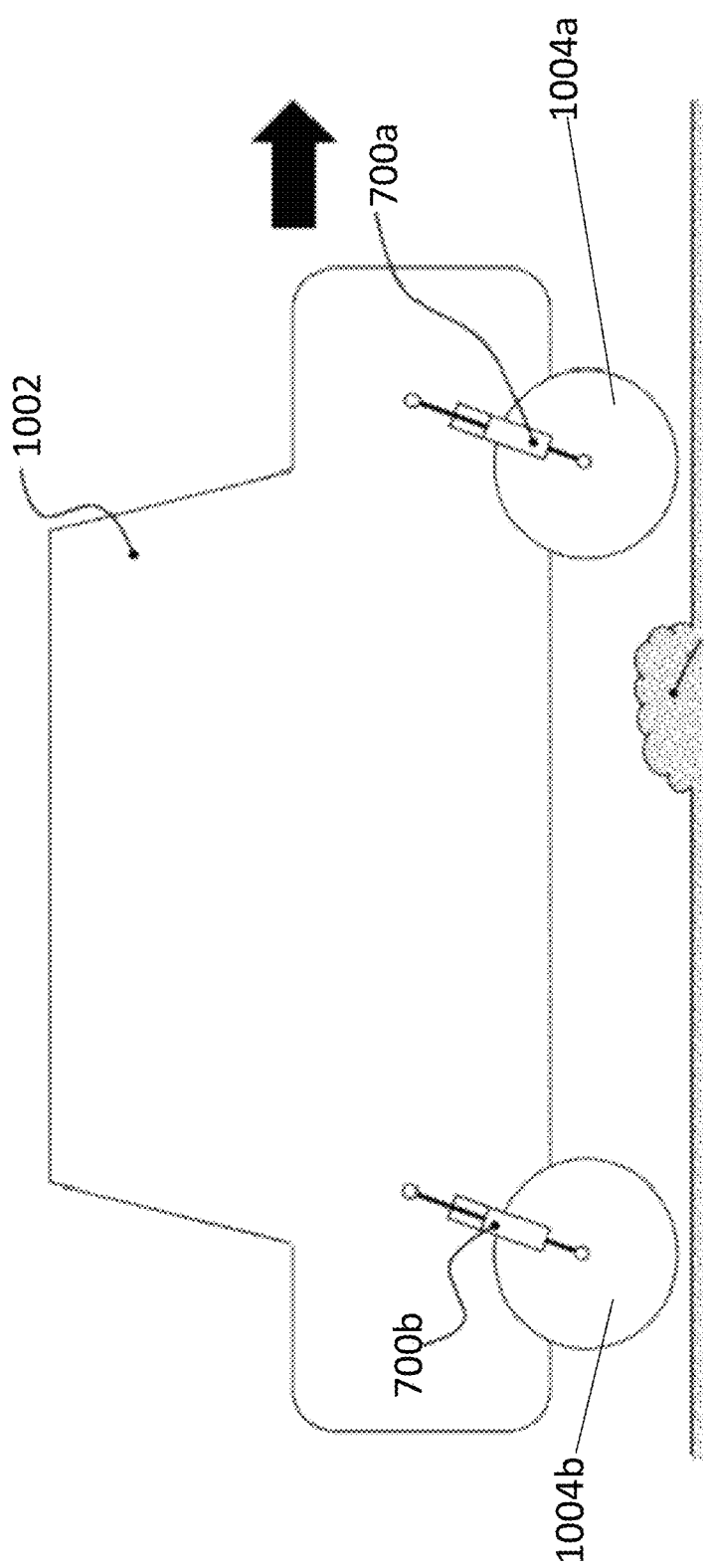
FIG. 10 illustrates a vehicle having a suspension system including hydraulic actuators.

In an automotive suspension application, a plurality of distributed hydraulic actuators may be utilized (e.g., in conjunction with, for example, a plurality of springs) to mechanically couple a wheel or wheel assembly of a vehicle to a body of the vehicle. FIG. 10 depicts an embodiment of a vehicle comprising a vehicle body 1002 and a plurality of wheels 1004a-b. In certain embodiments, the vehicle may comprise a plurality of hydraulic actuators 700a-b, with each actuator mechanically coupling each wheel 1004a-b to a portion of the vehicle body 1002. Such an active suspension system may allow for the distance between the vehicle body 1002 and each wheel 1004a-b to be independently adjusted. In current commercially available, hydraulic-based active suspension systems, two or more actuators 700a-b utilize a common, centralized pump and/or a common, centralized set of accumulators. Free space or free volume near a wheel 1004a-b is highly limited; therefore, locating a common, shared pump in a central location that is remote from the wheels 1004a-b may reduce size constraints on the pump.

Returning now to FIG. 8, in some embodiments, locating the pump 718 in a centralized location remote from the actuator 700 may necessitate a relatively long compression flow path 724 (indicated by horizontal hatch marks) and/or extension flow path 716 (indicated by diagonal hatch marks). Inventors have recognized that such long flow paths may degrade response time such that the system is not able to respond fast enough to certain vehicle events (such as driving over bumps, potholes, turning, braking, etc.). Accordingly, inventors have determined that, in certain embodiments, response time may be significantly improved over current commercially available active suspension systems by minimizing a length of the compression flow path 724 and/or extension flow path 716. In certain embodiments, the length of the compression flow path 724 and/or extension flow path 716 may be less than a length 709 of the actuator housing 702. In certain embodiments, the sum of the length of the compression flow path 724 and the length of the extension flow path 716 may be less than the length 709 of the actuator housing 602. These relatively short flow paths may be achieved by locating individual pumps and accumulators in each wheel well, such that each actuator 700 is associated with its own local pump 718, compression-side accumulator 726, and extension-side accumulator 720. Therefore, in certain embodiments, a vehicle includes a plurality of wheels, each wheel located in a wheel well, wherein each wheel well includes a localized actuator 700, a localized pump 718, a localized compression-side accumulator 726, and a localized extension-side accumulator 720. These embodiments may optimize response time, but may require more space since hydraulic components are localized at the wheel well rather than being remotely located. In other embodiments, in which space constraints are prioritized over response time, two or more actuators 700a-b may share a common, centralized pump 718, a common centralized compression-side accumulator 726, and/or a common centralized extension-side accumulator 720. The improved performance as described with reference to FIG. 8 may also be achieved with the embodiments illustrated in FIGS. 7, 9-11 and/or described herein.

In order to minimize the length (and, therefore, inertances) of one or more flow paths, a housing 733a of the compression-side accumulator 720 and/or housing of the extension-side accumulator may share one or more common components (e.g., one or more common walls) with the actuator housing 702. Alternatively or additionally, in certain embodiments, the housing 733a of the compression-side accumulator and/or housing of the extension-side accumulator may be directly attached to the actuator housing 702.

Figure 11A:
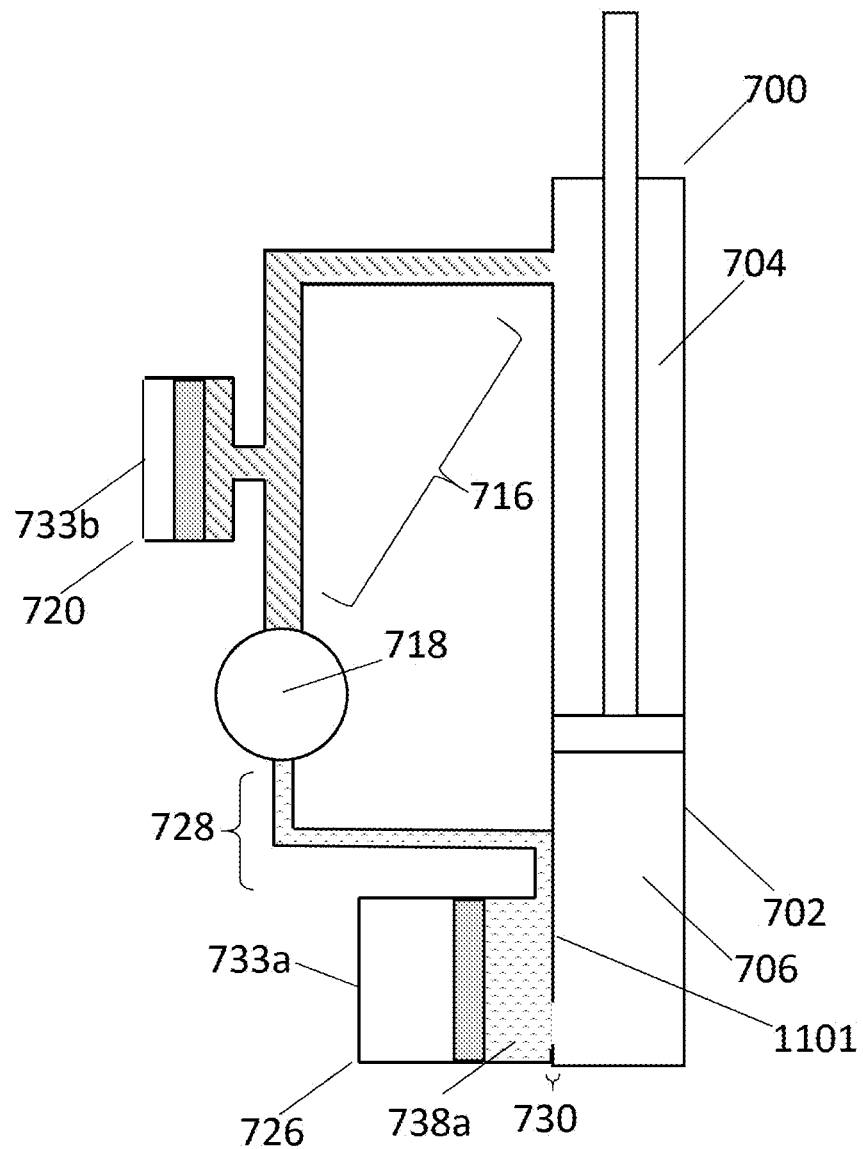
FIG. 11A illustrates another embodiment of a hydraulic system including a hydraulic actuator and two accumulators.

FIG. 11A illustrates an embodiment of a hydraulic system similar to that of FIG. 8, wherein the housing 733a of the compression-side accumulator 720 and the actuator housing 702 share at least one common wall 1101. In the illustrated embodiment, the length of the compression-side second flow path 730 is minimized, such that the length corresponds only to the thickness of the wall of the actuator housing 702. Likewise, in certain embodiments the housing 733b of the extension-side accumulator 720 and the actuator housing 700 may share at least one common portion. In certain embodiments, the housing 733b of the extension-side accumulator 720 may be directly attached to the actuator housing

700. In certain embodiments, the extension-side accumulator 720 may be integrated into the pump 718, such that a housing of the pump 718 and the housing 733*b* of the extension-side accumulator 720 share at least one common portion.

Figure 11B:
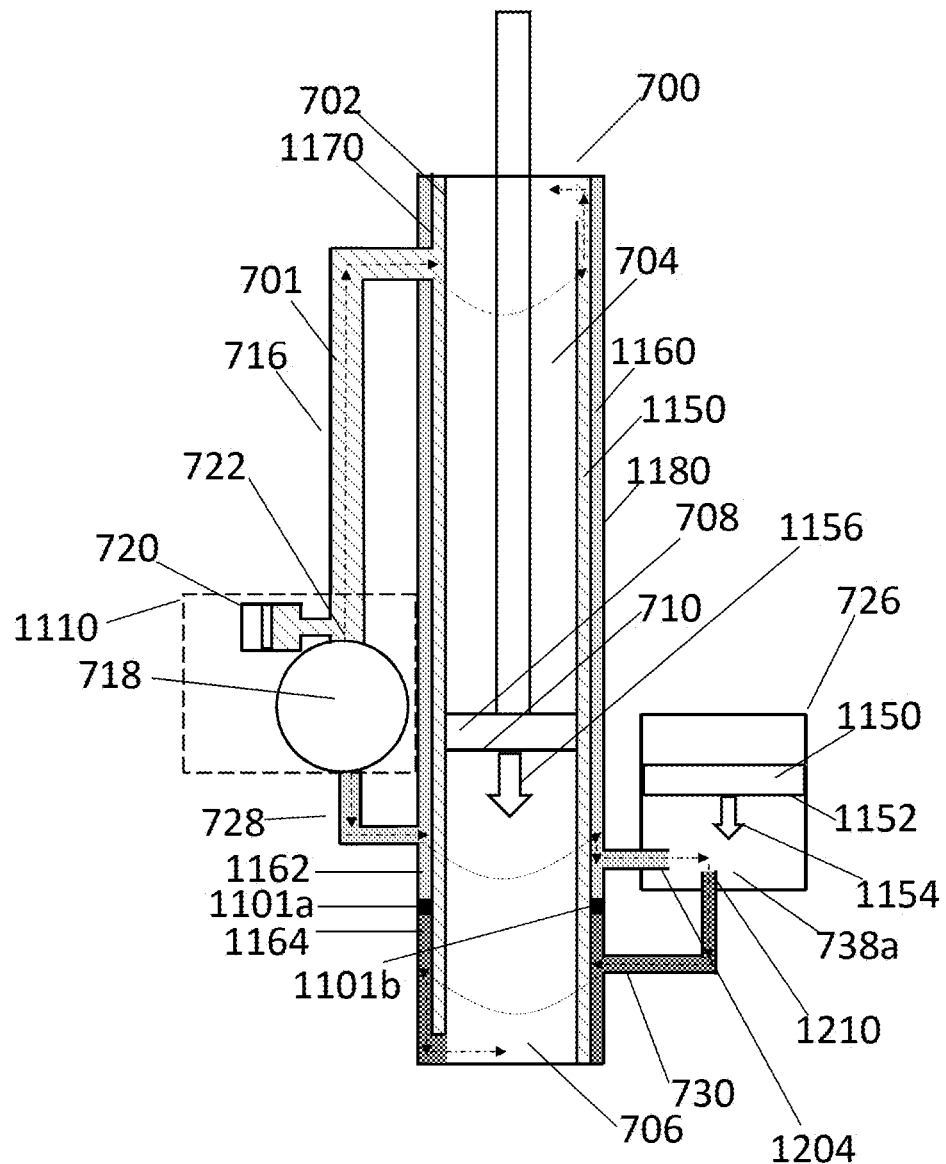
FIG. 11B illustrates another embodiment of a hydraulic system including a hydraulic actuator and two accumulators.

Given the space constraints of a vehicle, especially of a wheel well of a vehicle, in certain embodiments it may be desired to locate the pump 718 and at least one of the compression-side accumulator 726 or the extension-side accumulator 720 on opposing sides of the actuator 700. FIG. 11B illustrates an embodiment in which the pump 718 and extension-side accumulator 720 are located on a first side of the actuator 700 and the compression-side accumulator 726 is located on a second side of the actuator 700. The compression flow path (shown in dark gray and light gray fill) includes the compression-side first flow path 728, which fluidically couples the pump 718 to the compression-side working chamber 738*a* of the compression-side accumulator 726 is shown in light gray; and the compression-side second flow path 730, which fluidically couples the compression-side working chamber 738*a* of the compression-side accumulator 726 to the compression chamber 706 of the actuator 700 is shown in dark gray. The hydraulic system further includes the extension flow path 716 (shown with gray diagonal lines), which fluidically couples the pump 718 to the extension chamber 704 of the actuator 700. Dotted arrows indicate how fluid communication may occur.

In certain embodiments, the hydraulic system may include one or more annular cavities that at least partially encompass the actuator housing. An annular cavity is understood to mean a fluid filled volume at least partially bounded by two concentric ellipses (e.g., circles) or arcuate portions thereof. Utilizing such annular flow paths potentially allows for more compact and/or lightweight packaging, since such a design allows the actuator housing itself to serve multiple functions by both (i) at least partly defining the compression chamber or extension chamber of the actuator, as well as (ii) at least partly defining one or more annular cavities. These annular cavities may be formed by one or more outer housings or outer housings that at least partially surround the actuator housing 702, such that a gap or cavity exists between the outer housing or outer housing and an outer surface of actuator housing 702.

In other embodiments, the hydraulic system may include a plurality of annular cavities. As can be seen, the extension flow path (shown with diagonal hatch marks) includes first outer cavity 1150 (e.g., an annular or semi annular cavity) that encircles at least a portion of the extension chamber 704 and/or compression chamber 706. Likewise, the compression flow path (shown with dark gray and light grey fills) includes a second outer cavity 1160 (e.g., an annular or semi-annular cavity). In other embodiments, the hydraulic system may include only a single annular cavity (e.g., the first outer cavity 1150). In certain embodiments, a portion of at least one of, at least two of, at least three of, or at least four of the group consisting of (i) the compression-side first flow path 728, (ii) the compression-side second flow path 730, (iii) the extension-side first flow path 722, and (iv) the extension-side second flow path 701 is/are partly defined by the actuator housing 702 (e.g., the flow paths may include a cavity that is bounded on at least one side by a portion of the actuator housing 720). In certain embodiments, at least one of, at least two of, at least three of, or at least four of the aforementioned group of flow paths may include an annular or semi annular cavity that at least partially encircles at least a portion of the actuator housing 702.

In certain embodiments, the annular cavity (such as, for example, the first outer cavity 1150) may be utilized to create a flow path (e.g., an extension flow path, shown by diagonal hatch marks) that, at least at portions, has a length much larger than a gap forming the annular cavity (e.g., the gap between the outer surface of the actuator housing 702 and the inner surface of the first outer housing 1170, or the gap between the first outer housing 1170 and the second outer housing 1180). Such flow paths may exhibit a pressure drop vs. flow rate relationship that, at least for certain flow rates, behaves linearly. Further, the fluid inertance introduced by such a flow path may allow for fluid in the annular cavity or a portion thereof to interact with a compliance of fluid in the surrounding volumes to introduce an additional resonance frequency. Due in part to this additional resonance, pressure pulsations having frequencies higher than this additional resonance frequency may be attenuated during propagation from the pump 718, through the annular cavity (e.g., the first outer cavity 1150), and to the actuator (e.g., the extension chamber 704 of the actuator). In certain embodiments, the additional resonance frequency falls in a range between 150 Hz to 250 Hz In the illustrated embodiment of FIG. 11B, the first outer cavity 1150 has an annular cross section that is bound by an outer surface of the actuator housing 702 and the inner surface of a first outer housing 1170 that encircles at least a portion of actuator housing 702. Inventors have recognized that, at least for embodiments in which the actuator housing 702 and first outer housing 1170 are cylindrical, inertances (which depend on cross-sectional area of a flow path, as described above) and/or restrictions in the first outer cavity 1150 may be adjusted by changing an inner diameter of the first outer housing 1170 relative to an outer diameter of the actuator housing 702, such that the cross-sectional area of the first outer cavity 1150 is varied.

Likewise, in the illustrated embodiment of FIG. 11B, the second outer cavity 1160 has an annular cross section that is bound by an outer surface of the first outer housing and an inner surface of a second outer housing 1180 that encircles at least a portion the first outer housing. At least for embodiments in which the first outer housing 1170 and second outer housing 1180 are cylindrical, inertances (which depend on cross-sectional area of a flow path, as described above) and/or restrictions in the second outer cavity 1160 may be adjusted by changing an inner diameter of the second outer housing 1180 relative to an outer diameter of the first outer housing 1170, such that the cross-sectional area of the second outer cavity 1160 is varied.

In certain embodiments, a sleeve (not pictured) may be inserted into at least portion of one of the annular cavities (e.g., into the first outer cavity 1150 and/or second outer cavity 1160), thereby reducing the gap between the actuator housing 702 and the first outer housing 1170, or the gap between the first outer housing 1170 and the second outer housing 1180. In certain embodiments, the sleeve may be in physical contact with at least a portion of the outer surface of the actuator housing 702. In certain embodiments, the sleeve may be in physical contact with at least a portion of a surface of the first outer housing. In certain embodiments, the sleeve may be in physical contact with at least a portion of a surface of the second outer housing. The thickness of the sleeve may be controlled in order to vary the annular cross-sectional area of the annular cavity, thereby allowing for control of various properties (e.g., inertance, impedance, restriction).

In certain embodiments, the difference of the inner diameter of the first outer housing 1170 and the outer diameter of the actuator housing 702 may be greater than 0.4 mm and less than 1 mm. In certain embodiments, the difference of the inner diameter of the first outer housing 1170 and the sum of the outer diameter of the actuator hosing 702 and the thickness of a sleeve inserted into the first outer cavity 1150 may be greater than 0.4 mm and less than 1 mm. In certain embodiments, the length of the first outer cavity 1150 may be larger than 50 mm and less than 100 mm. For all ranges given above, alternative embodiments having values falling outside of the exact stated ranges may be envisioned that are within the scope of this disclosure.

Figure 26:
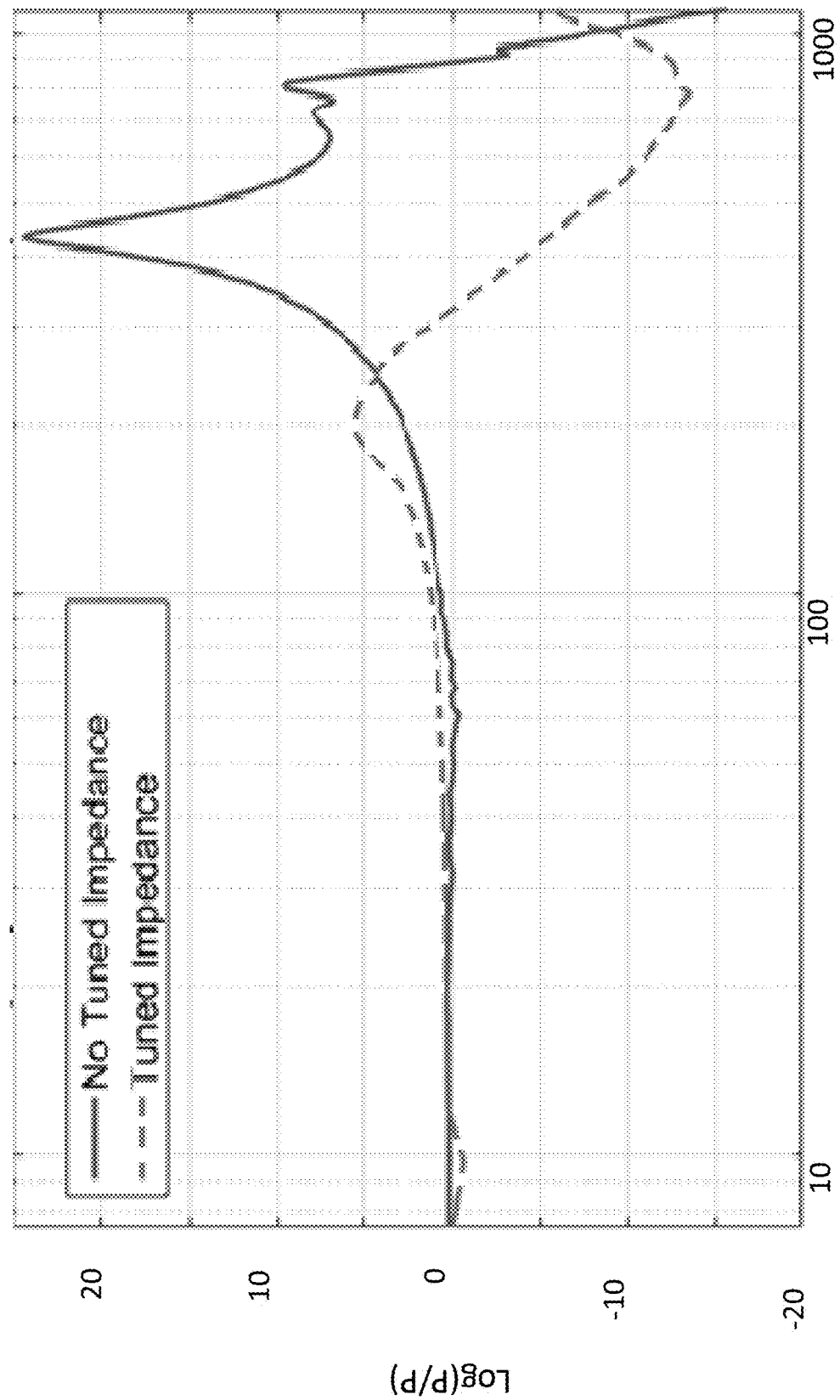
FIG. 26 illustrates empirical results obtained from evaluation of two different hydraulic systems.

FIG. 26 illustrates two TFmags of two pressure/pressure transfer functions from two different hydraulic systems of the type shown in FIG. 11*b*. The only difference between the two systems was the annular cross-sectional area of the first outer cavity 1150. Particularly, the annular cross-sectional area (and therefore inertance and impedance) of the first outer cavity 1150 was adjusted by inserting a sleeve into the first outer cavity 1150. Each pressure/pressure transfer function describes a relationship between pressure at the pump 718 and pressure at a point in the extension chamber 704 in the respective hydraulic system. As can be seen by comparing the two TFmags in FIG. 26, tuning of the cross-sectional area (and therefore inertance and impedance) of the first outer cavity 1150 may significantly improve attenuation capability of the system.

The illustrated embodiment of FIG. 11*b* further includes an annular dam 1101*a-b* that divides the outer annular cavities 1160 into an upper section 1162 (that is part of the compression-side first flow path 728) and a lower section 1164 (that is part of the compression-side second flow path 730). The annular dam serves as a barrier that separates fluid in the upper section 1162 of the outer annular cavity 1160 from fluid in the lower section 1164 of the outer annular cavity 1160. In certain embodiments, the inner cavity 1150 may include one or more annular dams that divide the inner cavity 1150 into various sections. In certain embodiments, the annular dams 1101*a-b* are elastomeric or rubber o-rings.

In certain embodiments, one or more components may share a common housing with the pump. This type of packaging may allow for more compact systems and/or may reduce the number of welds or other attachments. For example, as shown in FIG. 11B, the pump 718 and/or extension-side accumulator 720 may be encased in a common pump housing 1110.

In certain embodiments in which the extension-side accumulator is a type-1 accumulator, the extension-side accumulator 720 may be located such that the extension-side first flow path is shorter and/or has an inertance less than the extension side second flow path 701. In certain embodiments, as shown, the pump housing 1110 may overlap with a portion of the actuator housing 702, such that the two housings share a common wall or structural member. In certain embodiments, the pump housing 1110 may be directly attached to at least a portion of the actuator housing 702. In certain embodiments, as shown in FIG. 11B, the extension-side accumulator 726 may comprise an accumulator piston 1150 having a first surface 1152 exposed to fluid in the compression-side working chamber 738*a* of the extension-side accumulator 726. In certain embodiments, a first direction 1154 that is normal to the first surface 1152 of the accumulator piston 1150 may be parallel to a second direction 1156 that is normal to the first face 710 of the piston 708 of the actuator 700.

As described above, various inertances of respective flow paths in a hydraulic system may impact overall system performance in a variety of metrics. As inertance depends, in part, on both the length and/or cross-sectional area of a flow path or portion thereof, varying one or more inertance in the hydraulic system in some cases may require substantial redesign (e.g., relocation of various components) of the overall system. Such redesign in turn may require re-tooling manufacturing equipment, resulting in extended turnarounds to accommodate the changes. Therefore, inventors have recognized that it may be beneficial to design a type-2 accumulator such that inertances of the various flow paths into/out of the working chamber of the accumulator may be adjusted without requiring redesign of the overall hydraulic system (e.g., relocation of various components).///

Figure 12A:
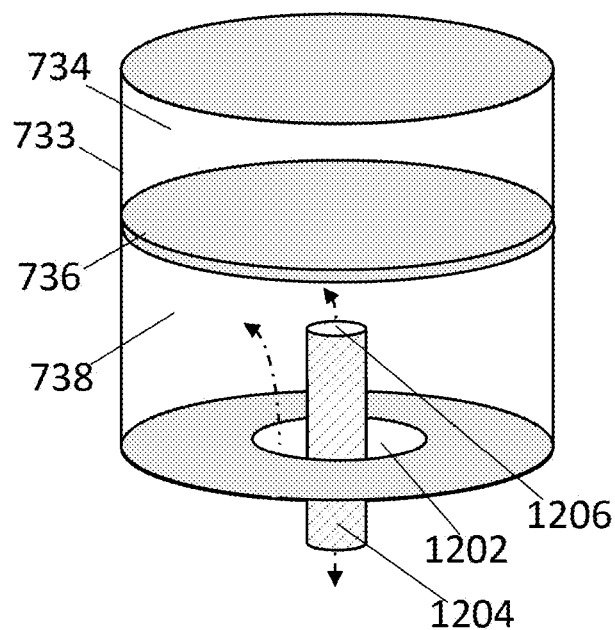
FIG. 12A illustrates an embodiment of a type-2 accumulator.
Figure 12B:
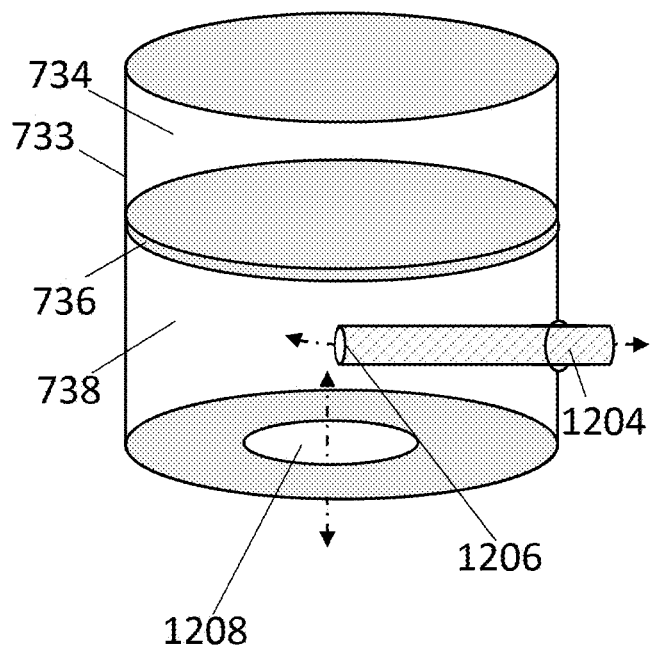
FIG. 12B illustrates another embodiment of a type-2 accumulator.
Figure 12C:
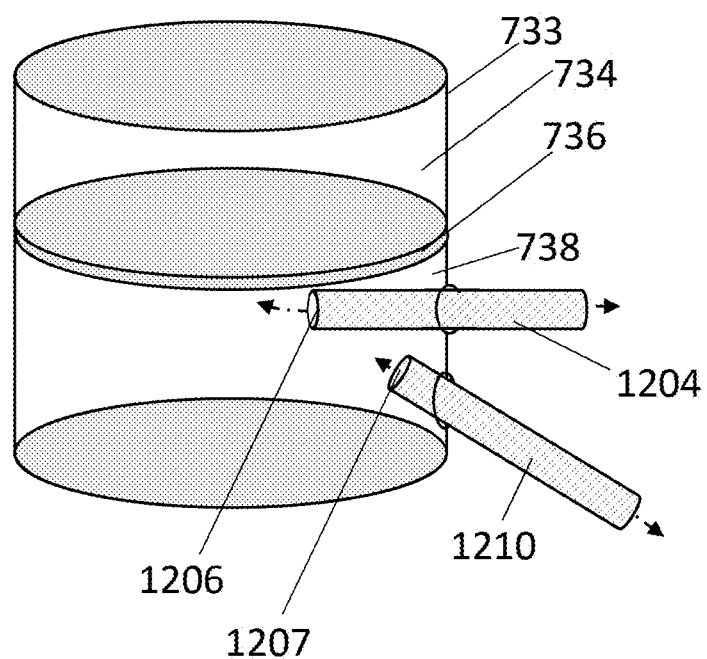
FIG. 12C illustrates another embodiment of a type-2 accumulator.

FIG. 12A-12C depict various embodiments of type-2 accumulators in which various inertances may be adjusted by adjusting design parameters of the accumulator, such that redesign of an overall hydraulic system may not be required. FIG. 12A depicts one embodiment of a type-2 accumulator. In the illustrated embodiment, the accumulator 1200 includes a cylindrical housing 733 defining an internal volume. In various embodiments, the housing 733 and/or internal volume may have any geometry (e.g., spherical, cubical, cuboidal, etc.). In certain embodiments, a piston 736 (or other barrier, e.g. a bladder) inserted into the internal volume separates fluid (e.g., gas) in a contained chamber 734 from fluid (e.g., hydraulic fluid) in a working chamber 738. As shown in the illustrated embodiment, the housing 733 defines an opening 1202 therethrough, the opening having a first area. A tube 1204 having a wall defining a bore 1206 may be inserted into the opening 1202, such that at least a portion of the outer surface of the wall of the tube 1204 is exposed to fluid in the working chamber 738. A cross-sectional area of the tube 1202 is understood to include a cross-sectional area of the bore 1206 plus a cross-sectional area of the solid wall encircling (or otherwise defining) the bore 1206. In various embodiments, the wall of the tube may be flexible or rigid, as the disclosure is not so limited. In various embodiments, the tube wall may be a metal, a ceramic, a plastic, or a combination thereof.

Continuing with FIG. 12A, since the cross-sectional area of the tube 1204 is less than the first area of the opening 1202, a free space exists around the wall of the tube 1204 through which fluid may ingress/egress (as shown by dotted arrows) the working chamber 738. Fluid may also ingress/egress (as shown by dotted arrows) the working chamber 738 by passing through the bore 1206 of the tube 1204. The free space around the wall of the tube 1204 may be in direct fluid communication (via, for example, a hose or pipe) with a hydraulic system at one point, while the bore 1206 of the tube 1204 may be in direct fluid communication with the hydraulic system at another point. The accumulator 1200 therefore includes two distinct, non-overlapping paths (e.g., through the free space around the tube 1204, and through the bore 1206 of the tube 1204) into which fluid may ingress/egress the working chamber 738, and may therefore be classified as a type-2 accumulator.

The embodiment of the accumulator illustrated in FIG. 12A, or variants thereof, may be integrated into any of the previously described hydraulic systems that include a type-2 accumulator. For example, the accumulator shown in FIG. 12A may be integrated into the hydraulic system of FIG. 8 as the compression side accumulator 726, in which case the bore 1206 of the tube 1204 may be in direct fluid communication with, for example, the compression-side second flow path 730 and the free space around the tube 1204 may be in direct fluid communication with, for example, the compression-side first flow path 728 (or vice versa).

Advantageously, inertances or impedances of various flow paths into/out of the working chamber 738 of the accumulator shown in FIG. 12A may be tuned without requiring redesign or relocation of the overall hydraulic system. Particularly, impedances and/or inertances may be controlled by adjusting the cross sectional area of the opening 1202, the cross-sectional area of the tube 1204, the cross-sectional area of the bore 1206 of the tube 1204, and/or the thickness of the wall of the tube. These parameters in turn may be adjusted by modifying a diameter of the opening 1202, an outer diameter of the wall of the tube 1204, and/or an inner diameter of the wall of the tube 1204. Inertance of fluid in the bore 1206 of the tube 1204 may further be adjusted by modifying the length of the tube 1204. In certain embodiments, the opening 1202 is circular and the tube 1204 has a circular cross section, in which case any free space surrounding the tube 1204 is annular. However, in other embodiments the opening 1202, the second opening 1208, the tube 1206, and the free space around the tube 1206 may have any cross sectional geometry, as the disclosure is not so limiting.

FIG. 12B illustrates another embodiment of a type-2 accumulator, wherein the tube 1204 is inserted through a first opening in the accumulator housing 733, and the accumulator comprises a second opening 1208 through the accumulator housing 733. In certain embodiments, the second opening 1208 may be through a side or base of the accumulator housing 733. The embodiment of the accumulator illustrated in FIG. 12B may be integrated into any of the previously described hydraulic systems that include a type-2 accumulator. For example, the accumulator shown in FIG. 12b, or variants thereof, may be integrated into the hydraulic system of FIG. 8 as the compression side accumulator 726, in which case the bore 1206 of the tube 1204 may be in direct fluid communication with, for example, the compression-side second flow path 730 and the second opening 1208 may be in direct fluid communication with, for example, the compression-side first flow path 728 (or vice versa).

Advantageously, inertances or impedances of various flow paths into/out of the working chamber 738 of the accumulator shown in FIG. 12B may be tuned without requiring redesign or relocation of the overall hydraulic system. Particularly, inertances and/or impedances may be controlled by adjusting the diameter or cross-sectional area of the opening 1208, the diameter or cross-sectional area of the bore 1206 of the tube 1204, and/or the length of the tube 1204. In certain embodiments, both the second opening 1208 and the cross section of the bore 1206 of the tube 1204 are circular 1208. However, in other embodiments the second opening 1208 and/or the bore 1204 of the tube 1206 may have any cross sectional geometry, as the disclosure is not so limiting.

FIG. 12C illustrates yet another embodiment of a type-2 accumulator. In the illustrated embodiment, the accumulator comprises a first tube 1204 having a wall defining a first bore 1206. As shown in FIG. 12C, the first tube 1204 may be inserted into a first opening through the accumulator housing 733, such that at least a portion of an outer surface of the wall of the tube 1204 is exposed to fluid in the working chamber 738. In the illustrated embodiment, the accumulator housing 733 comprises a second opening 1208 therethrough, through which a second tube 1210 having a second bore 1207 has been inserted such that at least a portion of the outer surface of the wall of the second tube 1210 is exposed to fluid in the working chamber 738 of the accumulator 733. In certain embodiments, as shown, the first tube 1204 and second tube 1210 may be inserted at different angles relative to a direction normal to a surface of the barrier 736 exposed to fluid in the working chamber 738. In certain embodiments, the difference may be greater than 0° and less than 90°. In certain embodiments, as illustrated in FIG. 12C, both tubes may be inserted through the side of the accumulator housing; in other embodiments, one of the first tube 1204 and second tube 1210 may be inserted through a side of the accumulator housing 733 and the other tube may be inserted through a base of the accumulator housing 733; in yet other embodiments, both the first tube 1204 and second tube 1210 may be inserted through the base of the accumulator housing 733.

Continuing with FIG. 12C, two distinct, non-overlapping paths exist through which fluid may ingress/egress the working chamber 738—(i) through the first bore 1206 of the first tube 1204, and (ii) through the second bore 1207 of the second tube 1210. The illustrated embodiment may therefore be considered a type-2 accumulator. The embodiment of the accumulator illustrated in FIG. 12c may be integrated into any of the previously described hydraulic systems that include a type-2 accumulator. For example, the accumulator shown in FIG. 12c may be integrated into the hydraulic system of FIG. 11b as the compression side accumulator 726, in which case the bore 1206 of the first tube 1204 may, for example, make-up a portion of the compression-side first flow path 728 (shown in light gray shading) and the bore 1207 of the second tube 1210 may, for example, make-up a portion of the compression-side second flow path 730.

Advantageously, inertances or impedances of various flow paths into/out of the working chamber 738 of the accumulator shown in FIG. 12c may be tuned without requiring redesign or relocation of the overall hydraulic system. Particularly, inertances and/or impedances may be controlled by adjusting the length of the first tube 1204, the length of the second tube 1210, the diameter or cross-sectional area of the first bore 1206 of the first tube 1204, and/or the diameter or cross-sectional area of the second bore 1207 of the second tube 1210. In certain embodiments, a second cross sectional area of the second bore 1207 is larger than a first cross sectional area of the first bore 1206. In certain embodiments, the second cross sectional area is larger than the first cross sectional area by a factor of at least 2. In certain embodiments, the second cross sectional area is larger than the first cross sectional area by a factor of at least 5. Alternatively or additionally, the first tube 1204 may have a first length that is greater than a second length of the second tube 1210. In certain embodiments, the first length is larger than the second length by a factor of at least 5. In certain embodiments, the first length is larger than the second length by a factor of at least 10. Inventors have found that the aforementioned ratios may result in hydraulic systems, such as that of FIG. 11b, having the desired relative inertances described elsewhere in this disclosure.

Evaluations and Examples

Figure 23:
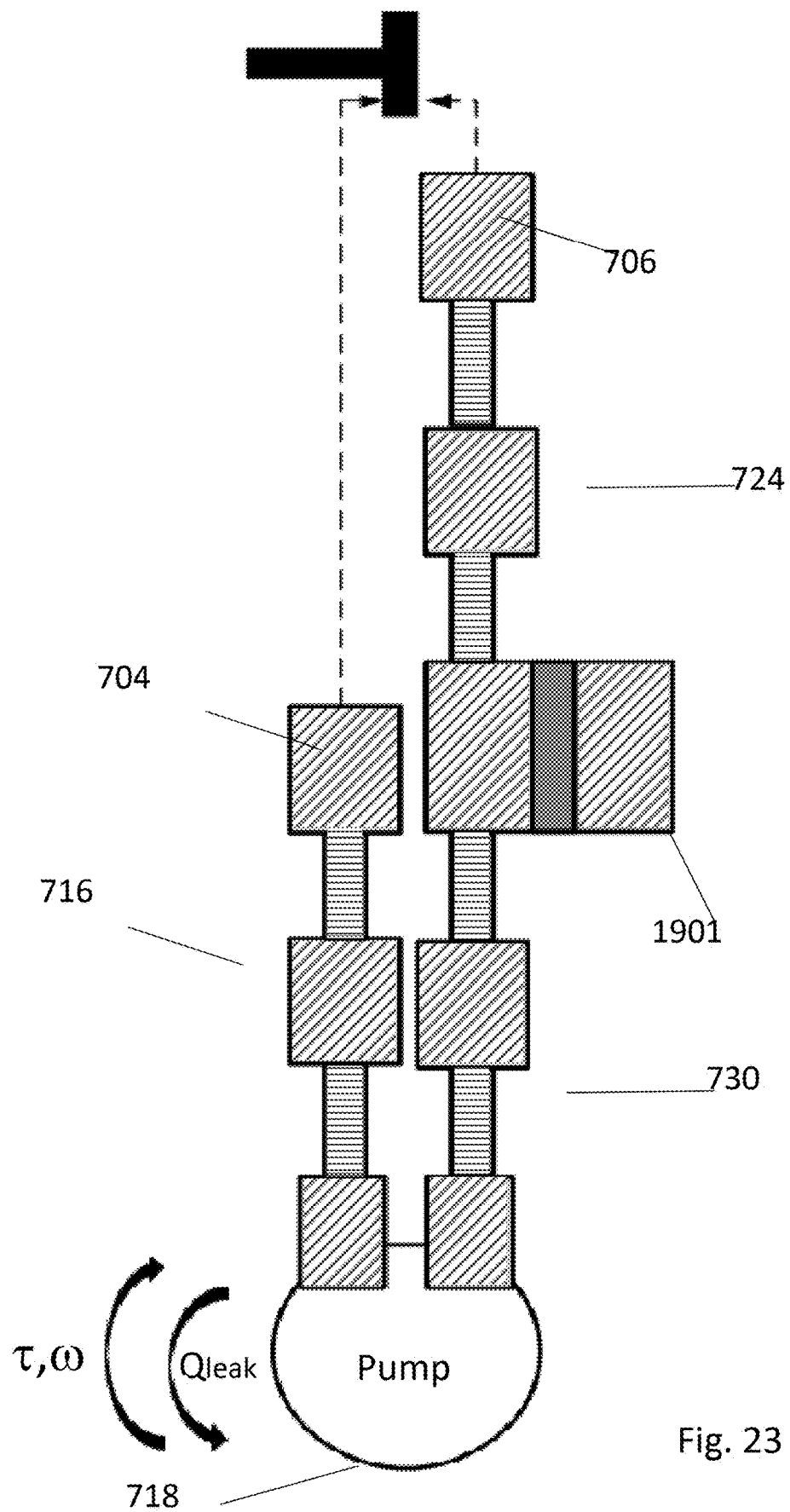

For purposes of descriptive clarity, the fluid passages in various schematic and diagrammatic illustrations herein are sometimes depicted as simple channels having a given length and cross section from which fluid inertance can be reasonably predicted for approximate modelling and design. Further, in evaluating the various hydraulic systems described herein, various flow paths of the hydraulic system may be treated as an interconnected combination of individual inertance elements and compliance elements. For example, the simple hydraulic system of FIG. 19a may be considered a combination of the elements as shown in FIG. 23, in which compliance elements have been depicted with diagonal hatch marks and inertance elements depicted with horizontal hatch marks. Further, as would be understood by one of ordinary skill, inertance elements may be described by a mass and associated pressure areas, and compliant elements may be described by a volume and associated stiffness. Modifications to the theoretical model shown in FIG. 23 which describe the various additional embodiments described herein may be based on a combination of known fluid mechanical principles and empirical testing.

As a result of empirical tests and evaluations of empirically and analytically derived models, inventors have recognized that integrated hydraulic systems, understood to refer to hydraulic systems in which multiple components may be integrated into common housings or otherwise closely-coupled, may be complex and/or it may be difficult to predict behavior and/or properties using a priori information. For example, in the integrated or highly closely-coupled systems described herein, rather than each hydraulic component behaving as an independent functional element connected by long lengths of hose or pipe, the various components in a closely coupled systems are prone to interact with each other in complex ways that can be advantageous ("synergistic") or disadvantageous ("anti-synergistic"). For example, as will be shown herein, for those disclosed hydraulic systems comprising two distinct accumulators, interactions may arise between the two accumulators that may be synergistic and thus advantageous (e.g., the two accumulators may interact in a way such that pulsations are attenuated to a level beyond the simple vector sum of each accumulator's attenuation capability at any given frequency), or interactions may arise that are anti-synergistic and therefore disadvantageous (e.g., the combination of two accumulators may interact such that the total pulsation attenuation may be less than the attenuation of a system having only one of the two accumulators). For example, oscillations in one accumulator may excite natural frequencies in another accumulator.

Inventors have also determined, for example, that, among other factors, the relative location of each accumulator (relative to the pump and/or the actuator) can significantly affect whether certain interactions are synergistic or anti-synergistic.

In another consideration, further complexities are brought to bear with the recognition that various features and properties of an actuator system may influence the response time of a given hydraulic actuator system. Properties that may influence response time include, for example, moment of inertia of the motor, rod mass, compliances of various elements, and the sum of inertances in each flow path throughout the hydraulic system. For example, in the case of modifying a hydraulic system having a type-1 accumulator to allow for incorporation of a type-2 accumulator, one or more additional flow paths may be included to add to the overall fluid inertance of the system, thereby negatively affecting response time. For certain applications in which response time may be a critical system metric, such modification to incorporate a type-2 accumulator may appear to be undesirable, especially if the various inertances of the flow paths are not carefully considered during incorporation of the type-2 accumulator.

As the size of a hydraulic system is reduced (for example, to reduce packaging dimensions or to improve response times), components may become more closely integrated and their interactions more complex. Inventors have observed surprisingly large synergistic and/or anti-synergistic interactions in designs that, based purely on a priori evaluation, would not be expected.

Further, highly dynamic components such as a bidirectional high speed pump (in which a single side of the pump may at times serve as the discharge side and at other times serve as the suction side) capable of operating over a wide range of speeds (and therefore, generating pulsations at a wide range of frequencies) add to system complexity.

Returning again to FIG. 7, as previously discussed, pressure pulsations may be generated at a pump 718 due to pump ripple which may be undesirably transferred into force ripple, which is understood to refer to pulsations in net force applied to the piston 708 of the actuator 700. The net force applied to the piston 708 depends on the difference of pressure of fluid in the compression chamber 706 (referred to herein as 'P1') and pressure of fluid in the extension chamber 704 (referred to herein as 'P2'). This pressure difference is referred to herein as 'dP', and can be thought of mathematically as P2-P1 (or the pressure of fluid in the extension chamber (P2) minus the pressure of fluid in the compression chamber (P1)). Therefore, as recognized by the inventors, force ripple may result from pulsations in dP. Pulsations in dP may in turn result from variations of either P2 or P1, or from variations in both P2 and P1. That is, the inventors have determined that even if ripple in P2 is eliminated (indicating complete attenuation of pressure pulsations between the pump 718 and the extension chamber 704 of the accumulator 700), ripple in P1 are sufficient to result in pulsations in dP and, therefore, undesirable force ripple. Likewise, even if ripple in P1 is completely eliminated (indicating complete attenuation of pressure pulsations between the pump 718 and the compression chamber 706 of the actuator 700), ripple in P2 are sufficient to result in pulsations in dP and, therefore, undesirable force ripple.

The aforementioned ripple phenomenon is demonstrated in FIGS. 16a-22, as described in detail herein. FIGS. 16a-22a each illustrate examples of hydraulic systems, while FIGS. 16b-22b illustrate TFmags of pressure/displacement transfer functions describing relationships between pulsations originating at a pump 718 and pulsations of dP across the piston. The TFmags in the evaluated examples are plotted using a log scale on both axes, with the y-axis representing a log ratio of amplitude of pulsations in dP divided by amplitude of the displacement ripple generated at the pump, and the x-axis representing frequency of the displacement ripple generated at the pump. The illustrated TFmags of the transfer functions of 16b-22b were determined using an empirically based, customized lumped elements fluid dynamic model.

Figure 16A:
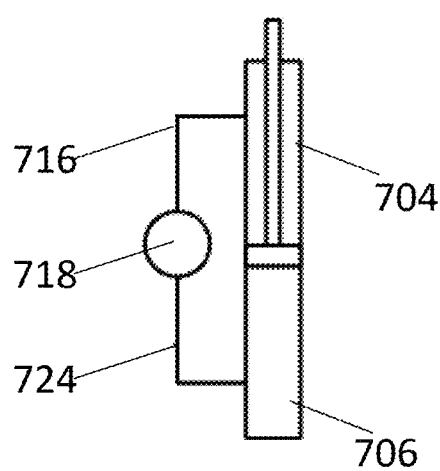
FIG. 16a illustrates a hydraulic system comprising a hydraulic actuator.
Figure 16B:
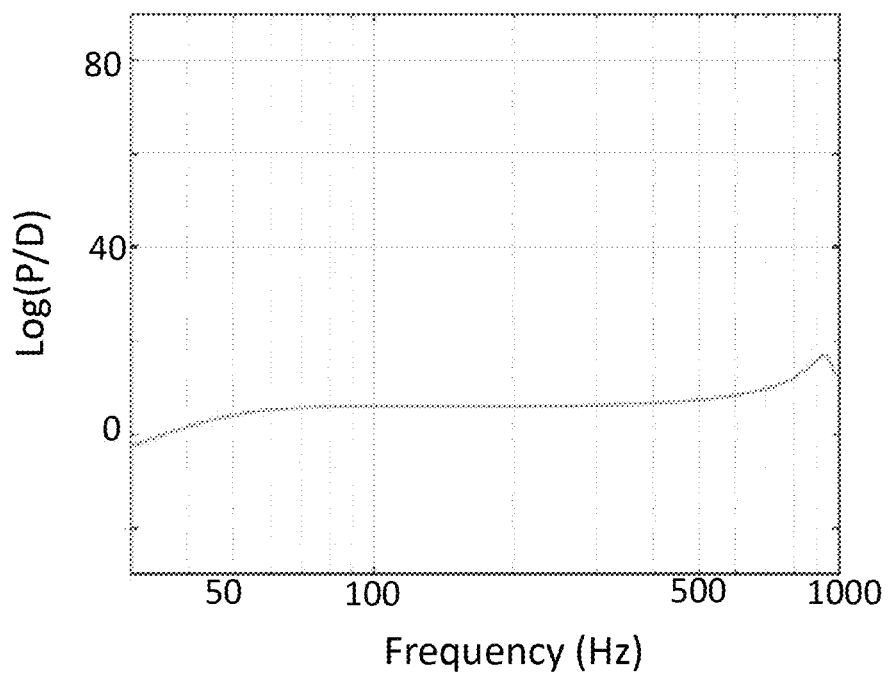

FIG. 16b illustrates behavior of dP in response to pump ripple in the system shown schematically in FIG. 16a, in which no accumulator is utilized. As can be seen from the relatively flat portion of FIG. 16b, displacement ripple generated at the pump results in pulsations in dP across the piston 708 regardless of frequency. Such behavior may arise since, due to the lack of substantial compliance (such as would be provided by an accumulator) in both the compression flow path 724 and extension flow path 716, pulsations can propagate from the pump nearly unattenuated through both the compression flow path 724 and the extension flow path 716. It is noted that a resonance peak occurs at approximately 920 Hz and that this peak causes amplification as opposed to attenuation of the amplitude of pulsations in dP. Without wishing to be bound to theory, the peak may arise due to a Helmholtz-type resonance that occurs between a fluidic inertance and an associated compliance.

As complexity of the system is increased by addition of accumulators, various additional resonances may arise within the frequency range of the plots. As was discussed previously, inventors have recognized that, in certain embodiments, configuring the system to avoid overlap or near overlap of frequencies of various resonances may reduce the likelihood of anti-synergistic interactions.

Figure 17A:
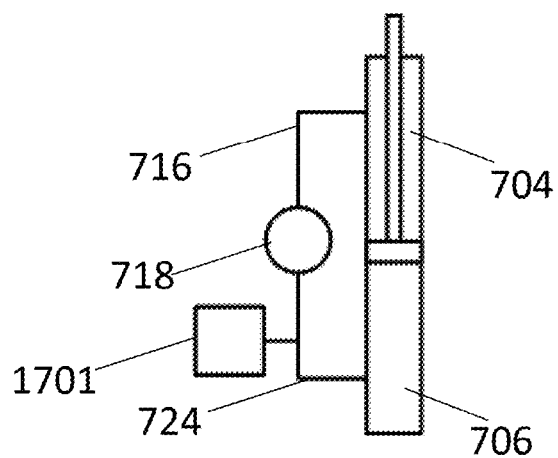
FIG. 17a illustrates a hydraulic system comprising a hydraulic actuator.
Figure 17B:
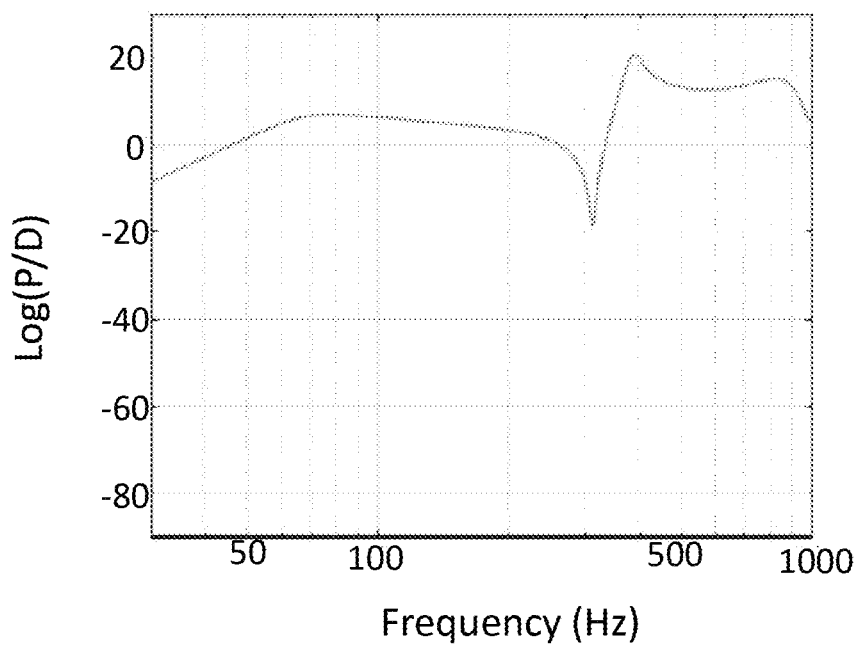

In FIG. 17a, a type-1 accumulator 1701 is in fluid communication with the compression flow path 724 fluidically coupling the pump 718 and compression chamber 706. FIG. 17b illustrates the frequency dependent behavior of dP in response to displacement ripple generated at the pump in the system of FIG. 17a. While at lower frequencies there is some modest attenuation of dP, above frequencies of approximately 50 Hz the TFmag approaches and even exceeds zero for certain ranges of frequencies, indicating no attenuation (and even possibly amplification) of pulsations at these frequencies. As discussed previously, the addition of an appropriately sized accumulator on the compression side attenuates pressure pulsations during propagation from the pump through the compression flow path 724. However, as there is no accumulator on the extension side, pulsations may propagate nearly unattenuated through the extension flow path 716, resulting in pulsations in dP as illustrated.

Figure 18A:
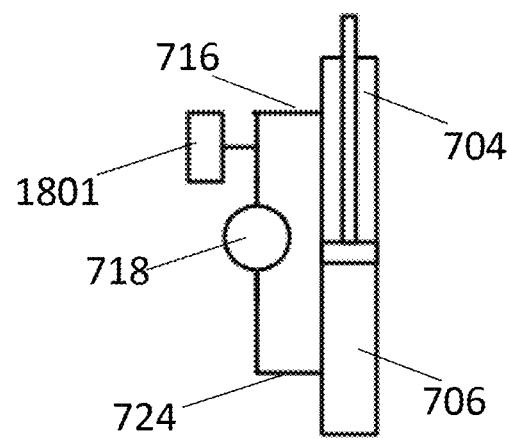
FIG. 18a illustrates a hydraulic system comprising a hydraulic actuator.
Figure 18B:
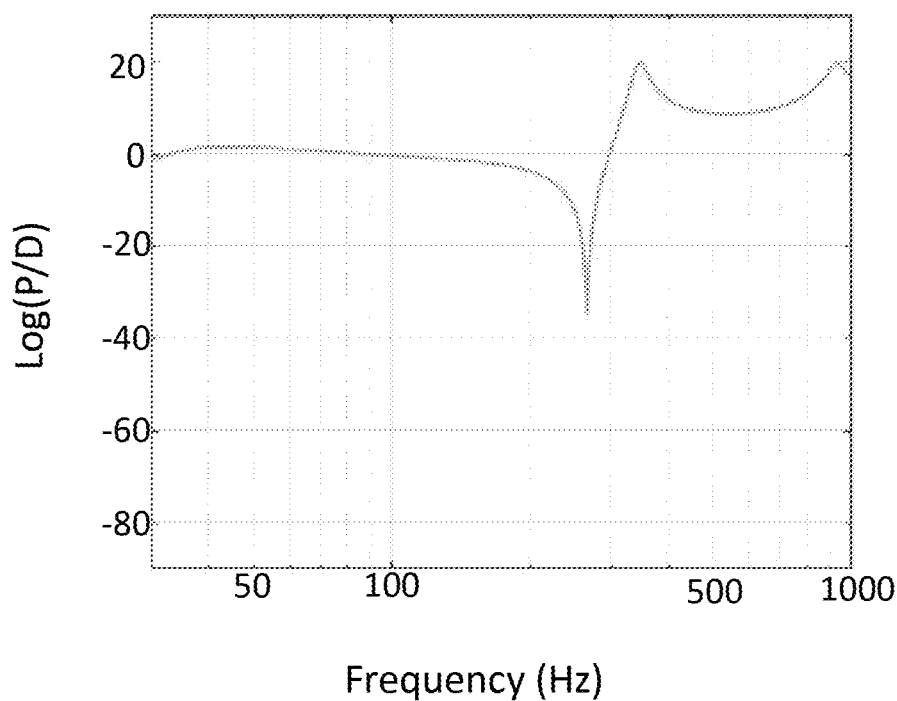

FIG. 18a depicts a system with only one type-1 accumulator located on the extension side (e.g., in direct communication with the extension flow path 716). As can be seen in FIG. 17b, the behavior of the system of FIG. 17a closely matches that of FIG. 16a since, even if pulsations are attenuated during propagation to the extension chamber 704, variations of pressure in the compression chamber 706 nevertheless result in overall pulsations in dP.

Figure 19A:
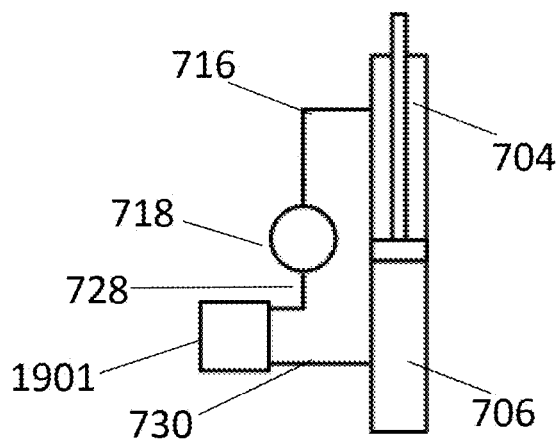
FIG. 19a illustrates a hydraulic system comprising a hydraulic actuator.
Figure 19B:
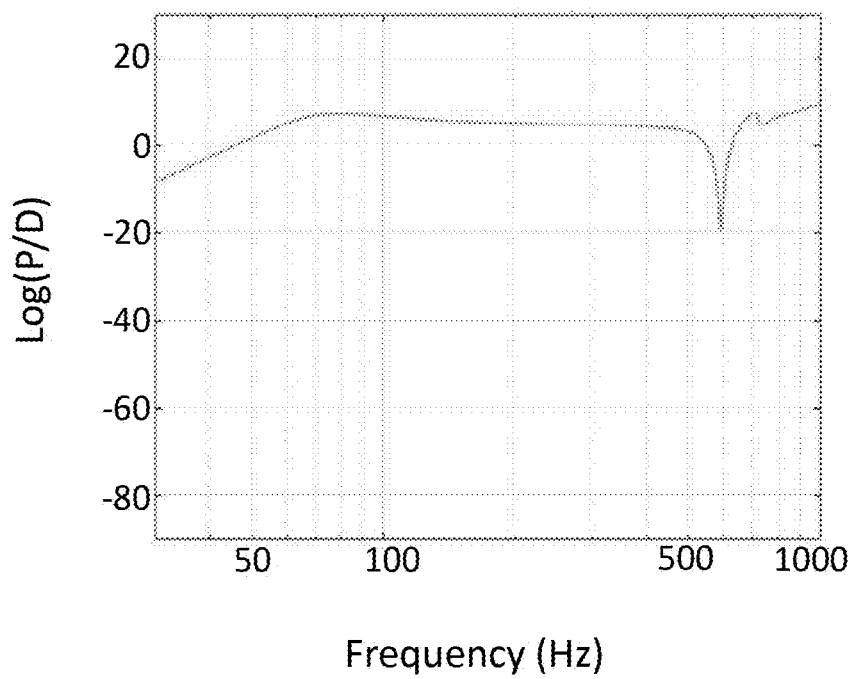

FIG. 19a depicts a system similar to that of FIG. 17a, except that the type-1 accumulator 1701 has been substituted with a type-2 accumulator 1901. As can be seen from FIG. 19b, merely substituting a type-1 accumulator 1701 with a type-2 accumulator 1901 in a hydraulic system having only a single accumulator only marginally improves attenuation capacity. From this analysis, the inventors have recognized that even if an accumulator is used to attenuate pulsations in one flow path of a close coupled actuator system, or even if additional accumulators are added to the flow path to further attenuate pulsations propagating along that flow path, such modifications are largely negligible with respect to overall pulsation performance if pulsations are free to propagate to the actuator 700 through an alternative flow path (such as the flow path from the pump to the opposing side of the actuator).

Figure 20A:
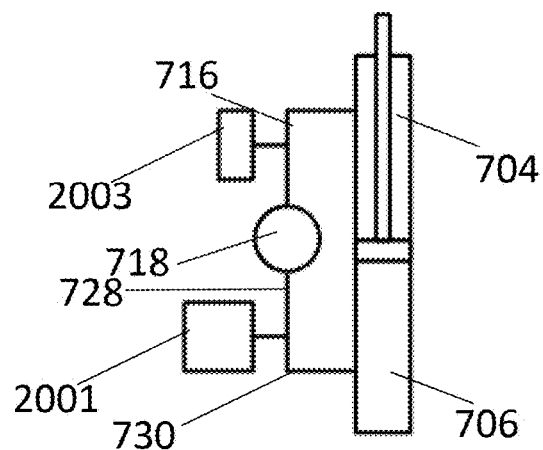
FIG. 20a illustrates a hydraulic system comprising a hydraulic actuator.
Figure 20B:
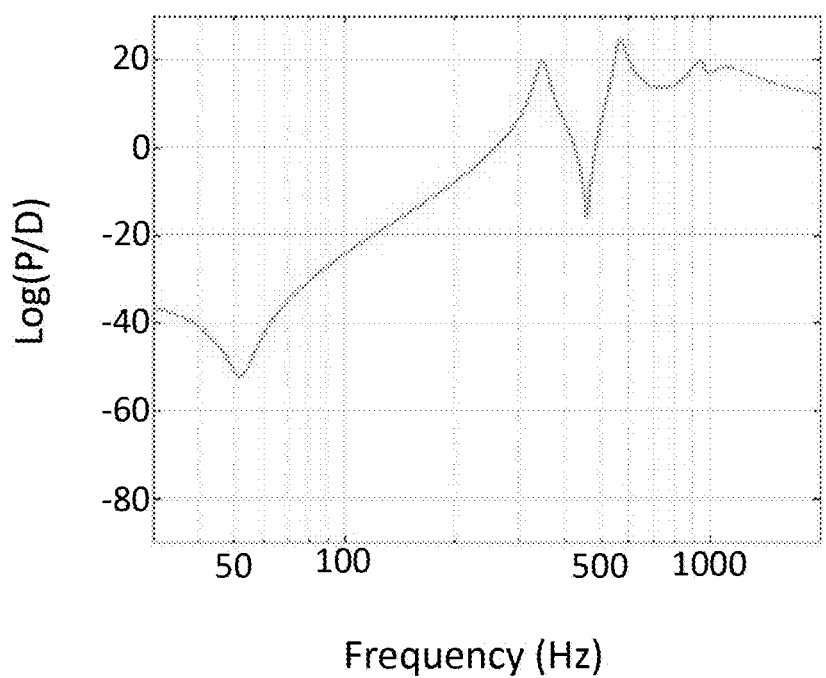

At least partly in view of the above, the inventors have recognized that a system incorporating two accumulators, as shown in FIG. 20a, including an extension-side accumulator 2003 located in direct fluid communication with the extension flow path 716 and a compression-side accumulator 2001 located in direct fluid communication with the compression flow path 724, may, exhibit pulsation attenuation capability that greatly exceeds the individual contributions of either accumulator considered alone. As can be observed by comparing FIG. 20b with FIGS. 17b-19b, utilizing two accumulators—one in fluid communication with the compression flow path coupling the pump to the compression chamber of the actuator and the other in fluid communication with the extension flow path coupling the pump to the extension chamber of the actuator—may be much more effective at attenuating pulsations in dP over a larger range of frequencies (from at least as low as 30 Hz to at least above 200 Hz). In this particular system, the two accumulators work synergistically such that pulsations in the various flow paths between the pump 718 and the actuator, resulting in greatly attenuated pulsations in dP at lower frequencies. At the higher frequencies the accumulators may lose effectiveness because the neck of one or more accumulators may become blocked due the inertance of the fluid in the neck. Alternatively or additionally the magnification at the higher frequencies may occur, for example, because of the superimposition or near superimposition of one or more resonance frequencies of the system.

Figure 21A:
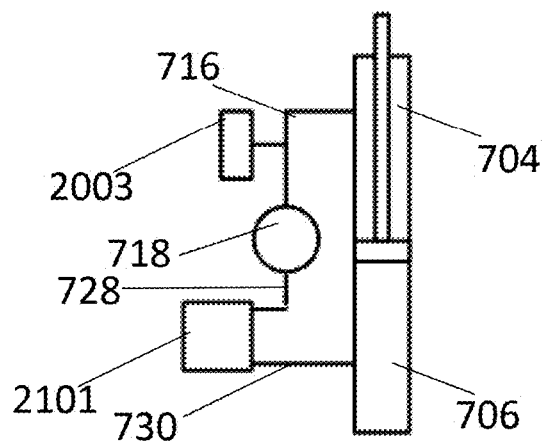
FIG. 21a illustrates a hydraulic system comprising a hydraulic actuator.
Figure 21B:
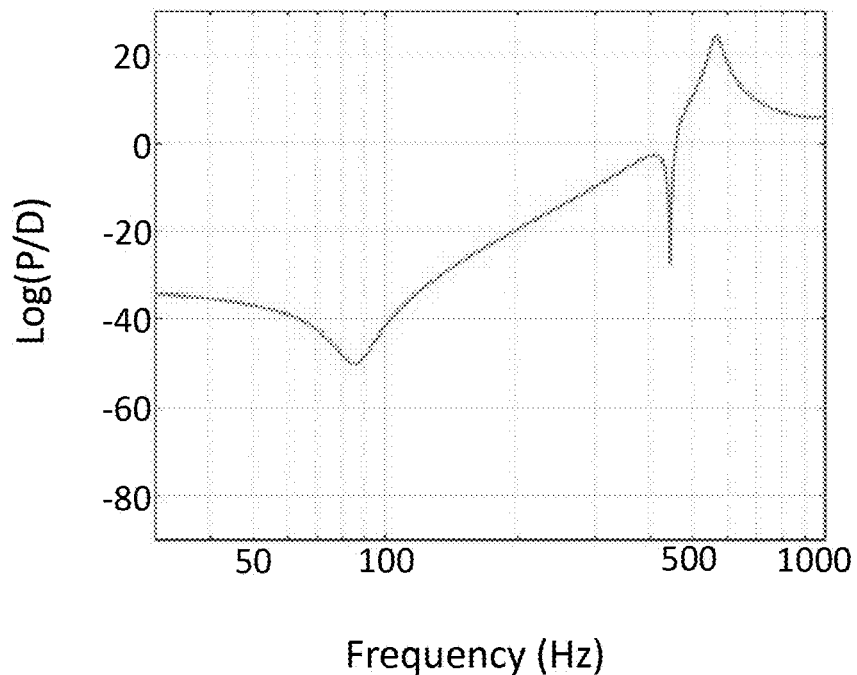

FIG. 21a depicts a system similar to FIG. 20a having two accumulators located on either side of the pump to allow for the aforementioned synergistic benefits, except that in FIG. 21a the compression-side accumulator 2101 is a type-2 accumulator. FIG. 21B describes the pulsation behavior of dP in response to ripple generated at the pump in the system of FIG. 21a. As disclosed earlier, inventors have recognized that, for various reasons, in certain applications a type-2 accumulator properly configured and positioned in accordance with the teachings herein may be more effective than type-1 accumulators. Indeed, as can be seen by comparing FIG. 21b, to FIG. 20b, utilization of a type-2 compression-side accumulator results in substantially improved dP attenuation for pulsations having a frequency above approximately 70 Hz as compared to a similar system having a type-1 compression-side accumulator.

Figure 22A:
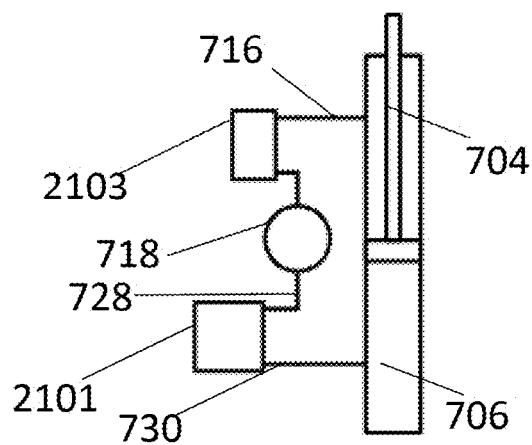
FIG. 22a illustrates a hydraulic system comprising a hydraulic actuator.
Figure 22B:
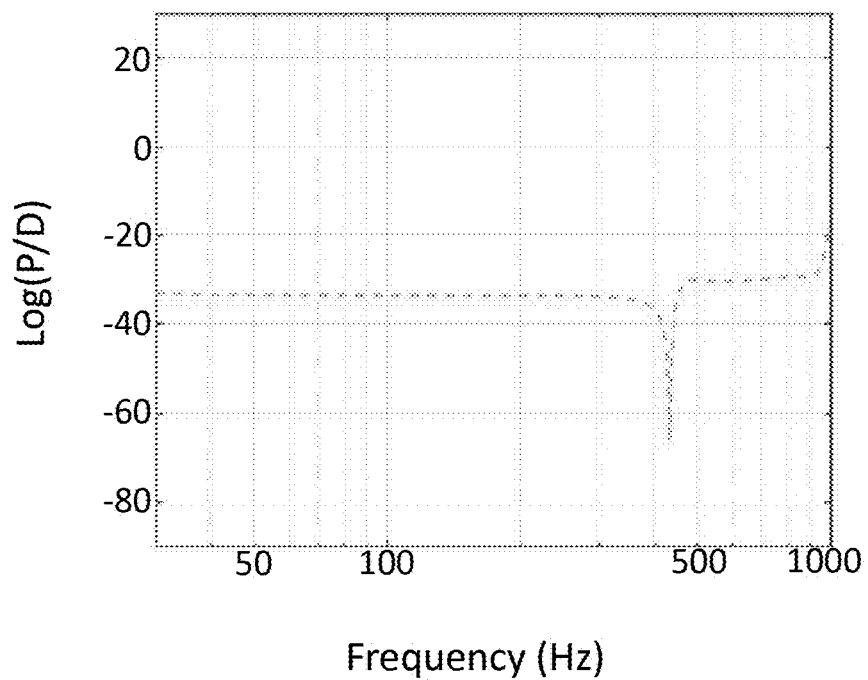

FIG. 22a illustrates a system in which both the extension-side accumulator 2103 and compression-side accumulator 2101 are type-2 accumulators. As can be seen in FIG. 22b, pulsation attenuation is markedly improved by making each of the extension-side accumulator 2103 and compression-side accumulator 2101 a type-2 accumulator.

In certain embodiments, therefore—especially embodiments for applications in which pulsation attenuation is a priority—both of the compression-side accumulator 2101 and extension-side accumulator 2103 may be type-2 accumulators. However, as discussed previously, type-2 accumulators require incorporation of additional flow paths having associated inertances and impedances, and may ultimately decrease certain performance metrics, such as response time of the hydraulic system. Therefore, in alternative embodiments, only one of the compression-side accumulator 2101 and extension-side accumulator 2103 may be type-2, and the other accumulator may be a type-1 accumulator. In yet alternative embodiment—for example, for embodiments designed for applications in which response time is highly prioritized relative to pulsation attenuation—both the extension-side accumulator 2103 and compression-side accumulator 2101 may be type-1 accumulators. Further, the inventors again note that, as can be seen by comparison of FIG. 17a-b and FIG. 19a-b, simply replacing a type-1 compression-side accumulator with a type-2 compression-side accumulator does not necessarily result in substantial system improvement over a wide-range of frequencies. Rather, it is, in certain embodiments, the specific synergy that results from having the two accumulators in the particular locations described above, wherein at least one of the accumulators is type-2 accumulator, that allows for such improvement.

Figure 24:
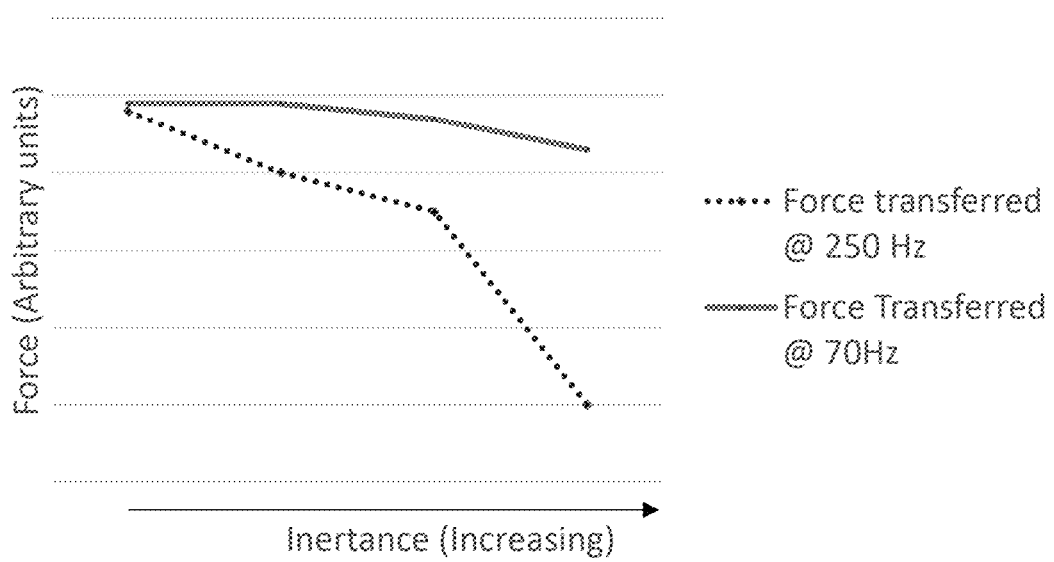
FIG. 24 illustrates empirical results obtained from altering the inertance of the compression-side first flow path of a hydraulic system.

FIG. 24 demonstrates empirical results illustrating how inertance of the compression-side first flow path 728 affects pulsation attenuation in a system having a type-2 compression side accumulator 726 and a type-1 extension-side accumulator 720, such as that illustrated in FIG. 8. As can be seen in FIG. 24, increasing inertance of the compression-side first flow path 728 results in a decrease in the magnitude of force ripple resulting from displacement ripple at the pump; indeed, the trend is observed for pulsations at both 70 Hz and 250 Hz, being more pronounced at the latter frequency.

Figure 25A:
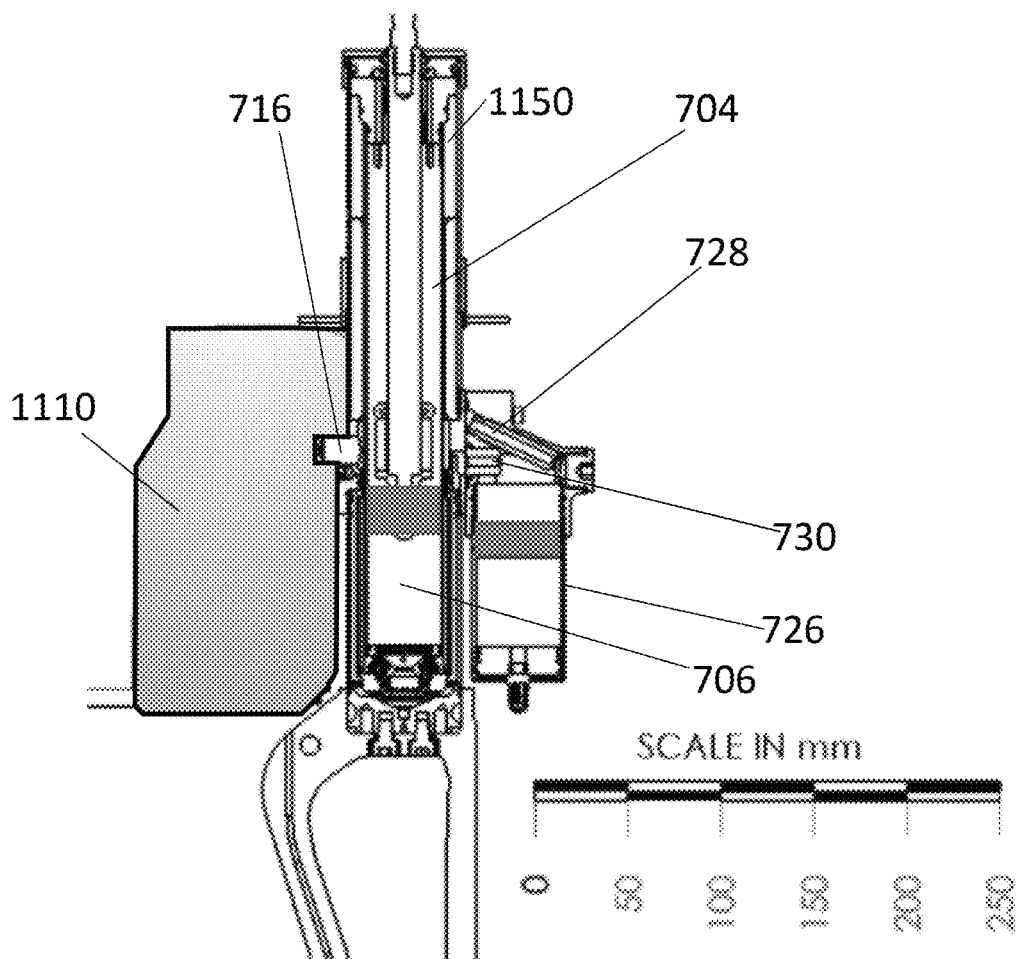
FIG. 25a illustrates an embodiment of a hydraulic system comprising a hydraulic actuator (drawn to scale).
Figure 25B:
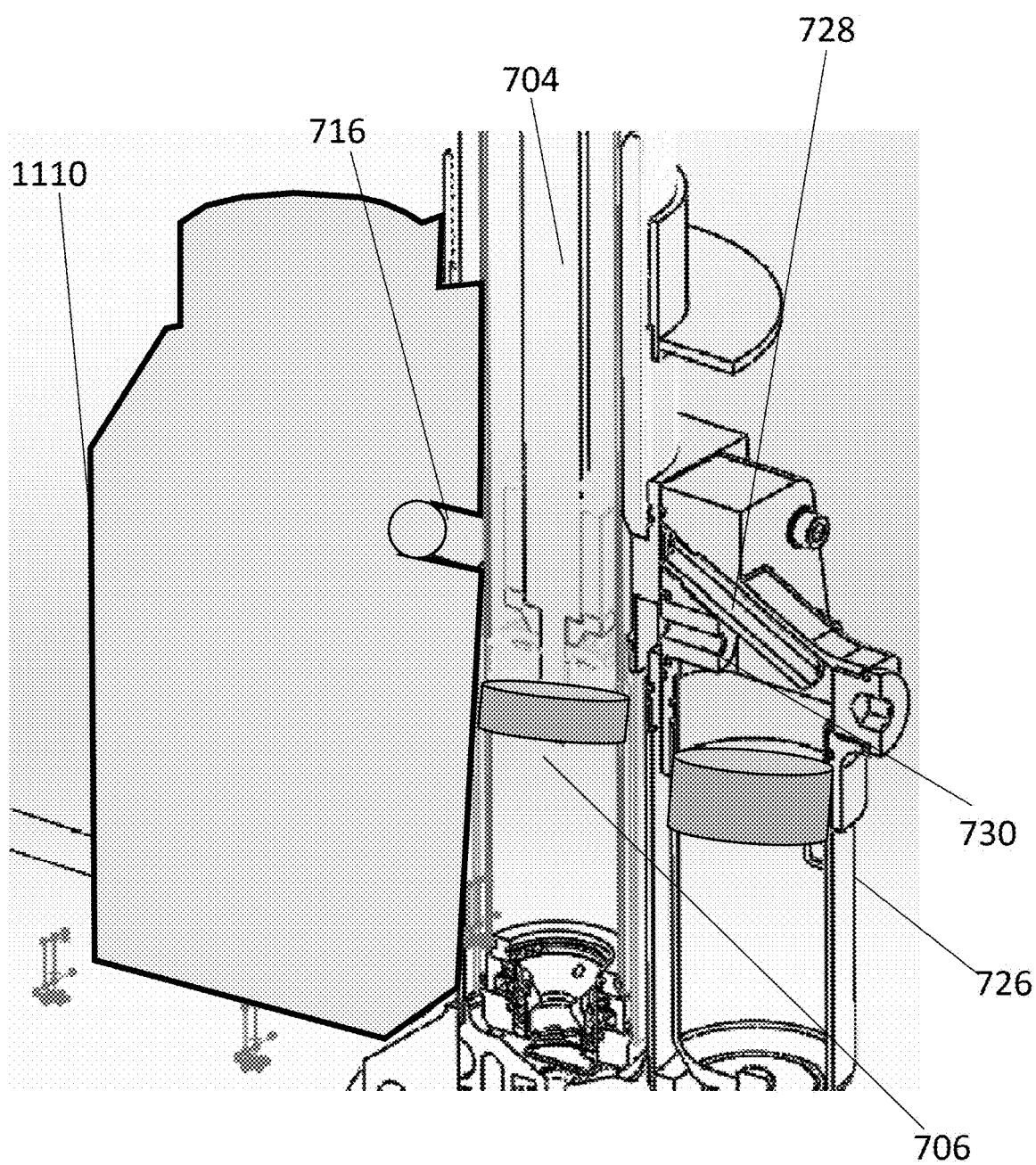
FIG. 25b illustrates an alternative view of the system of FIG. 25a (drawn to scale).
Figure 25C:
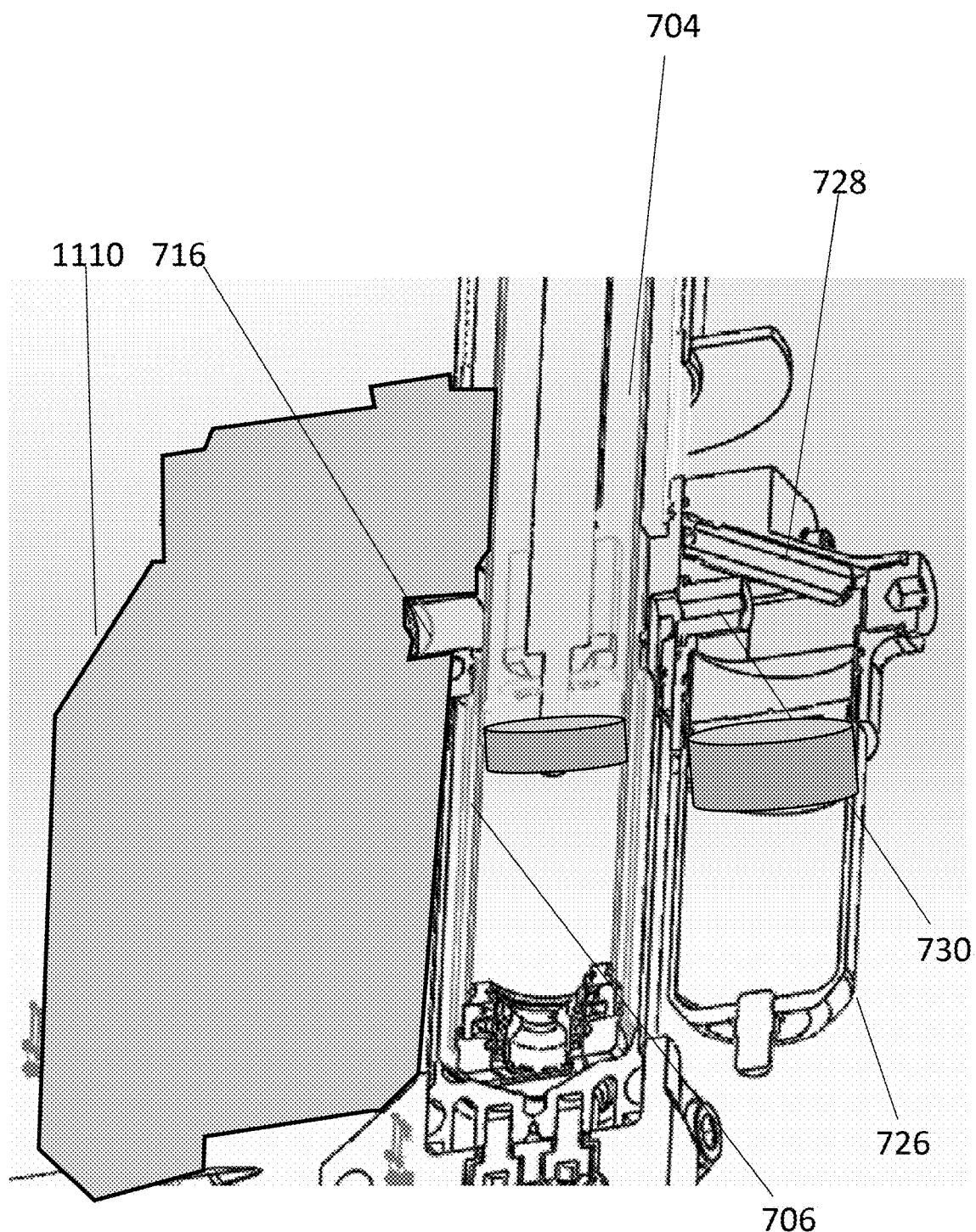
FIG. 25c illustrates an alternative view of the system of FIG. 25a (drawn to scale).
Figure 25D:
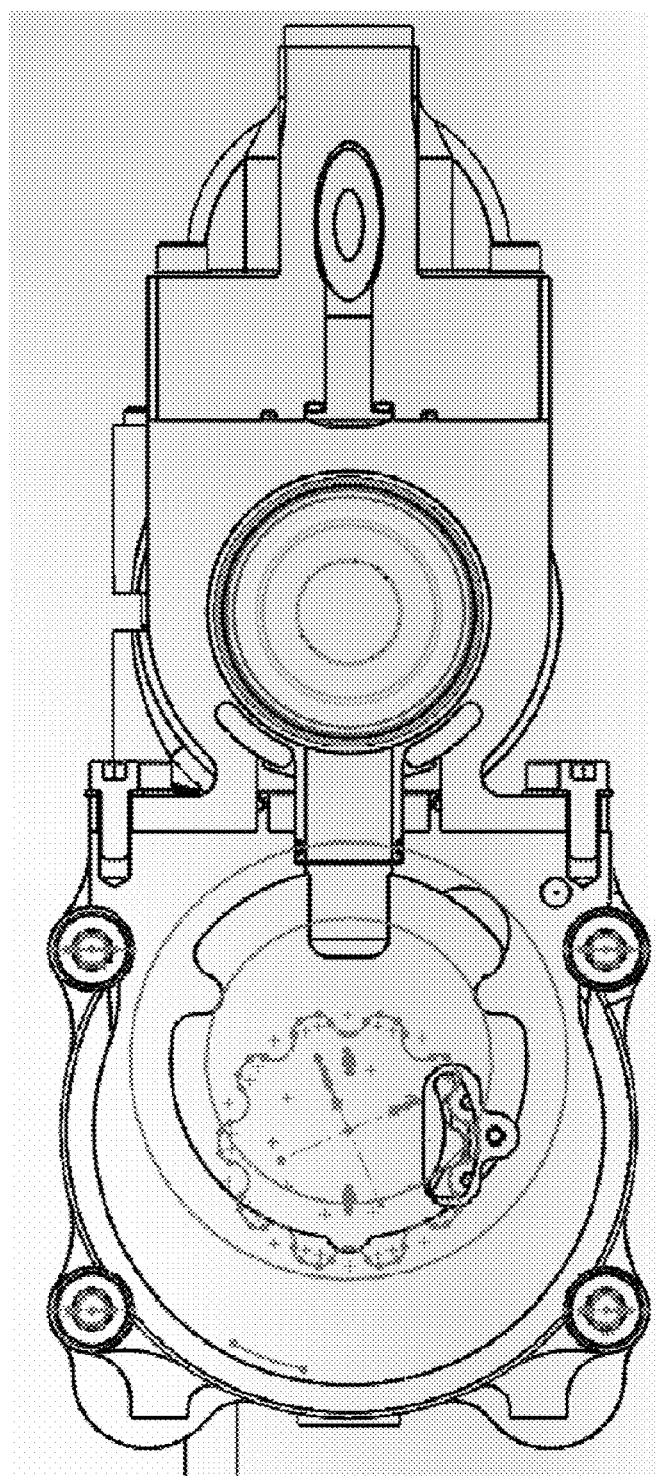
FIG. 25d illustrates an alternative view of the system of FIG. 25a (drawn to scale).

A person of ordinary skill in the art contemplating the present disclosure will readily appreciate that practical actuator embodiments may tend to include passageways and components that may be geometrically and functionally complex while still adhering to the conceptual framework described herein. For example, FIGS. 25a-d illustrate a practical embodiment of a hydraulic system similar to that shown schematically in FIG. 11B. As can be seen in FIG. 25a, the illustrated embodiment comprises a housing 1110 that internally contains both a pump (not pictured), an extension-side accumulator (not pictured), and an extension-side first flow path (not pictured); an extension side second flow path 701 fluidically coupling the extension-side accumulator to the extension chamber 704 of the actuator; a compression-side first flow path that fluidically couples the pump contained in the housing 1110 to a compression-side accumulator 726; and a compression-side second flow path 730 that fluidically couples the compression-side accumulator 726 to the compression chamber 706 of the actuator. As illustrated, the compression-side first flow path 728 includes both an annular cavity encircling at least a portion of the actuator housing as well as the bore of a first tube partially inserted into the housing of the compression-side accumulator 726. As illustrated, the compression-side second flow path 730 includes the bore of a second tube. The compression-side accumulator 726 is therefore similar to the type-2 accumulator shown schematically in FIG. 12C. FIGS. 25b-d illustrate additional views and/or portions of the practical embodiment shown in FIG. 25a.

While complex three dimensional flow paths or distributed inertance/compliance can may have an effect, the teachings of this disclosure are believed to hold applicable across a range of such variations. For example, it is recognized that conveyance of fluid from one point to another can proceed through multiple channels that may form complex parallel and series networks. As is the case in electrical circuit theory as well as conventional fluid dynamics, insofar as a given impedance exhibits an approximately linear response, complex networks can be roughly approximated as one single inertance. Applicants certainly recognize that all fluid passages tend to exhibit non-linear impedance behavior. While the analytical models discussed herein are generally approximated using linear elements, including linear inertances, these models can be extended to include non-linear effects using a combination of fluid mechanical principles, CFD tools, and empirical data.

As the term is used herein, a flow path is said to "fluidically couple" a first component to a second component when, under at least certain operating conditions (e.g., certain pressures or certain configurations of valves), fluid may flow from a chamber of the first component, through the flow path, to a chamber of the second component. If a flow path comprises a switchable valve or other flow control device between the first component and second component, the flow path is understood to fluidically couple the first component to the second component whether the valve is open or closed since, under at least certain operating conditions (e.g., opening of the valve, increase in fluid pressure above a pressure relief valve's set point, etc.), fluid may flow from a chamber of the first component, through the flow path comprising the valve, to the chamber of the second component. A flow path may comprise various pipes, tubes, nipples, bores, valves, open volumes, chambers, or other channels.

As used herein, a first component is said to be in "fluid communication" with a second component if a flow path exists that fluidically couples the first component to the second component that does not pass through a pump.

As used herein, it is understood that the term "fluid," unless context indicates otherwise may encompass, for example, compressible and incompressible fluids and the term fluid communication may encompass, for example, hydraulic and pneumatic communication.

As used herein, the term compressible fluid is understood to mean gas or vapor.

As used herein, a "pump" is understood to mean a hydraulic device, component, unit or subunit that may be used, in at least one mode of operation, to receive fluid flow at one port at a first pressure and to deliver at least a portion of the flow at a second pressure, higher than the first, at a second port. A pump may use mechanical kinetic energy (e.g., rotation of a rotor) to produce a fluidic pressure difference. In some embodiments, fluid delivered at the second higher pressure may flow to one or more other apparatus (e.g. an accumulator, an actuator, a hydraulic motor) by means of or through a flow path. In some embodiments, the pump may have a housing that includes a portion of the flow path between the pump and another hydraulic apparatus.

In certain embodiments, a pump may also be used to convert fluidic pressure difference into mechanical kinetic energy in a second operational mode. A pump may refer to a hydraulic pump or may refer to a hydraulic motor that may be operated as a hydraulic pump. The pump in any of the hydraulic systems described herein may be operatively coupled to a motor (not pictured), for example an electric motor, that is controlled by a motor controller (not pictured). The motor controller may receive a command profile (e.g., from an external controller or user) as described above, and may control the motor such that the hydraulic system operates according to the command profile.

As used herein, a "compression chamber" and "extension chamber" are understood to mean chambers within a housing of a hydraulic actuator that are separated from each other by a piston received in the housing of the actuator. A piston rod may be attached to the piston on a face that is adjacent to (e.g., exposed to fluid in) the extension chamber. The volume of the compression chamber contracts upon compression of the actuator (e.g., when the length of the actuator is decreased), and the volume of the extension chamber contracts upon extension of the actuator (e.g., when the length of the actuator is increased).

As used herein, an "electric motor" (sometimes referred to as simply a "motor") is understood to mean an electromechanical device that is capable of converting electrical energy into mechanical kinetic energy (e.g., rotation of a rotor). In certain embodiments, an electric motor may be capable of converting mechanical kinetic energy into electrical energy in a second operational mode. A motor may refer to an electric motor or may refer to an electric generator that may be operated as an electric motor. A motor is said to be "operatively coupled" to a pump when (i) appropriate rotation of a rotor of the motor results in a rotation of one or more rotatable elements of the pump and/or (ii) appropriate rotation of a rotatable element of the pump results in a rotation of the rotor of the motor.

As used herein, a "controller" is understood to mean one or more integrated circuits (such as, for example, a processor) along with associated circuitry and/or software that determines, communicates and/or applies an output signal to a target component based on one or more input parameters.

As used herein, a "motor controller" is understood to mean a controller capable of applying a modulable signal to an electric motor, wherein applying the signal to the motor results in (i) a torque being applied by the motor to a component operatively coupled to the motor (e.g., a pump), and/or (ii) rotation of a rotor of the motor.

The invention claimed is:

1. A hydraulic apparatus comprising:
a hydraulic actuator comprising an actuator housing that at least partially defines a compression chamber and an extension chamber;
a pump; and
an extension-side accumulator comprising:
an extension-side accumulator housing defining a first internal volume that is divided, by a first barrier, into a first contained chamber and a first working chamber, wherein:
the first working chamber is fluidically coupled to the pump by an extension-side first flow path having a first inertance;
the first working chamber is fluidically coupled to the extension chamber by an extension-side second flow path having a second inertance; and
the first inertance is larger than the second inertance.

2. The hydraulic apparatus of claim 1, wherein a first TFmag of a first transfer function has at least one of a first global maximum or first local maximum at a first frequency, and a second TFmag of a second transfer function has at least one of a second global maximum or second local maximum at a second frequency, wherein:
the second frequency is higher than the first frequency;
the first transfer function describes a first relationship between pressure at a first point and pressure at a second point;
the second transfer function describes a second relationship between pressure at the second point and pressure at a third point;
the first point is located in one of: the pump, a port of the pump, or the extension-side first flow path;
the second point is located in the first internal volume of the extension-side accumulator; and
the third point is located in the extension chamber of the actuator.

3. The hydraulic apparatus of claim 2, wherein the second frequency is equal to at least 5 or at least 20 times the first frequency.

4. The hydraulic apparatus of claim 3, wherein the second frequency is greater than the first frequency by a factor of less than 100.

5. The hydraulic apparatus of claim 2, wherein the first frequency is higher than a first lower limit and lower than a first upper limit, wherein the first lower limit is one of 0 Hz, 2 Hz, 5 Hz, or 10 Hz and the first upper limit is one of 100 Hz, 80 Hz, 60 Hz, 50 Hz, 30 Hz, 20 Hz, or 15 Hz.

6. The hydraulic apparatus of claim 2, wherein the second frequency is higher than a second lower limit and lower than a second upper limit, wherein the second lower limit is one of 100 Hz, 200 Hz, 300 Hz, 400 Hz, or 500 Hz and the second upper limit is one of 800 Hz, 1000 Hz, or 1500 Hz.

7. The hydraulic apparatus of claim 1, wherein a first TFph of a first transfer function is equal to +/−90° at a first frequency, and a second TFph of a second transfer function is equal to +/−90° at a second frequency, wherein:
the first transfer function describes a first relationship between pressure at a first point and pressure at a second point;
the second transfer function describes a second relationship between pressure at the second point and pressure at a third point;
the first point is located in one of: the pump, a port of the pump, and the extension-side first flow path;
the second point is located in the first internal volume of the extension-side accumulator; and
the third point is located in the extension chamber of the actuator.

8. The hydraulic apparatus of claim 1, wherein the extension-side accumulator is a type-2 accumulator.

9. The hydraulic apparatus of claim 1, further comprising:
a compression-side flow path fluidically coupling the pump to the compression chamber;
a compression-side accumulator comprising:
a compression-side accumulator housing defining a second internal volume that is divided, by a second barrier, into a second contained chamber and a second working chamber, wherein:
the second working chamber is fluidically coupled to the pump via a compression-side first flow path; and
the second working chamber is fluidically coupled to the compression chamber via a compression-side second flow path.

10. The hydraulic apparatus of claim 9, wherein the compression-side accumulator has a second stiffness and the extension-side accumulator has a first stiffness, wherein the second stiffness is greater than the first stiffness.

11. The hydraulic apparatus of claim 9, wherein the compression-side accumulator is a type-2 accumulator.

12. A hydraulic apparatus comprising:
a hydraulic actuator comprising an actuator housing that at least partially defines a compression chamber of the actuator and an extension chamber of the actuator;
a bi-directional pump; and
an extension-side accumulator comprising:
an extension-side accumulator housing defining a first internal volume that is divided, by a first barrier, into a first contained chamber and a first working chamber, wherein the first contained chamber includes a compressible fluid, and wherein:
the first working chamber is fluidically coupled to the pump by an extension-side first flow path;
the first working chamber is fluidically coupled to the extension chamber of the actuator by an extension-side second flow path;
wherein the extension-side first flow path is entirely distinct from the extension-side second flow path, and wherein at least one of (a) or (b) is true;
(a) a first TFmag of a first transfer function has at least one of a first global maximum or first local maximum at a first frequency, and a second TFmag of a second transfer function has at least one of a second global maximum or second local maximum at a second frequency, wherein the second frequency is higher than the first frequency;
(b) a first TFph of the first transfer function is equal to +/−90° at a first frequency, and a second TFph of a second transfer function is equal to +/−90° at a second frequency, wherein the second frequency is higher than the first frequency and wherein:
the first transfer function describes a first relationship between pressure at a first point and pressure at a second point;
the second transfer function describes a second relationship between pressure at the second point and pressure at a third point;
the first point is located in one of: the pump, a port of the pump, and the extension-side first flow path;

the second point is located in the first internal volume of the extension-side accumulator; and the third point is located in the extension chamber of the actuator.

13. The hydraulic apparatus of claim 12, wherein (a) is true.

14. The hydraulic apparatus of claim 12 wherein (b) is true.

15. The hydraulic apparatus of claim 12, wherein the second frequency is higher than the first frequency by a factor of at least 5.

16. The hydraulic apparatus of claim 12, wherein the first frequency is higher than a first lower limit and lower than a first upper limit, wherein the first lower limit is one of 0 Hz, 2 Hz, 5 Hz, or 10 Hz and the first upper limit is one of 100 Hz, 80 Hz, 60 Hz, 50 Hz, 30 Hz, 20 Hz, or 15 Hz.

17. The hydraulic apparatus of claim 12, wherein the second frequency is higher than a second lower limit and lower than a second upper limit, wherein the second lower limit is one of 100 Hz, 200 Hz, 300 Hz, 400 Hz, or 500 Hz and the second upper limit is one of 800 Hz, 1000 Hz, or 1500 Hz.

18. The hydraulic apparatus of claim 12, wherein the extension-side first flow path is the shortest flow path of a first set of one or more flow paths, and the extension-side second flow path is the shortest flow path of a second set of one or more flow paths, wherein:

the first set of one or more flow paths consists of each flow path of the hydraulic apparatus that fluidically couples the pump to the first working chamber; and the second set of one or more flow paths consists of each flow path of the hydraulic apparatus that fluidically couples the first working chamber to the extension chamber.

19. The hydraulic apparatus of claim 12, wherein the extension-side accumulator is a type-2 accumulator.

20. The hydraulic apparatus of claim 12, wherein the extension-side first flow path has a first inertance, the extension-side second flow path has a second inertance, and wherein the first inertance is larger than the second inertance.

* * * * *